US009852724B2

(12) United States Patent
Higuchi et al.

(10) Patent No.: US 9,852,724 B2
(45) Date of Patent: Dec. 26, 2017

(54) AUDIO DEVICE, SOUND PROCESSING METHOD, SOUND PROCESSING PROGRAM, SOUND OUTPUT METHOD, AND SOUND OUTPUT PROGRAM

(71) Applicant: Sony Corporation, Tokyo (JP)

(72) Inventors: Satoshi Higuchi, Kanagawa (JP); Kazuya Tateishi, Tokyo (JP); Toshiyuki Sekiya, Kanagawa (JP); Yuki Fujikashi, Chiba (JP); Kazuya Katsuki, Kanagawa (JP); Koji Matsuura, Tokyo (JP); Saki Yokoyama, Kanagawa (JP)

(73) Assignee: Sony Corporation (JP)

( * ) Notice: Subject to any disclaimer, the term of this patent is extended or adjusted under 35 U.S.C. 154(b) by 187 days.

(21) Appl. No.: 14/612,464

(22) Filed: Feb. 3, 2015

(65) Prior Publication Data
US 2015/0228266 A1  Aug. 13, 2015

(30) Foreign Application Priority Data

Feb. 10, 2014 (JP) .................................. 2014-023340

(51) Int. Cl.
G10K 11/16 (2006.01)
H04M 9/08 (2006.01)
H04N 21/439 (2011.01)

(52) U.S. Cl.
CPC ............ *G10K 11/16* (2013.01); *H04M 9/082* (2013.01); *H04N 21/439* (2013.01)

(58) Field of Classification Search
CPC ........ G10K 11/16; H04M 9/08; H04M 9/082; H04M 3/002; H04N 21/439; H04B 3/20; H04B 3/23; H04B 3/237

USPC .................... 381/66, 71.1, 71.11, 71.12; 379/406.01–406.16

See application file for complete search history.

(56) References Cited

U.S. PATENT DOCUMENTS

| | | | |
|---|---|---|---|
| 7,747,002 B1* | 6/2010 | Thi .......................... | H04B 3/23 379/406.08 |
| 8,861,711 B2 | 10/2014 | Takayama et al. | |
| 2005/0129224 A1* | 6/2005 | Piket ...................... | H04M 9/082 379/406.01 |
| 2013/0033561 A1* | 2/2013 | Kwon ............... | H04M 1/72522 348/14.01 |
| 2014/0003635 A1* | 1/2014 | Mohammad ........... | G10K 11/16 381/306 |

(Continued)

FOREIGN PATENT DOCUMENTS

JP        2013-038763 A     2/2013

*Primary Examiner* — Xu Mei
*Assistant Examiner* — Jason R Kurr
(74) *Attorney, Agent, or Firm* — Lerner, David, Littenberg, Krumholz & Mentlik, LLP

(57) ABSTRACT

There is provided an audio device including a control section configured to cause an audio signal to be output, the audio signal including a sound signal obtained through playback of content and a sound signal received from a communication partner device, and a sound processing section configured to generate an elimination signal obtained by eliminating a given sound signal from a microphone detection signal, which is the audio signal that is propagated and detected by a microphone. The control section causes the communication partner device to transmit the elimination signal.

8 Claims, 36 Drawing Sheets

(56) References Cited

U.S. PATENT DOCUMENTS

2015/0003606 A1\* 1/2015 Nemer ................. H04M 9/082
378/406.01

\* cited by examiner

FIG. 2

Logical address

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Specific Use |
| 15 | Unregistered (as initiator address) Broadcast (as destination address) |

CEC DATA STRUCTURE

HEADER BLOCK DATA STRUCTURE

FIG. 19
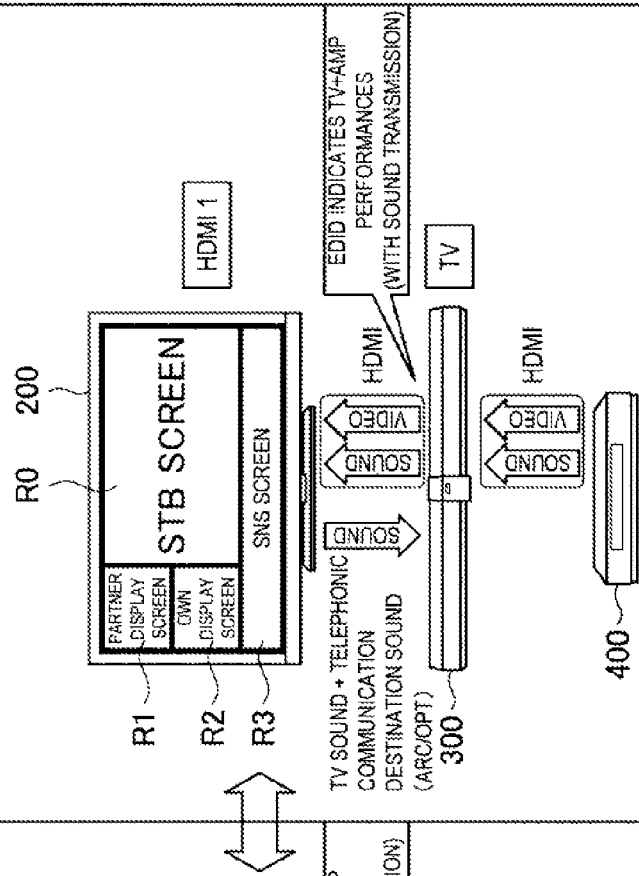
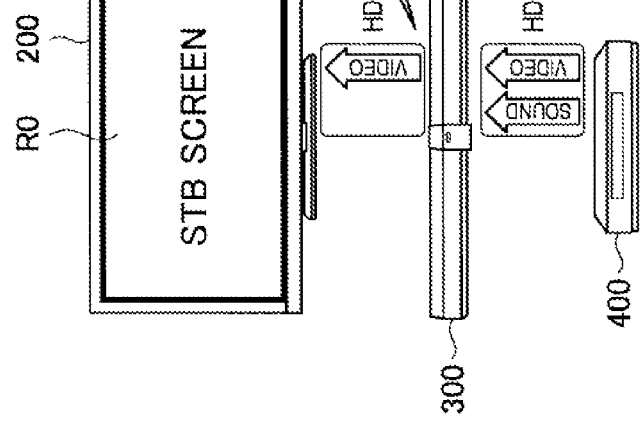

AUDIO DEVICE, SOUND PROCESSING METHOD, SOUND PROCESSING PROGRAM, SOUND OUTPUT METHOD, AND SOUND OUTPUT PROGRAM

CROSS REFERENCE TO RELATED APPLICATIONS

This application claims the benefit of Japanese Priority Patent Application JP 2014-023340 filed Feb. 10, 2014, the entire contents of which are incorporated herein by reference.

BACKGROUND

The present disclosure relates to an audio device, a sound processing method, a sound processing program, a sound output method, and a sound output program.

There has recently appeared a system for carrying out a conversation with a partner while transmitting and receiving a sound between a plurality of terminals. In such a system, a telephonic communication sound from a terminal of a telephonic communication source reaches a terminal of a telephonic communication destination while being attenuated and causing a delay time. Further, the telephonic communication sound is detected by a microphone of the terminal of the telephonic communication destination, and is returned to the terminal of the telephonic communication source while being attenuated and causing a delay time. In this way, since the telephonic communication sound goes and comes back between the terminals while being attenuated and causing a delay time, there may occur a phenomenon that the sound to which an echo is added may be output from a terminal.

In order to reduce the occurrence of such a phenomenon, even when a sound transmitted from the terminal of the telephonic communication source is output from the speaker and is detected by the microphone, the terminal of the telephonic communication destination may cancel the sound to thereby not to transmit the sound to the terminal of the telephonic communication source, which is called echo cancellation may be performed (for example, see JP 2013-038763A). It is generally known that if the telephonic communication sound is prevented from going and coming back between the terminals by such an echo cancellation, a comfortable conversation can be carried out.

SUMMARY

However, in the case where a conversation is carried out while listening to a content playback sound, for example, the terminal of the telephonic communication destination not only outputs a conversation sound of the telephonic communication source but also a content playback sound of the telephonic communication source from the speaker. As a result, since the content playback sound also goes and comes back between the terminals while being attenuated and causing a delay time, the sound to which an echo is added may be output from a terminal and there may occur a phenomenon that it is difficult to carry out a conversation comfortably with a partner.

In light of the foregoing, it is desirable to provide technology capable of making a conversation carried out with a partner while listening to a content playback sound more comfortable.

According to an embodiment of the present disclosure, there is provided an audio device including a control section configured to cause an audio signal to be output, the audio signal including a sound signal obtained through playback of content and a sound signal received from a communication partner device, and a sound processing section configured to generate an elimination signal obtained by eliminating a given sound signal from a microphone detection signal, which is the audio signal that is propagated and detected by a microphone. The control section causes the communication partner device to transmit the elimination signal.

According to another embodiment of the present disclosure, there is provided a sound processing method including causing an audio signal to be output, the audio signal including a sound signal obtained through playback of content and a sound signal received from a communication partner device, generating an elimination signal obtained by eliminating a given sound signal from a microphone detection signal, which is the audio signal that is propagated and detected by a microphone, and causing, by a processor, the communication partner device to transmit the elimination signal.

According to another embodiment of the present disclosure, there is provided a sound processing program for causing a computer to function as an audio device, the audio device including a control section configured to cause an audio signal to be output, the audio signal including a sound signal obtained through playback of content and a sound signal received from a communication partner device, and a sound processing section configured to generate an elimination signal obtained by eliminating a given sound signal from a microphone detection signal, which is the audio signal that is propagated and detected by a microphone. The control section causes the communication partner device to transmit the elimination signal.

According to another embodiment of the present disclosure, there is provided an audio device including a control section configured to, when an audio signal including a sound signal obtained through playback of content and a sound signal received from a communication partner device is input from another audio device, cause the audio signal to be output from a speaker. The another audio device generates an elimination signal obtained by eliminating a given sound signal from a microphone detection signal, which is the audio signal that is propagated and detected by a microphone.

According to another embodiment of the present disclosure, there is provided a sound output method including causing, when an audio signal including a sound signal obtained through playback of content and a sound signal received from a communication partner device is input from another audio device, the audio signal to be output from a speaker. The another audio device generates an elimination signal obtained by eliminating a given sound signal from a microphone detection signal, which is the audio signal that is propagated and detected by a microphone.

According to another embodiment of the present disclosure, there is provided a sound output program for causing a computer to function as an audio device, the audio device including a control section configured to, when an audio signal including a sound signal obtained through playback of content and a sound signal received from a communication partner device is input from another audio device, cause the audio signal to be output from a speaker. The another audio device generates an elimination signal obtained by eliminating a given sound signal from a microphone detection signal, which is the audio signal that is propagated and detected by a microphone.

According to one or more of embodiments of the present disclosure, there is provided technology capable of making a conversation carried out with a partner while listening to a content playback sound more comfortable. Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 2 is a diagram showing a CEC table indicating correspondence relationship between a device and a CEC logical address;

FIG. 18 is a diagram illustrating a case where video data and sound data output from a digital tuner are viewed and listened to;

FIG. 19 is a diagram illustrating a case where video data and sound data output from a set-top box used as an example of a source device are viewed and listened to;

DETAILED DESCRIPTION OF THE EMBODIMENT(S)

Figure 1:
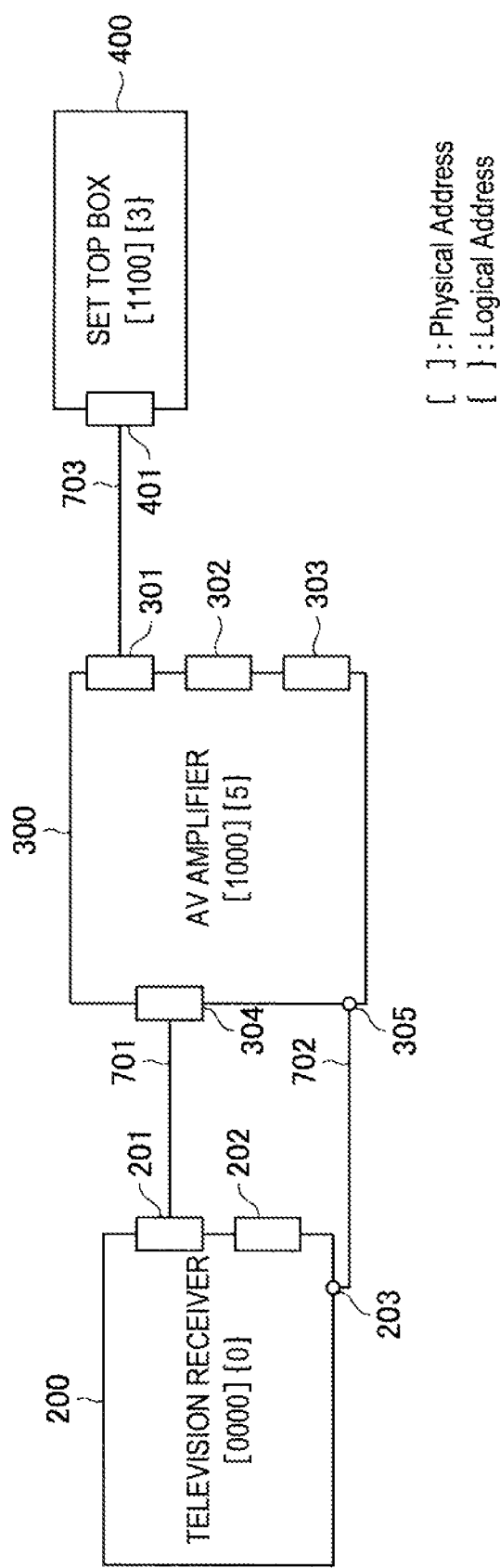
FIG. 1 is a block diagram showing a basic configuration example of an AV system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets or numerals after the same reference numeral. Note that, in the case where it is not necessary to distinguish the multiple structural elements that have substantially the same function and structure from one another, the multiple structural elements are denoted with the same reference numeral only.

Note that the description will be given in the following order.
1. Description of HDMI standard
2. Description of embodiment
   2-1. Configuration example of AV system
   2-2. Configuration example of communication system
   2-3. Flow of operation of communication system
3. Conclusion <<1. Description of HDMI Standard>>

First, the HDMI standard that may be applied to an AV system (device control apparatus) according to an embodiment of the present disclosure will be described. In recent years, a high definition multimedia interface (HDMI) has been in widespread use as a digital interface for transmitting a video signal (image signal) and a sound signal (audio signal). HDMI is an interface having a sound transmitting function and a copyright protecting function in addition to the digital visual interface (DVI) standard, which is a standard of connection between a personal computer (PC) and a display, and is arranged for audio visual (AV) devices. The detail of the HDMI standard is described in "High-Definition Multimedia Interface Specification Version 1.4", for example.

Further, an interface of the HDMI standard is capable of performing bidirectional transmission of a control signal. Accordingly, for example, in the interface of the HDMI standard, the control signal may be transmitted from a television receiver to an output apparatus connected to the television receiver by an HDMI cable, such as a set top box (STB) or a video disc player. In this way, the control signal is transmitted by the television receiver, and thus, a user can control an entire AV system using a remote control of the television receiver. Note that the signals transmitted using a transmission cable of the HDMI standard include, in addition to control instruction for controlling the device, a response to the instruction and a signal indicating the state of the device, and those signals are each collectively referred to as control signal in this specification.

In the HDMI standard, inter-device control using consumer electronics control (CEC) is defined. The CEC is one transmission line prepared in the HDMI standard, and performs bidirectional data transmission. Using this CEC line, various controls can be performed based on unique physical and logical addresses assigned to respective devices present in an HDMI network. For example, if play-back is performed by a video disc player connected by the HDMI cable to a television receiver when a user is viewing digital broadcast on the television receiver, the television receiver is automatically switched to an input connected to the video disc player. Also, a menu displayed in the video disc player and ON/OFF of the power can be controlled by using a remote control of the television receiver.

Further, as shown in FIG. 2, when each device present in an HDMI network is recognized as a CEC-compatible device corresponding to an assigned logical address, an operation on the recognized CEC-compatible device can be performed.

In the HDMI-CEC standard, <Active Source> is defined as a CEC message to indicate the device having images displayed in the television receiver. According to the definition, for example, when a user operates a playback button of a video disc player compatible with the HDMI standard, the video disc player outputs an AV stream if the player itself is in a state (i.e., active state) of being capable of outputting stable video signals. Further, the video disc player broadcasts an <Active Source> message indicating that the video disc player is an active device.

Here, "broadcast" refers to simultaneous transmission of signals to all devices, not to a specific device. The television receiver and the other external devices that have received the broadcasted <Active Source> message switch paths to play back the AV stream output from the video disc player.

In this way, the HDMI-CEC standard defines that a device which starts displaying a video in the television receiver broadcasts an <Active Source> message to the other devices in the network. The <Active Source> message is one of CEC messages defined in the HDMI standard.

Heretofore, there has been described the HDMI standard that may be applied to the AV system according to an embodiment of the present disclosure.

<<2. Description of Embodiment>>

Subsequently, an embodiment of the present disclosure will be described. Technology according to the present disclosure may be executed in various modes.

<2-1. Configuration Example of AV System>

First, there will be described a configuration example of an AV system that may be applied to an embodiment of the present disclosure. FIG. 1 is a block diagram showing a configuration example of an AV system.

The AV system 100 includes a television receiver 200, an AV amplifier 300, and a set top box 400. The set top box 400 configures an HDMI source device. The AV amplifier 300 configures an HDMI repeater device. The television receiver 200 configures an HDMI sink device. The set top box 400 is a device which receives broadcast signals and converts the broadcast signals into signals viewable on the television receiver 200.

The television receiver 200 is a CEC-compatible device, and includes HDMI terminals 201 and 202, and an optical output terminal 203. The television receiver 200 has a configuration that can be remotely controlled by a remote control (not shown). The television receiver 200 has a function of executing a process based on an application and displaying given information, or controlling a device connected to the television receiver 200 at the HDMI terminals 201 and 202.

The set top box 400 includes an HDMI terminal 401, and is a CEC-compatible device.

The AV amplifier 300 is a CEC-compatible device, and includes HDMI terminals 301, 302, 303, and 304, and an optical input terminal 305. To the AV amplifier 300, a speaker set is provided, and it is configured such that an audio signal that is playback-processed in the AV amplifier 300 is output from the speaker set. The AV amplifier 300 and the speaker set may be connected to each other via wire or radio.

The television receiver 200 and the AV amplifier 300 are connected via an HDMI cable 701 and an optical cable 702. That is, one end of the HDMI cable 701 is connected to the HDMI terminal 201 of the television receiver 200 and the other end thereof is connected to the HDMI terminal 304 of the AV amplifier 300. One end of the optical cable 702 is connected to the optical output terminal 203 of the television receiver 200 and the other end thereof is connected to the optical input terminal 305 of the AV amplifier 300.

Further, the AV amplifier 300 and the set top box 400 are connected via an HDMI cable 703. That is, one end of the HDMI cable 703 is connected to the HDMI terminal 301 of the AV amplifier 300, and another end is connected to the HDMI terminal 401 of the set top box 400.

(Acquisition of Physical Address and Logical Address)

In the AV system 100 shown in FIG. 1, a physical address and a CEC logical address of each device are acquired, for example, as follows.

That is, when the AV amplifier 300 is connected to the television receiver 200 (the physical address is and the CEC logical address is {0}) via the HDMI cable 701, the AV amplifier 300 acquires the physical address from the television receiver 200 using an HDMI control protocol.

The CEC-compatible device is defined to acquire a logical address upon HDMI connection. The CEC-compatible device performs message transmission and reception using this logical address.

FIG. 2 is a diagram showing a table indicating a correspondence relationship between a device and a CEC logical address. A device "TV" is a device for displaying a video from a television receiver, a projector, and the like. A device "recording device" is a recording device such as a hard disk recorder or a DVD recorder. A device "tuner" is a device for receiving AV content, such as a set top box (STB) that receives a cable television broadcast. A device "playback device" is a player device such as a video player or a camcorder. A device "audio system" is an audio processing device such as an AV amplifier.

The AV amplifier 300 is a CEC-compatible device, as described above. The AV amplifier 300 decides a logical address {5} as "Audio System" based on the table of FIG. 2. In this case, the AV amplifier 300 recognizes that a device having this logical address {5} is not included in the other devices with a <Polling Message> of the CEC control protocol and then decides the logical address {5} as its logical address. The AV amplifier 300 notifies other devices such as the television receiver 200 that the device which has acquired the physical address has acquired the logical address {5} by the CEC-compatible device by means of a <Report Physical Address> of the CEC control protocol.

When the set top box 400 is connected to the AV amplifier 300 via the HDMI cable 703, the set top box 400 acquires a physical address from the AV amplifier 300 using the HDMI control protocol.

The set top box 400 is a CEC-compatible device, as described above. The set top box 400 decides logical address {3} as a "Tuner 1" based on the table of FIG. 2. In this case, the set top box 400 recognizes that a device having this logical address {3} is not included in the other devices with a <Polling Message> of the CEC control protocol and then decides the logical address {1} as its logical address. The set top box 400 notifies the television receiver 200 and the AV amplifier 300 that the device which has acquired the physical address has acquired the logical address {3} by the CEC-compatible device by means of the <Report Physical Address> of the CEC control protocol.

(Playback of Video Signal and Sound Signal)

When a program (content) tuned by a tuner of the television receiver 200 is to be viewed in the AV system 100 shown in FIG. 1, the following operation is executed. That is, an image by a video signal obtained by the tuner is displayed on a display panel (not shown) of the television receiver 200. An audio (sound) by an audio signal obtained by the tuner is output from speakers (not shown) of the television receiver 200 when the AV amplifier 300 is in a system audio mode of OFF. When the system audio mode is ON, the audio by the audio signal obtained by the tuner is output from the speaker set provided to the AV amplifier 300.

The audio signal obtained by the tuner of the television receiver 200 becomes, for example, an optical digital audio signal and is supplied to the AV amplifier 300 via the optical cable 702. Further, the ON/OFF of the system audio mode in the AV amplifier 300 may be set by a user operating a user operation section (not shown) of the AV amplifier 300 or operating a user operation section (not shown) of the television receiver 200. Alternatively, the ON/OFF of the system audio mode in the AV amplifier 300 may be set by issuing speaker switching instruction by operating the remote control (not shown) of the television receiver 200.

In the AV system 100 shown in FIG. 1, for example, when content played back from a disc in the set top box 400 or a program selected by the tuner is viewed, by performing a switching operation from the television receiver 200, an operation of a Play button of the set top box 400, and the like, the following is executed.

That is, the image by the output video signal of the set top box 400 is displayed on a display panel (not shown) of the television receiver 200. In this case, the output video signal of the set top box 400 is supplied to the television receiver 200 via the HDMI cable 703, the AV amplifier 300, and the HDMI cable 701.

When the AV amplifier 300 is in a system audio mode of OFF, the sound by the output audio signal of the set top box 400 is output from a speaker (not shown) of the television receiver 200. In this case, the output audio signal of the set top box 400 is supplied to the television receiver 200 via the HDMI cable 703, the AV amplifier 300, and the HDMI cable 701.

When the AV amplifier 300 is in the system audio mode of ON, the sound by the output audio signal of the set top box 400 is output from the speaker set provided to the AV amplifier 300. In this case, the output audio signal of the set top box 400 is supplied to the AV amplifier 300 via the HDMI cable 703.

(Configuration of Television Receiver)

Figure 3:
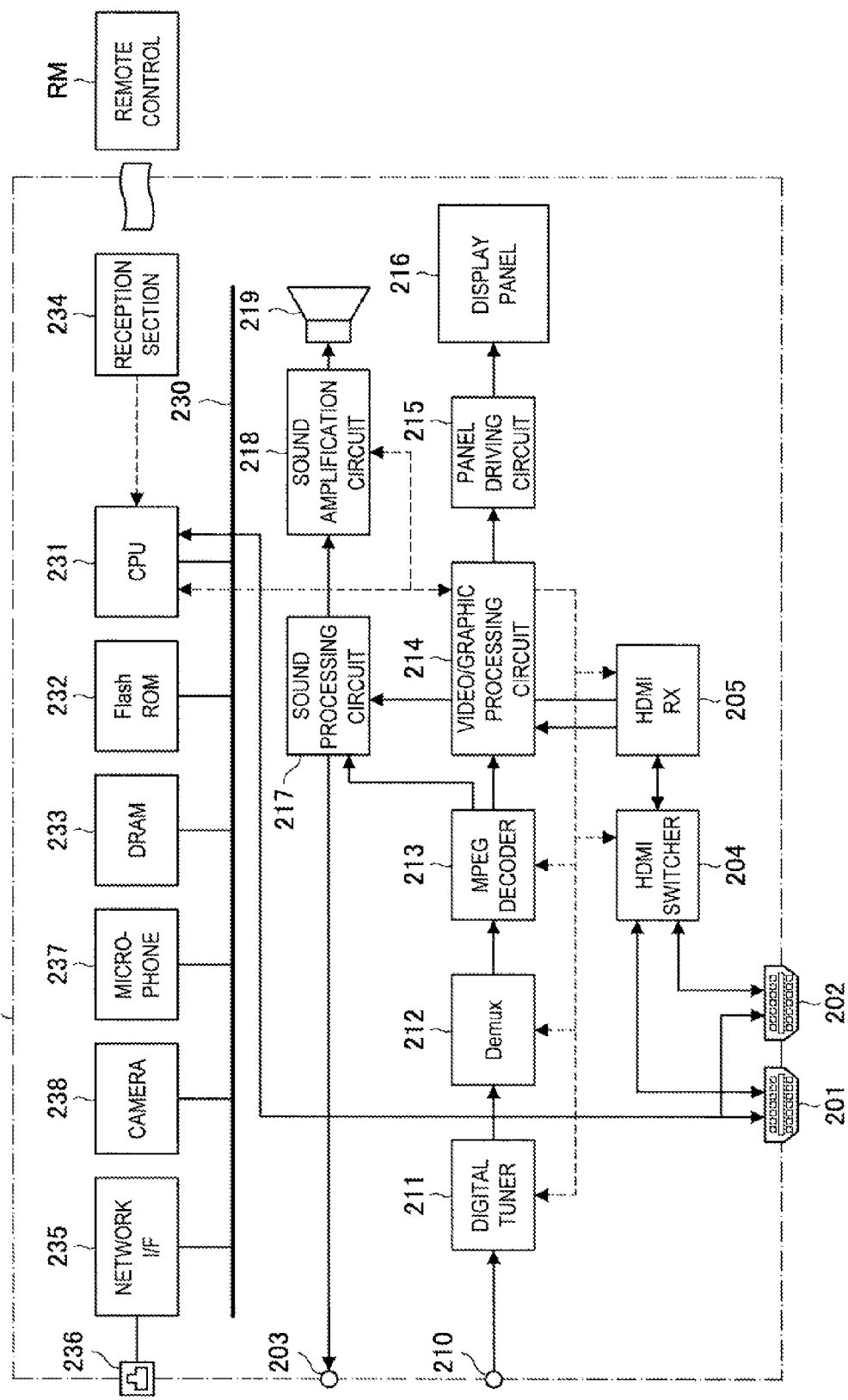
FIG. 3 is a block diagram showing a configuration example of a television receiver (sink device) that configures the AV system.

FIG. 3 is a block diagram showing a configuration example of the television receiver (sink device) 200 that configures the AV system 100. The television receiver 200 includes HDMI terminals 201 and 202, an HDMI switcher 204, an HDMI reception section 205, an antenna terminal 210, and a digital tuner 211. The television receiver 200 further includes a demultiplexer (Demux) 212, a moving picture expert group (MPEG) decoder 213, a video/graphic processing circuit 214, a panel driving circuit 215, and a display panel 216. The television receiver 200 further includes a sound processing circuit 217, a sound amplification circuit 218, and a speaker 219. The television receiver 200 further includes an internal bus 230, a central processing unit (CPU) 231, a flash ROM 232, a DRAM 233, a reception section 234, a network I/F 235, a network terminal 236, a microphone 237, and a camera 238.

The CPU 231 (control section) controls an operation of each section of the television receiver 200. The flash ROM 232 stores control software and data. The DRAM 233 configures, for example, a work area for the CPU 231. The CPU 231 develops the software and data read from the flash ROM 232 onto the DRAM 233, starts up the software, and controls each section of the television receiver 200. The CPU 231, the flash ROM 232, and the DRAM 233 are connected to the internal bus 230.

The reception section 234 receives, for example, an infrared remote control signal (remote control code) transmitted from a remote control RM and supplies the signal to the CPU 231. The user can operate the television receiver 200 and another CEC-compatible device connected to the television receiver 200 via the HDMI cable by operating the remote control RM.

The network I/F 235 connects to a network via a network cable connected to the network terminal 236, and transmits/receives data to/from each of various types of devices connected to the network.

The antenna terminal 210 is a terminal that inputs a television broadcast signal received by a reception antenna (not shown). The digital tuner 211 processes the television broadcast signal input to the antenna terminal 210, and outputs a given transport stream corresponding to a user-selected channel. The demultiplexer 212 extracts a partial transport stream (TS) (a TS packet of video data and a TS packet of audio data) corresponding to the user-selected channel from the transport stream obtained by the digital tuner 211.

The demultiplexer 212 extracts program specific information/service information (PSI/SI) from the transport stream obtained by the digital tuner 211 and outputs the PSI/SI to the CPU 231. A plurality of channels are multiplexed in the transport stream obtained by the digital tuner 211. The process in which the demultiplexer 212 extracts the partial TS of any channel from the transport stream can be performed by obtaining information of a packet ID (PID) of any channel from the PSI/SI (PAT/PMT).

The MPEG decoder 213 performs a decoding process on a video packetized elementary stream (PES) packet including the TS packet of the video data obtained by the demultiplexer 212 to obtain video data. Also, the MPEG decoder 213 performs a decoding process on an audio PES packet including the TS packet of the audio data obtained by the demultiplexer 212 to obtain audio data.

The video/graphic processing circuit 214 performs a scaling process, a graphics data superimposing process, and the like on the video data acquired by the MPEG decoder 213, as necessary. Also, the video/graphic processing circuit 214 generates image data through a process based on an application stored in the flash ROM 232 in advance, and outputs the image data to the panel driving circuit 215. The panel driving circuit 215 drives the display panel 216 based on the video data output from the video/graphic processing circuit 214. The display panel 216 includes, for example, a liquid crystal display (LCD), an organic electro-luminescence (EL), or a plasma display panel (PDP).

The sound processing circuit 217 performs a necessary process, such as D/A conversion, on the audio data obtained by the MPEG decoder 213. The sound amplification circuit 218 amplifies an analog audio signal output from the sound processing circuit 217 and supplies the resultant audio signal to the speaker 219. The sound processing circuit 217 converts the audio data obtained by the MPEG decoder 213 into a digital optical signal and outputs the digital optical signal to the optical output terminal 203.

The HDMI switcher 204 selectively connects the HDMI terminals 201 and 202 to the HDMI reception section 205. The HDMI reception section 205 is selectively connected to any of the HDMI terminals 201 and 202 via the HDMI switcher 204. This HDMI reception section 205 receives video and audio data transmitted from an external device (a source device or a repeater device) connected to the HDMI terminal 201 or 202 through communication conforming to HDMI. This HDMI reception section 205 will be described in detail later.

(Operation of Television Receiver)

Here, an operation of the television receiver 200 shown in FIG. 3 will be briefly described. The television broadcast signal input to the antenna terminal 210 is supplied to the digital tuner 211. This digital tuner 211 processes the television broadcast signal to obtain a transport stream corresponding to the user-selected channel. This transport stream is supplied to the demultiplexer 212. The demultiplexer 212 extracts a partial TS (a TS packet of video data and a TS packet of audio data) corresponding to the user-selected channel from the transport stream. This partial TS is supplied to the MPEG decoder 213.

The MPEG decoder 213 performs a decoding process on a video PES packet including the TS packet of the video data to obtain video data. The video/graphic processing circuit 214 performs a scaling process, a graphics data superimposing process and the like on the video data, as necessary, and supplies the resultant video data to the panel driving circuit 215. Accordingly, an image corresponding to the user-selected channel is displayed on the display panel 216.

The MPEG decoder 213 performs a decoding process on an audio PES packet including the TS packet of the audio data to obtain audio data. The sound processing circuit 217 performs a necessary process such as D/A conversion on the audio data, and the sound amplification circuit 218 amplifies the audio data and supplies the audio data to the speaker 219. Accordingly, an audio corresponding to the user-selected channel is output from the speaker 219.

The audio data obtained by the MPEG decoder 213 is converted into, for example, a digital optical signal conforming to the S/PDIF standard by the sound processing circuit 217, and output to the optical output terminal 203. Accordingly, the television receiver 200 can transmit the audio data to the external device via the optical cable. In the AV system 100 shown in FIG. 1, as described above, the audio data from the television receiver 200 is supplied to the AV amplifier 300 via the optical cable 702.

When the AV amplifier 300 is in a system audio mode of ON, an audio by the audio data from the television receiver 200 is output from the speaker set provided to the AV amplifier 300. In this case, the sound amplification circuit 218 enters a mute ON state under control of the CPU 231, and the audio is not output from the speaker 219 of the television receiver 200.

In the HDMI reception section 205, video and audio data input to the HDMI terminal 201 or 202 via the HDMI cable is obtained. The video data is supplied to the video/graphic processing circuit 214. The audio data is supplied to the sound processing circuit 217. A subsequent operation is the same as that upon reception of the above-described television broadcast signal, the image is displayed on the display panel 216, and the audio is output from the speaker 219.

In the AV system 100 shown in FIG. 1, for example, when an image and an audio by video data and audio data from the set top box 400 are watched and listened to, the state becomes a state in which an image and an audio by the video data and the audio data acquired by the HDMI reception section 205, as described above, are watched and listened to.

Even in this case, when the AV amplifier 300 is in a system audio mode of ON, the audio by the audio data is output from the speaker set provided to the AV amplifier 300, and the sound amplification circuit 218 of the television receiver 200 enters a mute ON state, such that the audio is not output from the television receiver 200.

(Configuration of AV Amplifier)

Figure 4:
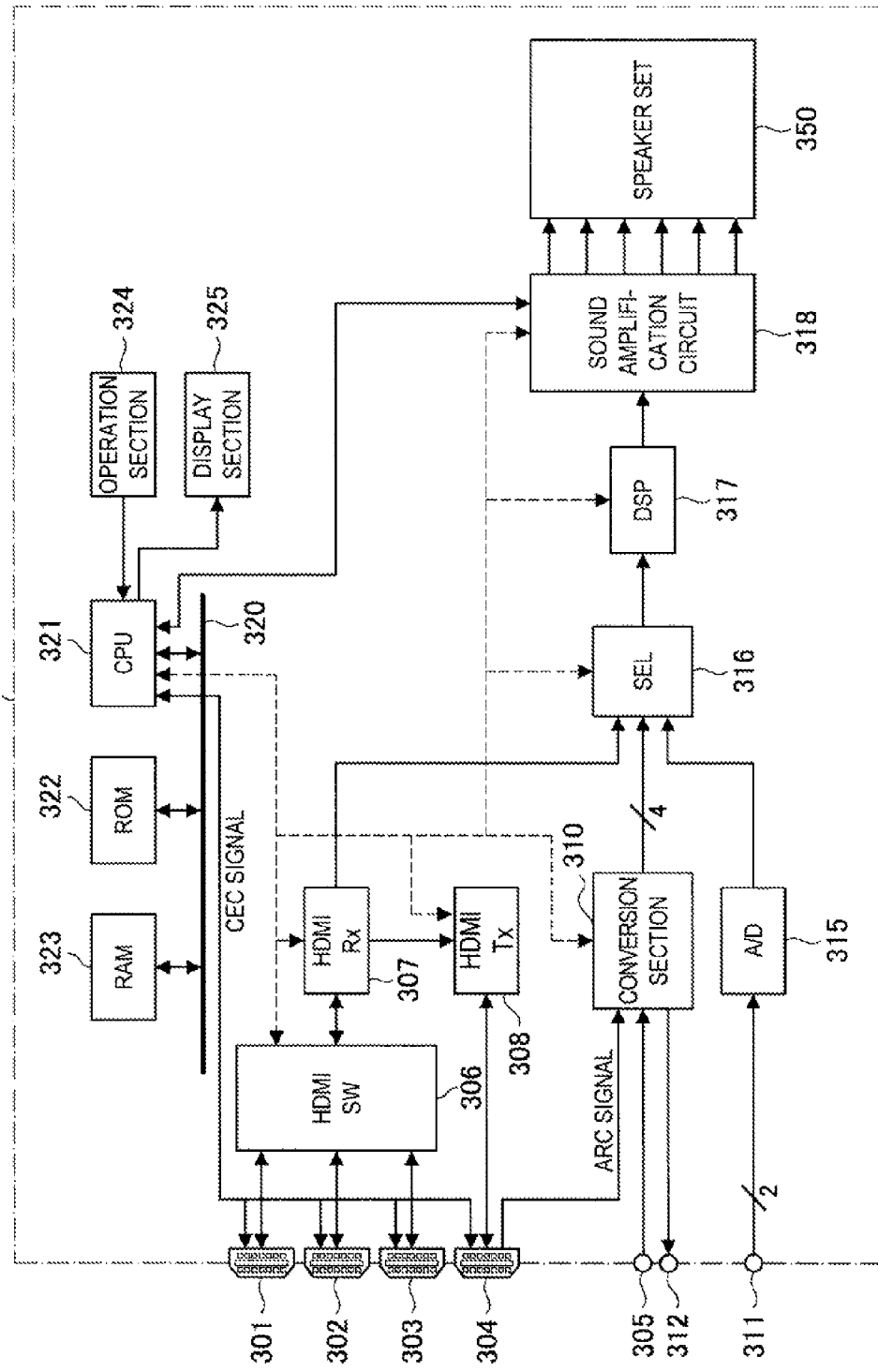
FIG. 4 is a block diagram showing a configuration example of an AV amplifier that configures the AV system.

FIG. 4 is a block diagram showing a configuration example of the AV amplifier 300 that configures the AV system 100. The AV amplifier 300 includes HDMI terminals 301 to 304, an optical input terminal 305, an HDMI switcher 306, an HDMI reception section 307, an HDMI transmission section 308, and a conversion section 310. Further, the AV amplifier 300 includes an analog audio input terminal 311, an A/D converter 315, a selector 316, and a digital signal processor (DSP) 317. Still further, the AV amplifier 300 includes a sound amplification circuit 318, an internal bus 320, a CPU 321, ROM 322, and RAM 323.

The CPU 321 (control section) controls operation of each section of the AV amplifier 300. The ROM 322 stores control software and data. The RAM 323 configures, for example, a work area of the CPU 321. The CPU 321 develops the software or data read from the ROM 322 onto the RAM 323 to start up the software and control each section of the AV amplifier 300. The CPU 321, the ROM 322, and the RAM 323 are connected to the internal bus 320. The CPU 321, the ROM 322, and the RAM 323 may be a microcomputer of one chip (one chip microcomputer).

An operation section 324 and a display section 325 are connected to the CPU 321. The operation section 324 and the display section 325 configure a user interface. Using the operation section 324, the user can perform selection of an output audio of the AV amplifier 300, an operation setting, and the like. The user can set the system audio mode to ON/OFF using the operation section 324. Further, the CPU 321 can transmit/receive a CEC signal to/from an external device connected to the HDMI terminals 301 to 304. For example, the CEC signal may be transmitted/received via a CEC line, which will be described later. The CEC signal may function as the above-mentioned control signal.

This operation section 324 includes keys, buttons, a dial, a remote control signal transmission/reception section, and the like disposed on a casing, which is not shown, of the AV amplifier 300. The display section 325 displays an operation status of the AV amplifier 300, a user operation state, and the like, and includes a fluorescent display tube, a liquid crystal display (LCD), or the like.

The optical input terminal 305 is a terminal that inputs a digital optical signal via the optical cable. An optical output terminal 312 is a terminal that outputs a digital optical signal via the optical cable.

The conversion section 310 generates a clock LRCK having the same frequency (e.g., 48 kHz) as a sampling frequency of an audio signal, a master clock MCK that is, for example, 512 or 256 times the sampling frequency, left and right 24-bit audio data LDATA and RDATA occurring every period of the clock LRCK, and a bit clock BCK synchronized with each bit of the data, from the digital optical signal input to the optical input terminal 305, and supplies them to the selector 316.

Further, the conversion section 310 transmits, from the optical output terminal 312, the digital optical signal input to the optical input terminal 305. Further, the conversion section 310 can supply an audio return channel (ARC) signal out of the signals transmitted from an external device connected to the HDMI terminal 304 to the selector 316. The description on the ARC signal will be made in detail later, and audio data can be received using the ARC signal. The ARC signal may be transmitted/received using a reserved line which will be described later, for example.

The analog audio input terminal 311 is a terminal that inputs left and right analog audio signals obtained in the external device. The A/D converter 315 converts the analog audio signal input by the analog audio input terminal 311 into digital audio data and supplies the digital audio data to the selector 316.

The HDMI switcher 306 selectively connects the HDMI terminals 301 to 303 to the HDMI reception section 307. The HDMI reception section 307 is selectively connected to any of the HDMI terminals 301 to 303 via the HDMI switcher 306. This HDMI reception section 307 receives video and audio data transmitted in one direction from external devices (source devices) connected to the HDMI terminals 301 to 303 through communication conforming to HDMI.

The HDMI reception section 307 supplies the audio data to the selector 316, and supplies the video and audio data to the HDMI transmission section 308. The HDMI transmission section 308 transmits, from the HDMI terminal 304, the baseband video and audio data supplied from the HDMI reception section 307 through the communication conforming to HDMI. Thus, the AV amplifier 300 has a repeater function. The HDMI reception section 307 and the HDMI transmission section 308 will be described in detail later.

The selector 316 selectively extracts the audio data supplied from the HDMI reception section 307, the audio data supplied from the conversion section 310, or the audio data supplied from the A/D converter 315, and supplies the audio data to the DSP 317.

The DSP 317 processes the audio data obtained by the selector 316, and performs an equalization process for adjusting a volume for each frequency band, a sound image localization process for setting a localization position of a sound image, and the like.

The sound amplification circuit 318 converts the audio data output from the DSP 317 into an analog signal, and outputs the analog signal to the speaker set 350. Further, the sound amplification circuit 318 outputs various types of signals for controlling the speaker set 350, which are output from the CPU 321, to the speaker set 350. Further, when receiving the analog signal from the speaker set 350, the sound amplification circuit 318 converts the received analog signal into a digital signal, and outputs the digital signal obtained by the conversion to the CPU 321.

(Operation of AV Amplifier)

Here, an operation of the AV amplifier 300 shown in FIG. 4 will be briefly described. In the HDMI reception section 307, the baseband video and audio data input to the HDMI terminals 301 to 303 via the HDMI cable is obtained. This video and audio data is supplied to the HDMI transmission section 308 and transmitted to the HDMI cable connected to the HDMI terminal 304.

Further, the audio data obtained in the HDMI reception section 307 is supplied to the selector 316. In the selector 316, the audio data supplied from the HDMI reception section 307, the audio data supplied from the conversion section 310, or the audio data supplied from the A/D converter 315 is selectively extracted and supplied to the DSP 317.

In the DSP 317, a necessary process is performed on the audio data, such as an equalization process for adjusting a volume for each frequency band or a sound image localization process for setting a localization position of a sound image. The audio signal of each channel output from the DSP 317 is output by the speaker set 350.

For example, in the AV system 100 shown in FIG. 1, when the program tuned by the digital tuner 211 of the television receiver 200 is viewed and the AV amplifier 300 is in a system audio mode of ON, the following operation is performed. That is, the selector 316 extracts the audio data from the conversion section 310. Accordingly, the audio signals of the respective channels according to the audio data of the program tuned by the digital tuner 211 of the television receiver 200 are output to the sound amplification circuit 318. Thus, the audio of the program tuned by the digital tuner 211 of the television receiver 200 is output from the speaker set 350.

When the program tuned by the digital tuner 211 of the television receiver 200 is viewed and the AV amplifier 300 is in the system audio mode of OFF, the sound amplification circuit 318 enters a mute ON state. Accordingly, the audio signal is not supplied from the sound amplification circuit 318 to the speaker set 350. Note that, when the sound amplification circuit 318 is in the mute ON state, in addition to that the sound amplification circuit 318 is in the mute ON state, the DSP 317 may also enter a mute ON state. In addition, a component other than the DSP 317 and the sound amplification circuit 318 may be in the mute ON state. The same applies hereinafter.

For example, in the AV system 100 shown in FIG. 1, when an image and an audio by the video data and the audio data from the set top box 400 are watched and listened to and the AV amplifier 300 is in the system audio mode of ON, the following operation is performed. That is, the HDMI terminal 301 is connected to the HDMI reception section 307 via the HDMI switcher 306. Further, in the selector 316, the audio data from the HDMI reception section 307 is extracted. Accordingly, the audio signals of the respective channels according to the audio data from the set top box 400 are output to the sound amplification circuit 318. Thus, the audio by the audio data from the set top box 400 is output from the speaker set 350.

Note that, when the image and the audio by the video data and the audio data from the set top box 400 are to be watched and listened to and the AV amplifier 300 is in the system audio mode of OFF, the sound amplification circuit 318 enters a mute ON state, and the audio signal is not supplied from the sound amplification circuit 318 to the speaker set 350.

(Configuration of Set Top Box)

Figure 5:
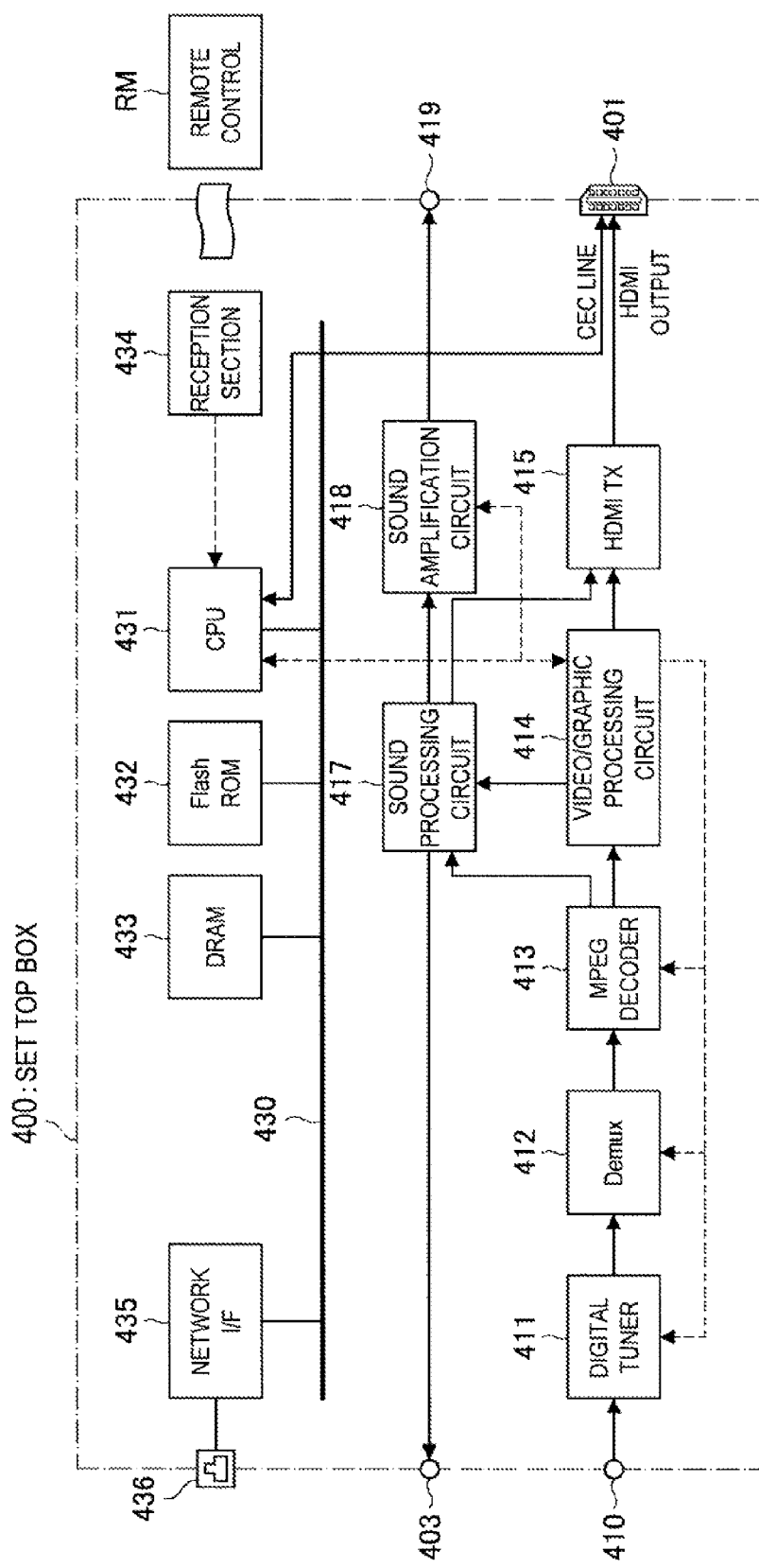
FIG. 5 is a block diagram showing a configuration example of a set-top box (source device) that configures the AV system.

FIG. 5 is a block diagram showing a configuration example of the set top box (source device) 400. The set top box 400 includes an HDMI terminal 401, an optical output terminal 403, an antenna terminal 410, and a digital tuner 411. Further, the set top box 400 includes a demultiplexer (Demux) 412, a moving picture expert group (MPEG) decoder 413, a video/graphic processing circuit 414, and an HDMI transmission section 415. The set top box 400 further includes a sound processing circuit 417, a sound amplification circuit 418, and an analog sound output terminal 419. Still further, the set top box 400 includes an internal bus 430, a central processing unit (CPU) 431, flash ROM 432, DRAM 433, a reception section 434, a network I/F 435, and a network terminal 436.

The CPU 431 controls an operation of each section of the set top box 400. The flash ROM 432 stores control software and data. The DRAM 433 configures, for example, a work area for the CPU 431. The CPU 431 develops the software and data read from the flash ROM 432 onto the DRAM 433, starts up the software, and controls each section of the set top box 400. The CPU 431, the flash ROM 432, and the DRAM 433 are connected to the internal bus 430.

The reception section 434 receives, for example, an infrared remote control signal (remote control code) transmitted from a remote control RM and supplies the signal to the CPU 431. The user can operate the set top box 400 and another CEC-compatible device connected to the set top box 400 via the HDMI cable by operating the remote control RM.

The network I/F 435 connects to a network via a network cable connected to the network terminal 436, and transmits/receives data to/from each of various types of devices connected to the network.

The antenna terminal 410 is a terminal that inputs a television broadcast signal received by a reception antenna (not shown). The digital tuner 411 processes the television broadcast signal input to the antenna terminal 410, and outputs a given transport stream corresponding to a user-selected channel. The demultiplexer 412 extracts a partial transport stream (TS) (a TS packet of video data and a TS packet of audio data) corresponding to the user-selected channel from the transport stream obtained by the digital tuner 411.

The demultiplexer 412 extracts program specific information/service information (PSI/SI) from the transport stream obtained by the digital tuner 411 and outputs the PSI/SI to the CPU 431. A plurality of channels are multiplexed in the transport stream obtained by the digital tuner 411. The process in which the demultiplexer 412 extracts the partial TS of any channel from the transport stream can be performed by obtaining information of a packet ID (PID) of any channel from the PSI/SI (PAT/PMT).

The MPEG decoder 413 performs a decoding process on a video packetized elementary stream (PES) packet including the TS packet of the video data obtained by the demultiplexer 412 to obtain video data. Also, the MPEG decoder 413 performs a decoding process on an audio PES packet including the TS packet of the audio data obtained by the demultiplexer 412 to obtain audio data.

The video/graphic processing circuit 414 performs a scaling process, a graphics data superimposing process, and the like on the video data acquired by the MPEG decoder 413, as necessary. Also, the video/graphic processing circuit 414 generates image data through a process based on an application stored in the flash ROM 432 in advance, and outputs the image data to the HDMI transmission section 415. The HDMI transmission section 415 outputs the video data from the video/graphic processing circuit 414 to the AV amplifier 300 through the HDMI terminal 401.

The sound processing circuit 417 performs a necessary process, such as D/A conversion, on the audio data obtained by the MPEG decoder 413. The sound amplification circuit 418 amplifies an analog audio signal output from the sound processing circuit 417 and supplies the AV amplifier 300 with the amplified analog audio signal through the analog sound output terminal 419.

(Operation of Set Top Box)

Here, an operation of the set top box 400 shown in FIG. 5 will be briefly described. The television broadcast signal input to the antenna terminal 410 is supplied to the digital tuner 411. This digital tuner 411 processes the television broadcast signal to obtain a transport stream corresponding to the user-selected channel. This transport stream is supplied to the demultiplexer 412. The demultiplexer 412 extracts a partial TS (a TS packet of video data and a TS packet of audio data) corresponding to the user-selected channel from the transport stream. This partial TS is supplied to the MPEG decoder 413.

The MPEG decoder 413 performs a decoding process on a video PES packet including the TS packet of the video data to obtain video data. The video/graphic processing circuit 414 performs a scaling process, a graphics data superimposing process and the like on the video data, as necessary, and supplies the resultant video data to the HDMI transmission section 415. The video data is then output to the AV amplifier 300 from the HDMI transmission section 415 through the HDMI terminal 401. Accordingly, a video corresponding to the user-selected channel is output from the HDMI terminal 401.

The MPEG decoder 413 performs a decoding process on an audio PES packet including the TS packet of the audio data to obtain audio data. The sound processing circuit 417 performs a necessary process such as D/A conversion on the audio data, and the sound amplification circuit 418 amplifies the audio data and supplies the audio data to the analog sound output terminal 419. Accordingly, an audio corresponding to the user-selected channel is output from the analog sound output terminal 419.

The audio data obtained by the MPEG decoder 413 is converted into, for example, a digital optical signal conforming to the S/PDIF standard by the sound processing circuit 417, and output to the optical output terminal 403. Accordingly, the set top box 400 can transmit the audio data to the external device via the optical cable.

(Detail of HDMI Communication)

Figure 6:
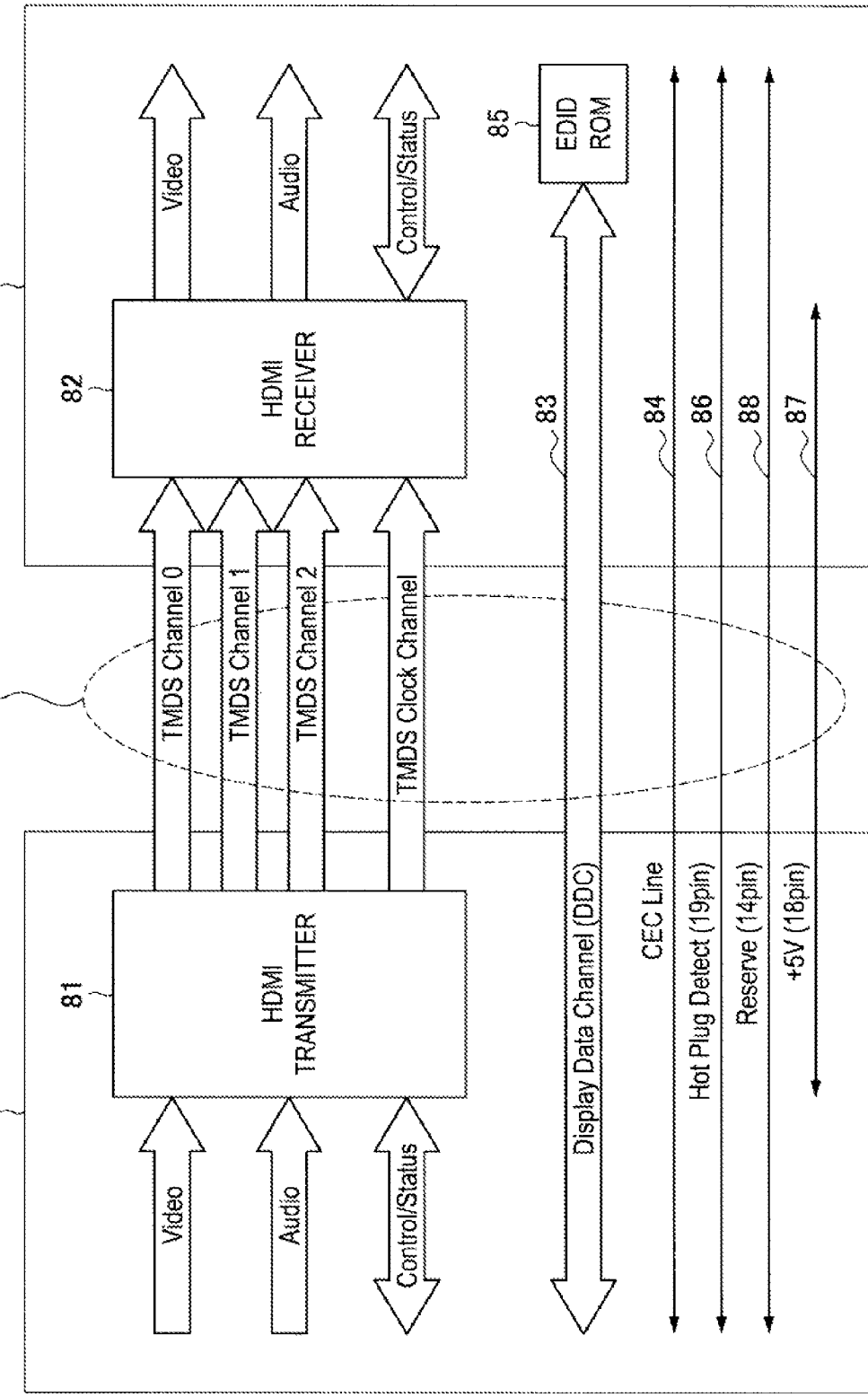
FIG. 6 is a block diagram showing a configuration example of an HDMI transmission section (HDMI source) and an HDMI reception section (HDMI sink)

FIG. 6 is a block diagram showing a configuration example of an HDMI transmission section (HDMI transmission section 308) and an HDMI reception section (HDMI reception section 307).

The HDMI transmission section (HDMI source) performs transmission in one unit in a valid image period (hereinafter, referred to as an active video period as appropriate) that is a period obtained by excluding a horizontal blanking period and a vertical blanking period from a period from one vertical synchronization signal to a next vertical synchronization signal. That is, in the active video period, the HDMI transmission section transmits, in one direction, a differential signal corresponding to non-compressed image pixel data corresponding to one screen to the HDMI reception section (HDMI sink) via a plurality of channels. In the horizontal blanking period or the vertical blanking period, the HDMI transmission section transmits, in one direction, a differential signal corresponding to at least the audio data associated with the image, control data, other auxiliary data, and the like to the HDMI reception section via a plurality of channels.

The HDMI transmission section includes a transmitter 81. The transmitter 81 converts, for example, non-compressed image pixel data into a corresponding differential signal, and serially transmits, in one direction, the differential signal to the HDMI reception section connected via the HDMI cable, via a plurality of channels, i.e., three TMDS channels #0, #1, and #2.

The transmitter 81 converts audio data associated with non-compressed image, necessary control data, other auxiliary data, and the like into a corresponding differential signal. The transmitter 81 serially transmits, in one direction, the differential signal to the HDMI reception section connected via the HDMI cable, via three TMDS channels #0, #1, and #2.

The transmitter 81 transmits the pixel clock synchronized to the pixel data transmitted via three TMDS channels #0, #1, and #2 to the HDMI reception section connected via the HDMI cable via the TMDS clock channel. Here, via one TMDS channel #i (i=0, 1, 2), 10-bit pixel data is transmitted during one clock of the pixel clock.

The HDMI reception section, in an active video period, receives a differential signal corresponding to the pixel data that is transmitted in one direction from the HDMI transmission section via a plurality of channels. Further, the HDMI reception section, in the horizontal blanking period or the vertical blanking period, receives a differential signal corresponding to audio data or control data that is transmitted in one direction from the HDMI transmission section via a plurality of channels.

That is, the HDMI reception section includes a receiver 82. The receiver 82 receives a differential signal corresponding to the pixel data and a differential signal corresponding to the audio data or the control data transmitted in one direction from the HDMI transmission section via the TMDS channels #0, #1, and #2. In this case, the receiver 82 receives in synchronization with the pixel clock transmitted from the HDMI transmission section via the TMDS clock channel.

The transmission channels of the HDMI system include three TMDS channels #0 to #2 as transmission channels for serially transmitting pixel data and audio data, and a TMDS clock channel as a transmission channel that transmits a pixel clock. Further, there is a transmission channel called a display data channel (DDC) 83 or a CEC line 84.

The DDC 83 is used for the HDMI transmission section to read enhanced extended display identification data (E-EDID) from the HDMI reception section connected via the HDMI cable. The DDC 83 includes two signal lines, not shown, included in the HDMI cable.

That is, the HDMI reception section includes an EDID ROM 85, in addition to the HDMI receiver 82. The EDID ROM 85 stores an E-EDID that is performance information about its performance (configuration/capability). The HDMI transmission section reads, from the HDMI reception section connected via the HDMI cable, the E-EDID of the HDMI reception section via the DDC 83. Based on the read E-EDID, the HDMI transmission section recognizes, for example, a format (profile) of an image to which an electronic device having the HDMI reception section corresponds, such as RGB, YCbCr4:4:4, YCbCr4:2:2, and the like.

The CEC line 84 includes one signal line, which is not shown, included in the HDMI cable, and is used to perform bidirectional communication of control data between the HDMI transmission section and the HDMI reception section. The bidirectional communication is performed in time division.

A line 86 connected to a pin called a hot plug detect (HPD) is included in the HDMI cable. A source device can detect a connection of a sink device using the line 86. Further, the HDMI cable includes a line 87 used to supply power from the source device to the sink device. In addition, the HDMI cable also includes a reserved line 88.

Figure 7:
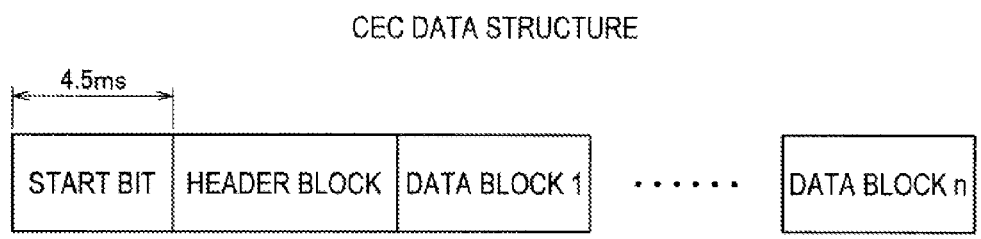
FIG. 7 is a diagram showing a block configuration of data transmitted through a CEC line (CEC channel)

FIG. 7 is a diagram showing a block configuration of data transmitted through a CEC line (CEC channel). In data transmission initiation, a start bit is arranged, a header block is arranged, and then any number (n) of data blocks including data to be actually transmitted are arranged.

Figure 8:
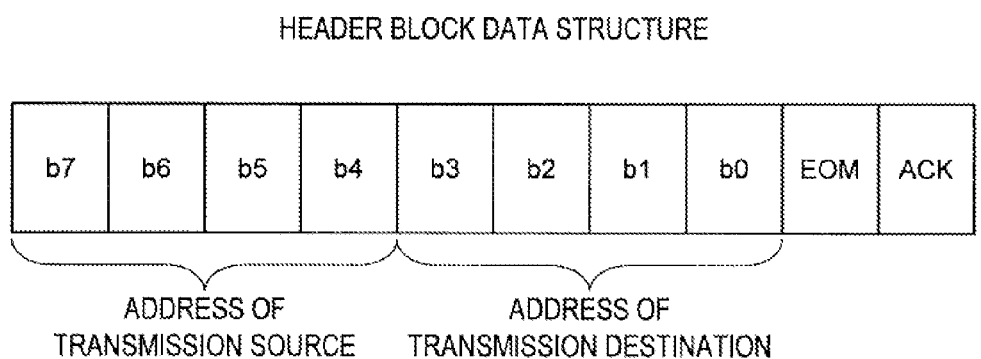
FIG. 8 is a diagram showing an example of data structure of a header block.

FIG. 8 is a diagram showing an example of data structure of a header block. A logical address (source address) of a transmission source and a logical address (sink address) of a transmission destination are arranged in the header block. The logical address of a transmission source corresponds to an initiator, and the logical address of a transmission destination corresponds to a destination.

The CEC message has a structure in which a maximum of sixteen pieces of 10-bit data are connected. Among the 10 bits, last 2 bits include an EOM bit indicating that it is a last bit, and an ACK bit indicating that the message is recognized, as shown in FIG. 8. Accordingly, hereinafter, first 8 bits of the 10-bit data are treated as one byte.

A first one byte of the CEC command includes 4 bits in which a logical address of a command transmission source is stored, and 4 bits in which a logical address of a command transmission destination is stored. As shown in FIG. 2, the television receiver 200, generally, has a logical address designated as 0 and the AV amplifier 300 has a logical address designated as 5. Further, command transmission methods include broadcast by which transmission is performed from one device to all devices, and unicast by which transmission is performed from one device to a device having a specific logical address.

Heretofore, there has been described the configuration example of the AV system 100 that may be applied an embodiment of the present disclosure.

<2-2. Configuration Example of Communication System>

Figure 9:
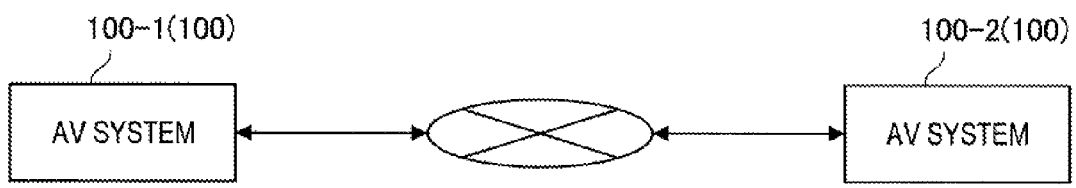
FIG. 9 is a diagram showing an overall configuration example of a communication system.

Subsequently, an overall configuration of a communication system according to an embodiment of the present disclosure will be described. FIG. 9 is a diagram showing an overall configuration example of a communication system according to an embodiment of the present disclosure. As shown in FIG. 9, the communication system according to an embodiment of the present disclosure is configured such that an AV system 100-1 and an AV system 100-2 are communicable with each other through a network. In more detail, the communication system according to an embodiment of the present disclosure is configured such that a television receiver 200 (audio device) in the AV system 100-1 and a television receiver 200 (communication partner device) in the AV system 100-2 are communicable with each other through a network. In the following description, let us assume that the AV system 100-1 is used by a user himself/herself and the AV system 100-2 is used by a partner whom the user is having a conversation with.

Figure 10:
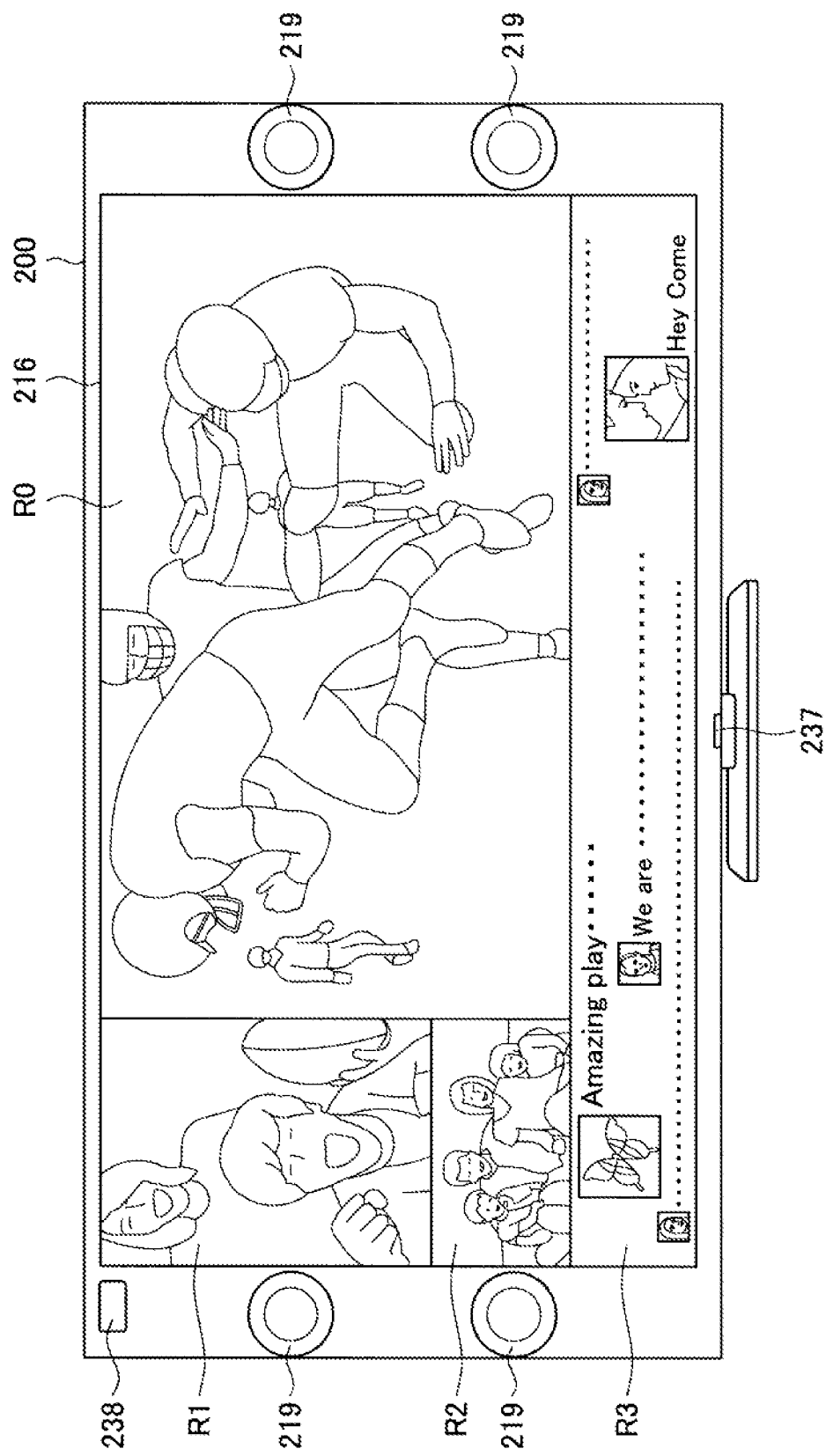
FIG. 10 is a diagram showing a layout example of a screen displayed on a display panel by a television receiver.

FIG. 10 is a diagram showing a layout example of a screen displayed on the display panel 216 by the television receiver 200 in the AV system 100 according to an embodiment of the present disclosure. Referring to FIG. 10, the display panel 216 of the television receiver 200 displays a TV screen R0, a partner display screen R1, an own display screen R2, and an SNS screen R3. The TV screen R0 may display a video corresponding to a broadcast signal input from the antenna terminal 210, or may display a video corresponding to a broadcast signal input from the set top box 400 through the AV amplifier 300 (audio device). Note that the displaying of the screen as shown in FIG. 10 may be triggered by a button-pressing operation performed by the user.

For example, the user himself/herself who is viewing the screen displayed by the television receiver 200 of the AV system 100-1 is shot by the camera 238 included in the television receiver 200. The video shot by the camera 238 is displayed as the own display screen R2, and is also transmitted to the television receiver 200 of the AV system 100-2 that the partner uses through the network terminal 236. Further, a video of the partner transmitted from the AV system 100-2 that the partner uses is displayed as the partner display screen R1. In the same manner, the television receiver 200 of the AV system 100-2 may also display the screen as shown in FIG. 10.

Further, the user can have a conversation with the partner while viewing the TV screen R0 (or, the partner display screen R1, the own display screen R2, or the SNS screen R3). To be specific, a sound that the partner uttered (hereinafter, also referred to as "telephonic communication destination sound") is detected by the microphone 237 included in the television receiver 200 of the AV system 100-2 that the partner uses, and is transmitted by the network I/F 235 through the network terminal 236. The television receiver 200 of the AV system 100-1 receives the telephonic communication destination sound by the network I/F 235 through the network terminal 236.

In the television receiver 200 of the AV system 100-1, the sound processing circuit 217 adds, in accordance with the control performed by the CPU 231, the telephonic communication destination sound to audio (hereinafter, also referred to as "TV sound") extracted from the broadcast signal, and outputs the telephonic communication destination sound-added TV sound from the speaker 219 through the sound amplification circuit 218. The user using the AV system 100-1 can utter a sound while listening to the telephonic communication destination sound and the TV sound. The sound uttered by the user is detected by the microphone 237, and is transmitted to the television receiver 200 of the AV system 100-2 by the network I/F 235 through the network terminal 236.

However, the telephonic communication destination sound and the TV sound output from the speaker 219 may also propagate and detected by the microphone 237. As a result, the telephonic communication destination sound and the TV sound go and come back between the AV system 100-1 and AV system 100-2 while being attenuated and causing a delay time, which may cause a phenomenon that the sound to which an echo is added may be output from the television receiver 200 and it becomes difficult to carry out a conversation comfortably with the partner. Accordingly, the present description mainly suggests technology capable of making a conversation carried out with the partner while listening to the TV sound more comfortable.

To be specific, in accordance with the control performed by the CPU 231, the sound processing circuit 217 performs processing (hereinafter, "echo cancellation processing") of eliminating a given sound signal (hereinafter, also referred to as "echo") from a microphone detection signal which is the audio signal that is propagated and detected by the microphone 237, and generates an elimination signal (hereinafter, also referred to as "echo-eliminated signal") obtained by eliminating the given sound signal. The CPU 231 causes the television receiver 200 of the AV system 100-2 to output the generated echo-eliminated signal.

Through such processing, the possibility that the sound to which an echo is added is output is reduced, and the conversation carried out with the partner while listening to the TV sound can be made more comfortable. The audio signal including the TV sound and the telephonic communication destination sound may be output from the speaker 219 of the television receiver 200, and may also be output from the speaker set 350 of the AV amplifier 300. First, the case where the audio signal including the TV sound and the telephonic communication destination sound is output from the speaker 219 of the television receiver 200 (hereinafter, also simply referred to as "case of a single TV") will be described.

Figure 11:
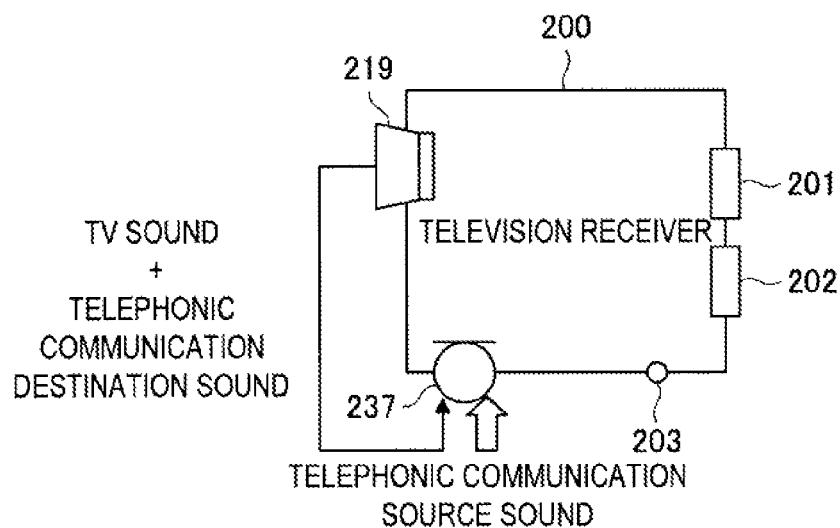
FIG. 11 is a diagram showing a flow of a sound in a case of a single TV.

FIG. 11 is a diagram showing a flow of a sound in a case of a single TV. As shown in FIG. 11, the CPU 231 may output the audio signal including the TV sound and the telephonic communication destination sound from the speaker 219 of the television receiver 200. In such a case, as shown in FIG. 11, the TV sound and the telephonic communication destination sound that are output may propagate and may be detected by the microphone 237 together with the sound uttered by the user. Accordingly, the sound processing circuit 217 performs the echo cancellation processing and generates the echo-eliminated signal, and the CPU 231 may cause the television receiver 200 of the AV system 100-2 to output the echo-eliminated signal. Hereinafter, description will be continued on the echo cancellation processing.

Figure 12:
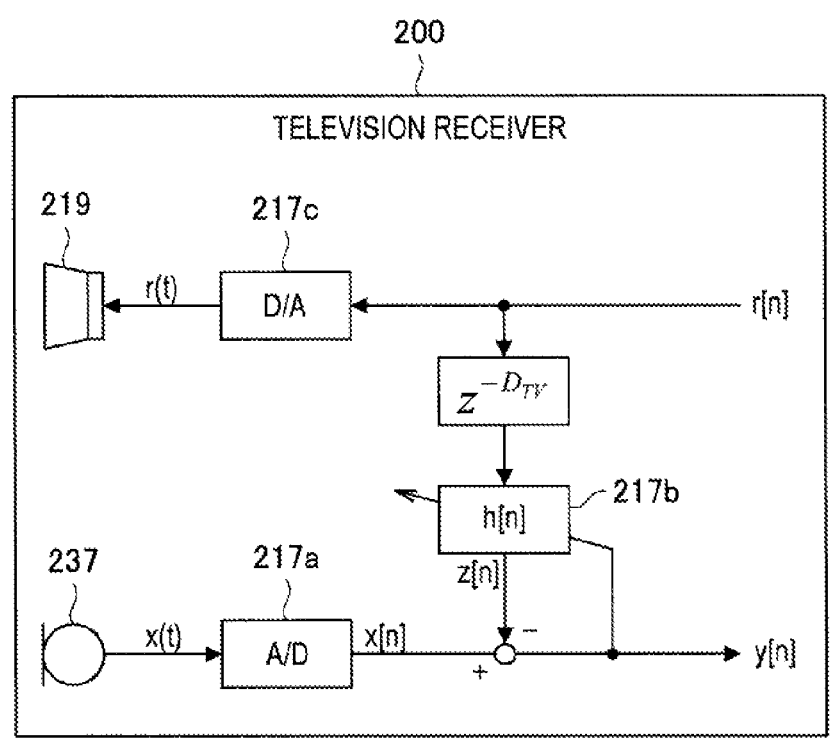
FIG. 12 is a diagram illustrating a configuration related to echo cancellation processing in a case of the single TV.

FIG. 12 is a diagram illustrating a configuration related to echo cancellation processing in a case of the single TV. As shown in FIG. 12, the television receiver 200 includes, as for the configuration related to the echo cancellation processing, the speaker 219, an A/D conversion section 217a, an adaptive filter 217b, a D/A conversion section 217c, and the microphone 237. Further, the variables shown in FIG. 12 and equations are described as follows.

$r[n]$: audio signal (digital signal)

$x[n]$: microphone detection signal (digital signal)

$z[n]$: echo estimation signal $y[n]$: echo-eliminated signal $h[n]$: adaptive filter ceofficient $r(t)$: audio signal (analog signal)

$x(t)$: microphone detection signal (analog signal)

$h[n] = (h[0], h[1], \ldots, h[N-1])$ $$z[n] = \sum_{i=0}^{N-1} r[n-i] \cdot h[i]$$

$$y[n] = x[n] - z[n]$$

$$h[n] = \underset{h}{\mathrm{argmin}} E\left[\left\|x[n] - \sum_{i=0}^{N-1} r[n-i] \cdot h[i]\right\|^2\right]$$

The microphone detection signal obtained by detection by the microphone 237 is converted into a digital signal in the A/D conversion section 217a and is output to an adder. On the other hand, the audio signal including the TV sound and the telephonic communication destination sound is output to the adaptive filter 217b, and is also converted into an analog signal in the D/A conversion section 217c and is output from the speaker 219. The audio signal output to the adaptive filter 217b causes a delay time $D_{TV}$. The reason for causing the delay time $D_{TV}$ is that a delay occurs for the audio signal to leave the speaker 219 and to enter the microphone 237. Note that the delay time $D_{TV}$ is roughly classified into a system delay that occurs inside the system and a propagation delay that occurs outside the system.

In the adaptive filter 217b, an echo estimation signal (given sound signal) is calculated and is output to the adder. The adaptive filter coefficient used for the calculation performed by the adaptive filter 217b may be learned by a given adaptive signal processing algorithm. The type of the adaptive signal processing algorithm is not particularly limited, and may be a least mean square (LMS) method and a learning identification method. In the adder, the echo estimation signal is subtracted from the microphone detection signal to thereby calculate the echo-eliminated signal.

Figure 13:
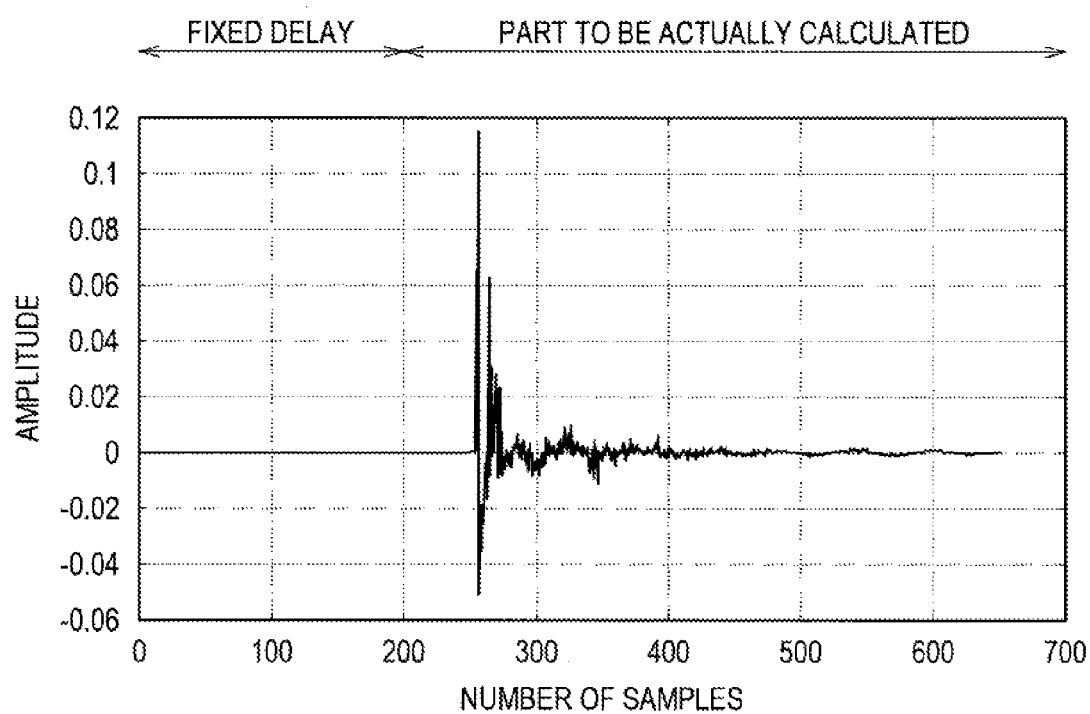
FIG. 13 is a diagram showing an example of an adaptive filter coefficient obtained by learning.

Here, an example of calculation of the adaptive filter coefficient will be described. FIG. 13 is a diagram showing an example of an adaptive filter coefficient obtained by learning. Referring to FIG. 13, in the adaptive filter coefficient, there is a zero signal section before a significant waveform. The reason for the zero signal section being present is that a delay occurs for the played back audio signal to leave the speaker to enter the microphone.

If an adaptive filter of an infinite length can be used, the adaptive filter can be applied to any delay. However, as shown in FIG. 13, since the length of the adaptive filter is actually finite, it is desirable that the fixed delay part be achieved by a delay buffer and be excluded from the target of the calculation of the adaptive filter coefficient from the viewpoint of calculation cost. For the fixed delay part, a value less than the value of the sum of the system delay and the propagation delay may be used.

Figure 14:
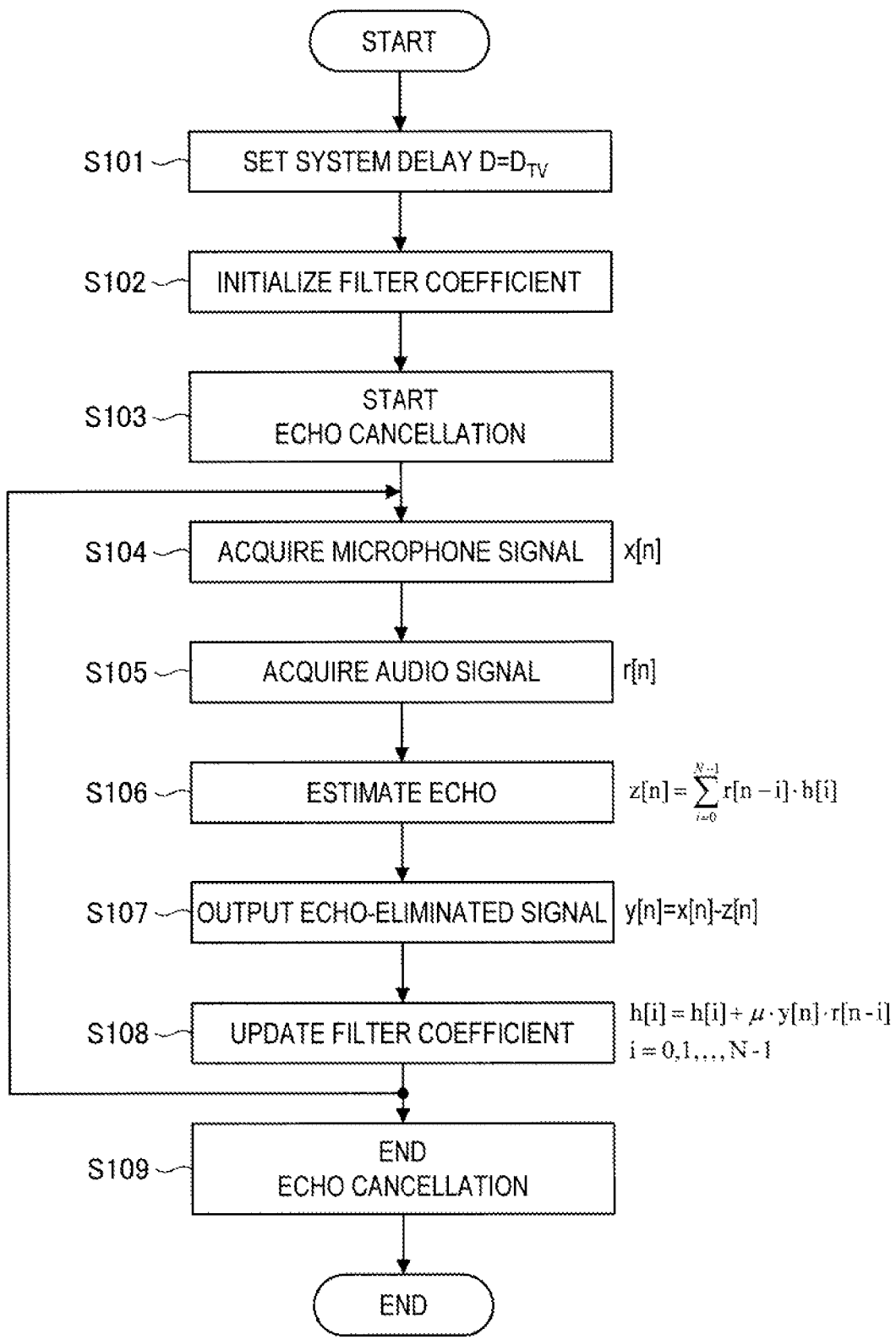
FIG. 14 is a flowchart showing a flow of an operation of the echo cancellation processing in the case of the single TV.

Subsequently, a flow of an operation of the echo cancellation processing in the case of the single TV will be described. FIG. 14 is a flowchart showing a flow of an operation of the echo cancellation processing in the case of the single TV. First, in the television receiver 200, the CPU 231 sets the system delay (set system delay D to delay time $D_{TV}$) (Step S101), and initializes a filter coefficient (Step S102). Subsequently, the CPU 231 starts the echo cancellation (Step S103).

When the echo cancellation starts, the adaptive filter 217b acquires the microphone detection signal obtained by detection by the microphone 237 (Step S104), and also acquires the audio signal including the TV sound and the telephonic communication destination sound (Step S105). Subsequently, the adaptive filter 217b performs echo estimation (generates an echo estimation signal) (Step S106), and the adder eliminates the echo estimation signal from the microphone detection signal to thereby generate the echo-eliminated signal, and outputs the generated echo-eliminated signal (Step S107). Further, the CPU 231 updates the filter coefficient (Step S108), and, in the case where the telephonic communication is not terminated, the processing returns to Step S104, and in the case where the telephonic communication is terminated, the echo cancellation ends (Step S109).

Heretofore, the case of a single TV has been described. In order to enhance the sound quality of the sound output from the television receiver 200, there is a case where the AV amplifier 300 connected to the television receiver 200 is used for the sound output. That is, there is also the case where the audio signal including the TV sound and the telephonic communication destination sound is output from the speaker set 350 of the AV amplifier 300 connected to the television receiver 200 (hereinafter, simply referred to as "case of an external amplifier"). Hereinafter, the case of the external amplifier will be described.

Here, in the case where the set top box 400 and the AV amplifier 300 establish HDMI connections to the television receiver 200, since the audio signal received from the AV amplifier 300 is generally richer than the audio signal received from the television receiver 200, the connection may be established in the order of the set top box 400, the AV amplifier 300, and the television receiver 200. For example, in the case where the connection is performed in the order of the set top box 400, the television receiver 200, and the AV amplifier 300, it generally becomes difficult to playback a multichannel signal in the AV amplifier 300.

In the case of a general HDMI repeater function of the AV amplifier 300, when the AV amplifier 300 outputs a sound, EDID is controlled such that the audio signal-receiving performance as the AV amplifier 300 is shown, and a signal from the set top box 400 is input to the AV amplifier 300 via the repeater of the AV amplifier 300. In this case, while a sound is output from the speaker set 350 of the AV amplifier 300, only the video signal is generally transmitted to the television receiver 200.

While connection is established in this way, since the audio signal is not transmitted to the television receiver 200, even if the television receiver 200 has a function of performing the echo cancellation, it is difficult for the television receiver 200 to receive the audio signal via the HDMI, and it is difficult for the television receiver 200 to perform the echo cancellation.

The following may be performed for causing the television receiver 200 to execute the echo cancellation on the sound input from the set top box 400 or the like via an HDMI terminal of the AV amplifier 300. That is, the HDMI signal received from the set top box 400 in the AV amplifier 300 is passed as it is to the television receiver 200, the echo cancellation is performed in the television receiver 200, the sound from the television receiver 200 is returned to the AV amplifier 300, and the sound may be played back.

Figure 15:
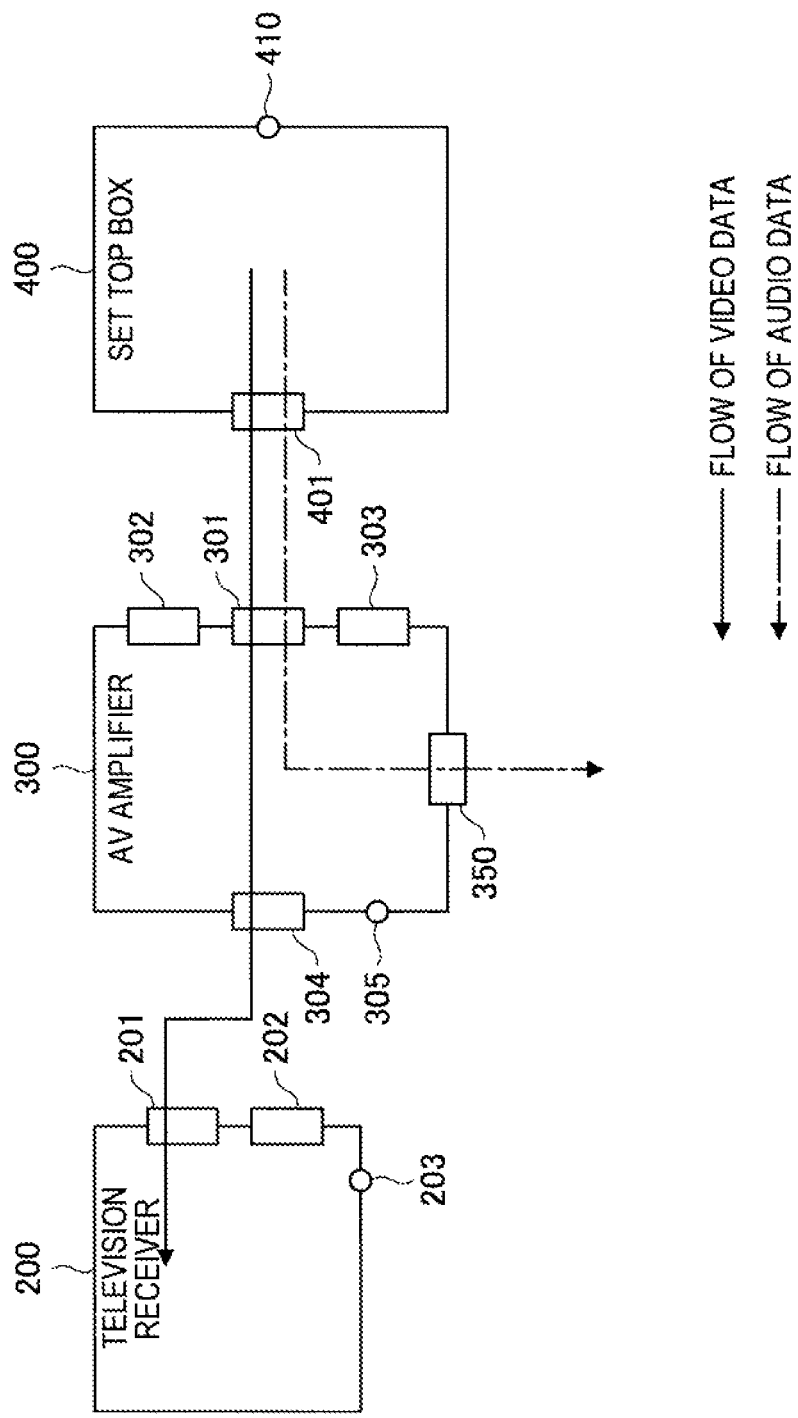
FIG. 15 is a diagram showing a flow of video data and audio data at normal times in a case of an external amplifier.

FIG. 15 is a diagram showing a flow of video data and audio data at normal times in a case of an external amplifier. As shown in FIG. 15, let us assume that input data is input from the set top box 400 through the HDMI terminal 301 to the AV amplifier 300, for example. The input data includes video data and audio data. The CPU 321 can separate the audio data from the input data that is input from the set top box 400 through the HDMI terminal 301 and can output the audio data from the speaker set 350. The user can listen to the audio output from the speaker set 350 in this way.

Further, the CPU 321 can separate the video data from the input data that is input from the set top box 400 through the HDMI terminal 301 and can cause the television receiver 200 to output the video data. The video data is output to the television receiver 200 through the HDMI terminal 304 in accordance with the control performed by the CPU 321. Further, the video data input to the television receiver 200 via the HDMI terminal 201 is output as a video from the display panel 216 of the television receiver 200 in accordance with control performed by the CPU 231. The user can view the video output from the television receiver 200 in this manner.

Next, let us assume a case where the cancellation is performed in the case of the external amplifier. In such a case, it becomes necessary to provide the AV amplifier 300 with a dedicated circuit including a microphone, and the use thereof is limited, which is impracticable. If the AV amplifier 300 is not provided with the dedicated circuit including the microphone and is connected to the television receiver 200, the cancellation which has been performed in the case of a single TV is not performed any more. This does not match the action of the user of connecting the AV amplifier 300 to the television receiver 200 for the sake of enhancing the sound quality.

Figure 16:
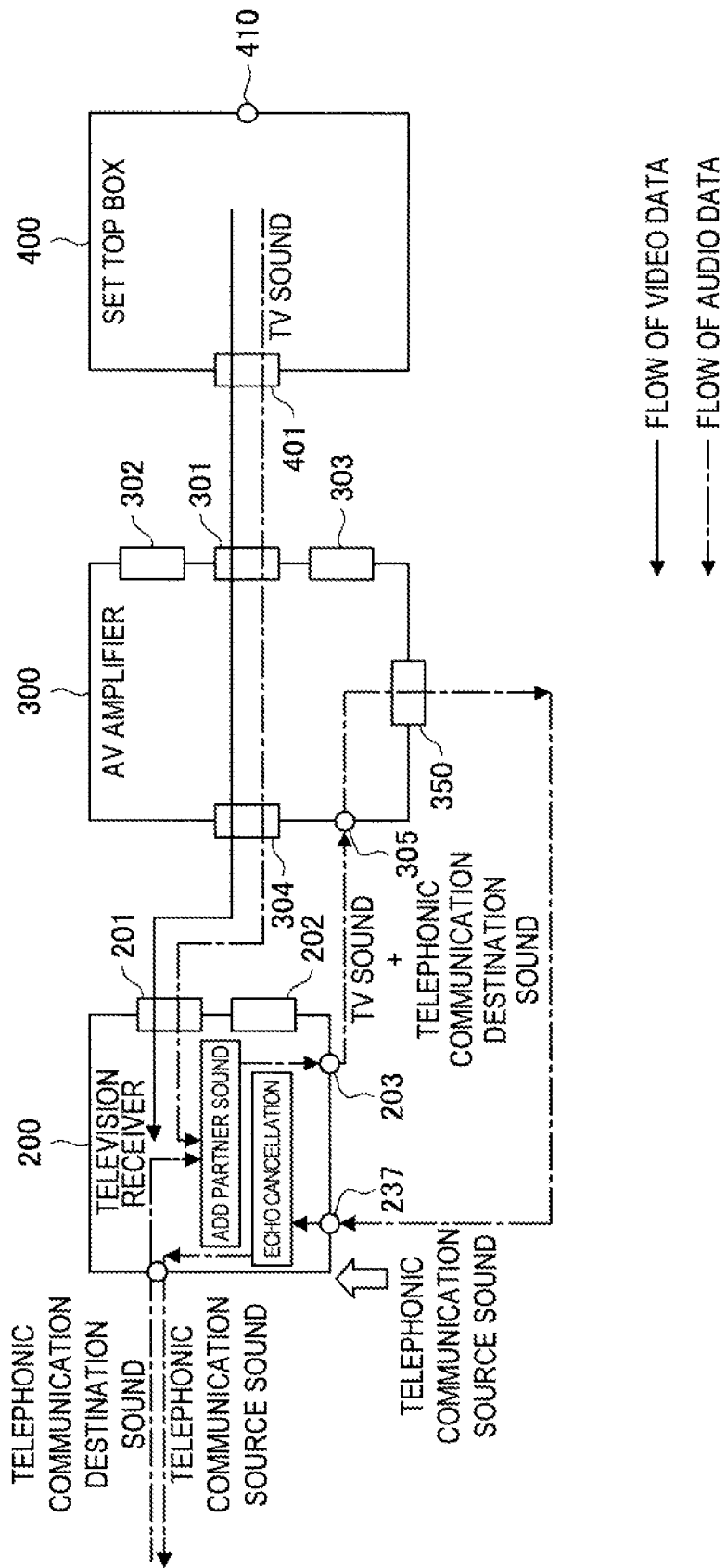
FIG. 16 is a diagram showing a flow of video data and audio data at a time of cancellation interlocking state in the case of the external amplifier.

Accordingly, it is better to detect the audio signal including the TV sound and the telephonic communication destination sound output from the AV amplifier 300 by the microphone 237 mounted on the television receiver 200, and to perform the cancellation in the television receiver 200. FIG. 16 is a diagram showing a flow of video data and audio data at a time of cancellation interlocking state in the case of the external amplifier. As shown in FIG. 16, for example, let us assume that input data is input from the set top box 400 through the HDMI terminal 301 to the AV amplifier 300. The input data includes video data and audio data. The CPU 321 can output the input data input from the set top box 400 through the HDMI terminal 301 to the television receiver 200 through the HDMI terminal 304.

Further, the CPU 231 can separate the video data from the input data input from the AV amplifier 300 through the HDMI terminal 201. The video data is output as a video from the display panel 216 of the television receiver 200 in accordance with control performed by the CPU 231. The user can view the video output from the television receiver 200 in this manner. Further, the CPU 231 adds the telephonic communication destination sound received by the network I/F 235 through the network terminal 236 to the audio data (TV sound), and outputs the audio data including the TV sound and the telephonic communication destination sound to the AV amplifier 300 through the optical output terminal 203.

The AV amplifier 300 is capable of outputting the audio data input through the optical input terminal 305, the ARC-compatible HDMI terminal 304, or the analog audio input terminal 311 to the speaker set 350. The user can listen to the TV sound and the telephonic communication destination sound output from the speaker set 350 in this manner. The audio data including the TV sound and the telephonic communication destination sound is detected as a microphone detection signal together with the sound (hereinafter, also referred to as "telephonic communication source sound") uttered by the user himself/herself. However, with the echo cancellation performed by the sound processing circuit 217, an echo-eliminated signal which is obtained by eliminating an echo estimation signal from the microphone detection signal is generated.

The echo-eliminated signal mainly includes the telephonic communication source sound. The network I/F 235 can transmit the echo-eliminated signal generated by the sound processing circuit 217 to the communication partner device through the network terminal 236. Hereinafter, description will be continued on the echo cancellation processing.

Figure 17:
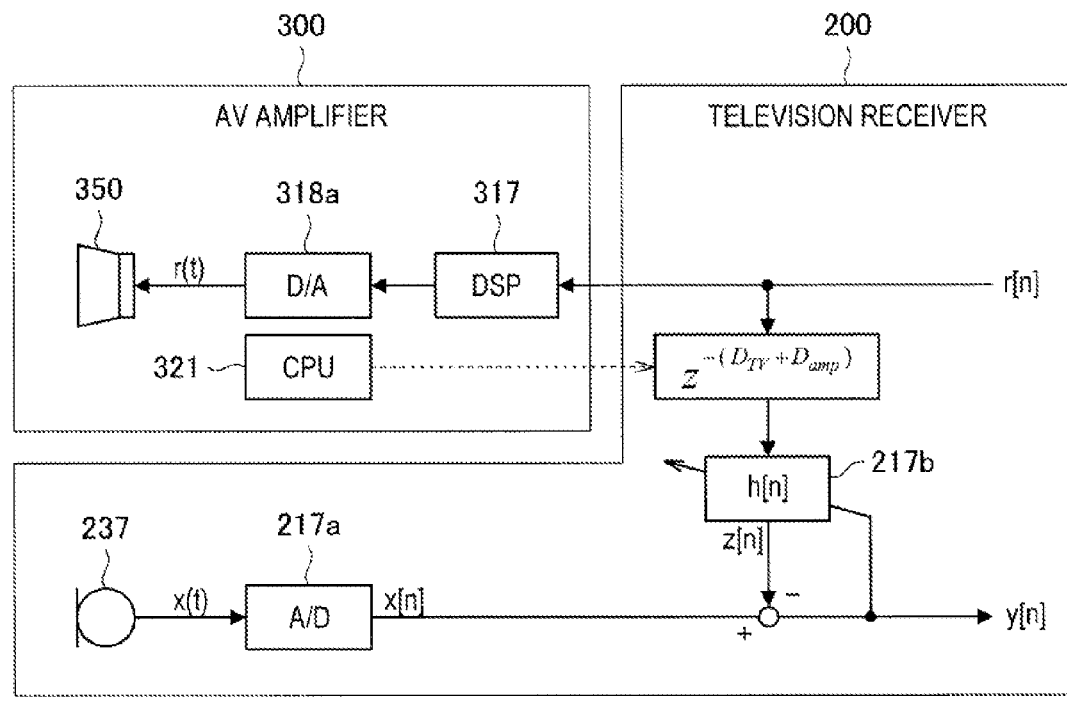
FIG. 17 is a diagram illustrating a configuration related to echo cancellation processing in the case of the external amplifier.

FIG. 17 is a diagram illustrating a configuration related to echo cancellation processing in the case of the external amplifier. As shown in FIG. 17, the television receiver 200 includes, as for the configuration related to the echo cancellation processing, an A/D conversion section 217a, an adaptive filter 217b, and the microphone 237. Further, the AV amplifier 300 connected to the television receiver 200 includes, as for the configuration related to the echo cancellation processing, a DSP 317, a D/A conversion section 318a, the speaker set 350, and the CPU 321.

The microphone detection signal obtained by detection by the microphone 237 is converted into a digital signal in the A/D conversion section 217a and is output to an adder. On the other hand, the audio signal including the TV sound and the telephonic communication destination sound is output to the adaptive filter 217b, subjected to sound processing by the DSP 317 of the AV amplifier 300, converted into an analog signal in the D/A conversion section 318a, and is output from the speaker set 350. The audio signal output to the adaptive filter 217b causes a delay time $D_{TV}+D_{amp}$. The reason for causing the delay time $D_{TV}+D_{amp}$ is that a delay occurs for the audio signal to leave the speaker set 350 and to enter the microphone 237. Note that the delay time $D_{TV}+D_{amp}$ is roughly classified into a system delay that occurs inside the system and a propagation delay that occurs outside the system.

In the adaptive filter 217b, an echo estimation signal is calculated and is output to the adder. The adaptive filter coefficient used for the calculation performed by the adaptive filter 217b may be learned by a given adaptive signal processing algorithm. The type of the adaptive signal processing algorithm is not particularly limited, and may be a least mean square (LMS) method and a learning identification method. In the adder, the echo estimation signal is subtracted from the microphone detection signal to thereby calculate the echo-eliminated signal. Note that in the case where the fixed delay may change depending on the state of the AV amplifier 300, the fixed delay may be controlled dynamically.

Figure 18:
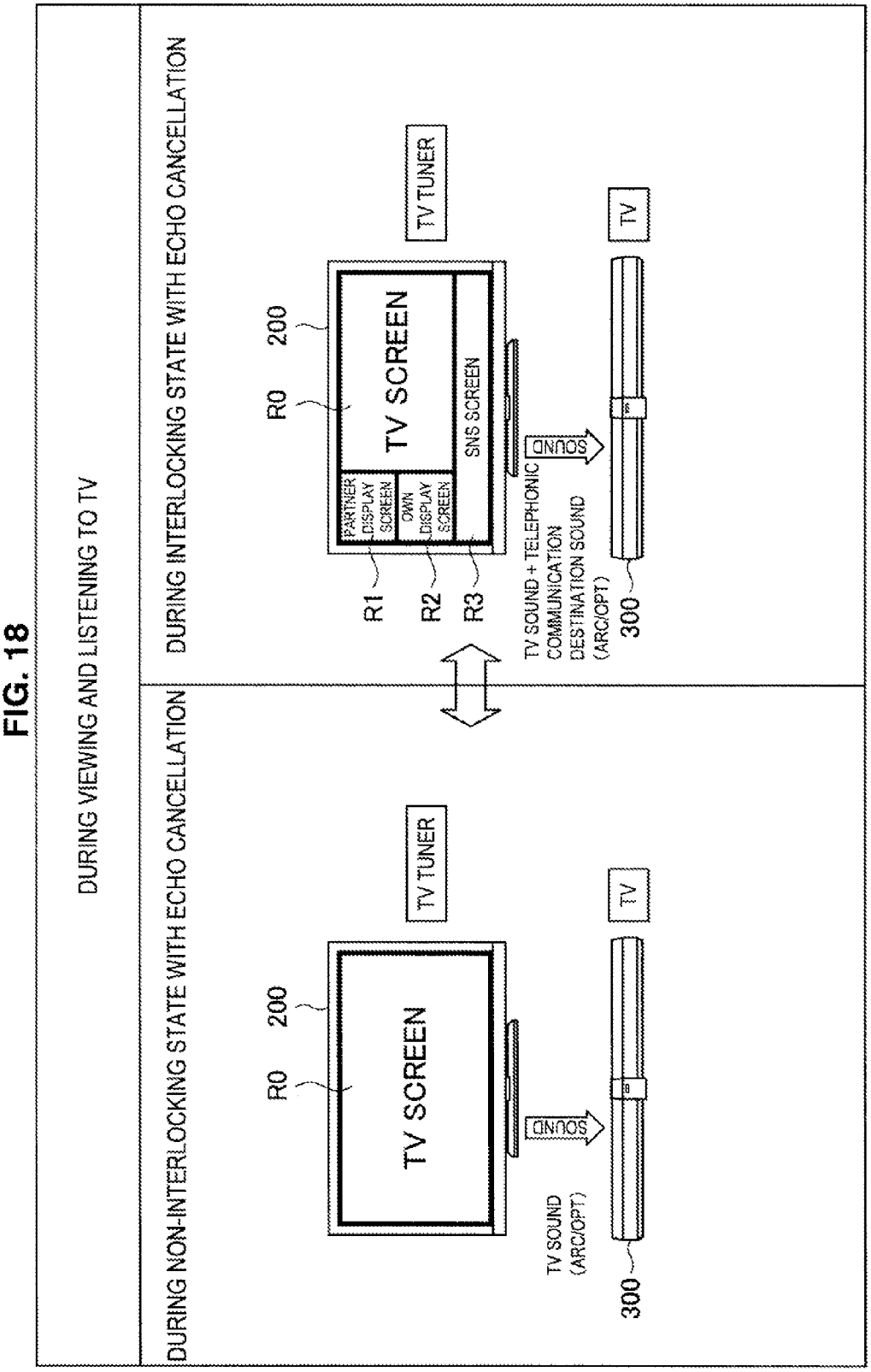

Subsequently, a case where video data and sound data output from the digital tuner 211 (TV tuner) of the television receiver 200 are viewed and listened to will be described. FIG. 18 is a diagram illustrating a case where video data and sound data output from the digital tuner 211 are viewed and listened to. Referring to FIG. 18, during a non-interlocking state with the echo cancellation, a video corresponding to a broadcast signal selected by the digital tuner 211 is displayed on the TV screen R0. Further, during the non-interlocking state with the echo cancellation, the TV sound is output from the television receiver 200 to the AV amplifier 300.

On the other hand, referring to FIG. 18, during an interlocking state with the echo cancellation, the video corresponding to the broadcast signal selected by the digital tuner 211 is displayed on the TV screen R0, and the partner display screen R1, the own display screen R2, the SNS screen R3, and the like are also displayed. Further, during the interlocking state with the echo cancellation, the TV sound and the telephonic communication destination sound are output from the television receiver 200 to the AV amplifier 300. The AV amplifier 300 maintains the sound input as TV, and outputs the TV sound and the telephonic communication destination sound from the speaker set 350.

Subsequently, a case where video data and sound data output from a source device will be described. FIG. 19 is a diagram illustrating a case where video data and sound data output from the set top box 400 used as an example of the source device are viewed and listened to. Referring to FIG. 19, during a non-interlocking state with the echo cancellation, a video corresponding to a broadcast signal input from the set top box 400 is displayed on an STB screen R0. Further, during the non-interlocking state with the echo cancellation, the TV sound is output from the set top box 400 to the AV amplifier 300.

Further, referring to FIG. 19, during the non-interlocking state with the echo cancellation, a sound corresponding to a broadcast signal input from the HDMI terminal 301 to the AV amplifier 300 is output from the AV amplifier 300, and the AV amplifier 300 does not have to transmit the sound to the television receiver 200. In such a case, the AV amplifier 300 sets the sound input as the HDMI, and EDID indicating the performance of the AV amplifier 300 may be shown to the set top box 400.

Note that, in the case where the EDID is shown from the AV amplifier 300, the set top box 400 inputs data corresponding to the shown EDID to the AV amplifier 300. For example, in the case where performance information indicating performance of the television receiver 200 is shown from the AV amplifier 300, the set top box 400 inputs a sound corresponding to the performance of the television receiver 200 to the AV amplifier 300. On the other hand, in the case where performance information indicating performance of the AV amplifier 300 is shown from the AV amplifier 300, the set top box 400 inputs a sound corresponding to the performance of the AV amplifier 300 to the AV amplifier 300.

On the other hand, referring to FIG. 19, during the interlocking state with the echo cancellation, a video corresponding to a broadcast signal input from the HDMI terminal 301 to the AV amplifier 300 is displayed on the STB screen R0, and the partner display screen R1, the own display screen R2, the SNS screen R3, and the like are also displayed. Further, during the interlocking state with the echo cancellation, the TV sound and the telephonic communication destination sound input from the HDMI terminal 301 to the AV amplifier 300 are output from the HDMI terminal 304 to the television receiver 200.

In such a case, the AV amplifier 300 may show EDID indicating performances of the television receiver 200 and the AV amplifier 300 to the set top box 400. Even if the EDID indicating the performance of the AV amplifier 300 is shown to the set top box 400, in the case where the AV amplifier 300 can convert the signal and can transmit the signal that satisfies the EDID shown by the television receiver 200, the AV amplifier 300 can output the sound signal to the television receiver 200 without changing the EDID. Further, during the interlocking state with the echo cancellation, the TV sound and the telephonic communication destination sound are output from the television receiver 200 to the AV amplifier 300. The AV amplifier 300 switches the sound input from the HDMI to the TV, and also outputs, from the speaker set 350, the TV sound and the telephonic communication destination sound input from the television receiver 200.

Figure 20:
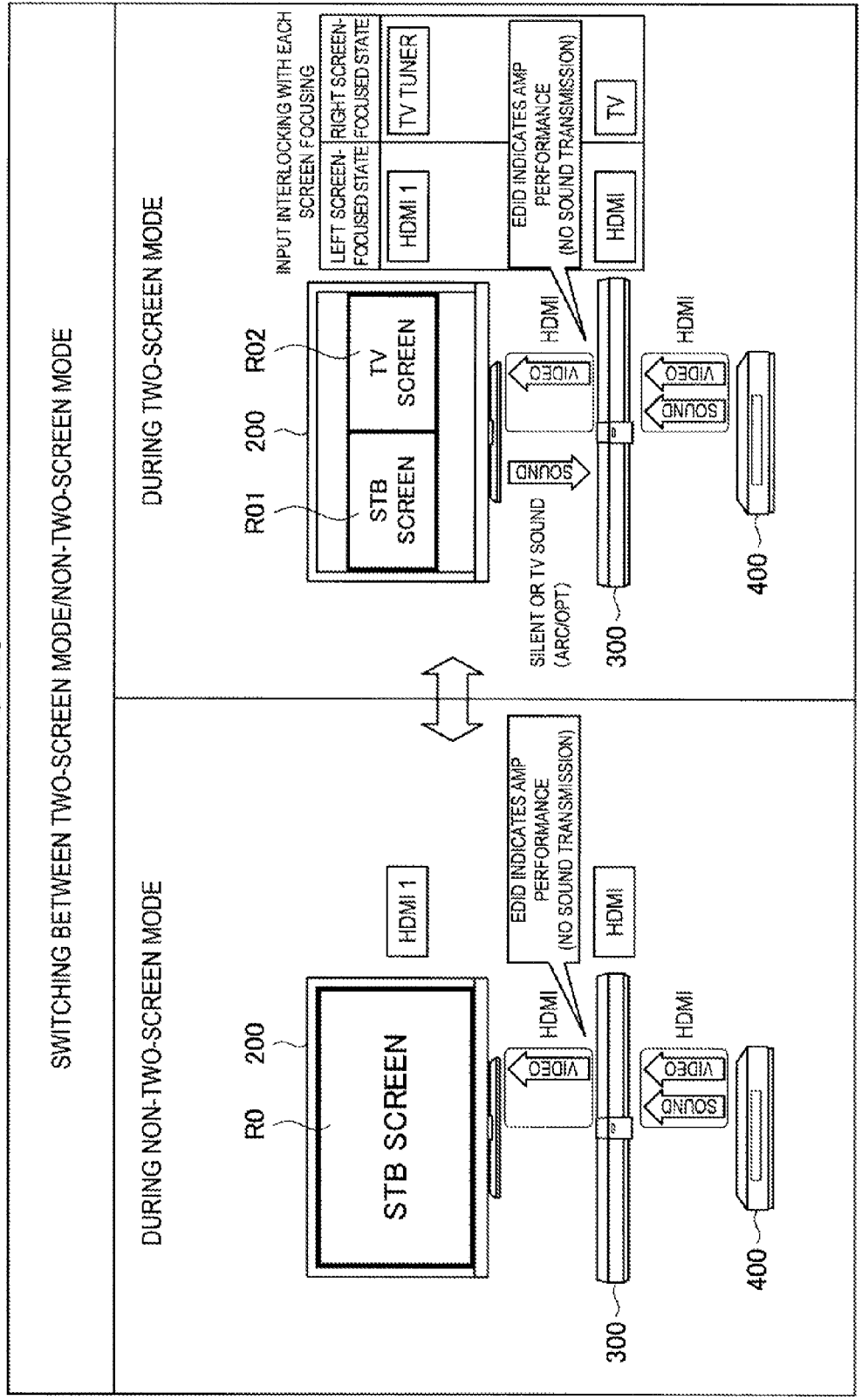
FIG. 20 is a diagram illustrating an example of switching between general two-screen mode/non-two-screen mode.

Subsequently, as a reference example, an example of switching between two-screen mode/non-two-screen mode will be described. FIG. 20 is a diagram illustrating an example of switching between general two-screen mode/non-two-screen mode. As shown in FIG. 20, in the non-two-screen mode, a similar operation with the case of the non-interlocking state with the echo cancellation as shown in FIG. 19 is performed. On the other hand, in the two-screen mode, a video corresponding to a broadcast signal input from the HDMI terminal 301 to the AV amplifier 300 is displayed on the STB screen R01, and a video corresponding to a broadcast signal selected by the digital tuner 211 is displayed on the TV screen R02.

Here, in the case where the TV screen R02 is being focused (right screen-focused state), the sound corresponding to the broadcast signal selected by the digital tuner 211 is output from the television receiver 200, and the AV amplifier 300 does not have to transmit the sound to the television receiver 200. In such a case, the AV amplifier 300 sets the sound input as the TV, and EDID indicating the performance of the AV amplifier 300 may be kept shown to the set top box 400. Then, the television receiver 200 may set the sound input as the TV tuner.

On the other hand, in the case where the STB screen R01 is being focused (left-screen focused state), the sound corresponding to the broadcast signal input from the HDMI terminal 301 to the AV amplifier 300 is output from the AV amplifier 300, and the AV amplifier 300 does not have to transmit the sound to the television receiver 200. In such a case, the AV amplifier 300 sets the sound input as the HDMI, and EDID indicating the performance of the AV amplifier 300 may be shown to the set top box 400. Then, the television receiver 200 may set the sound input as HDMI1.

Figure 21:
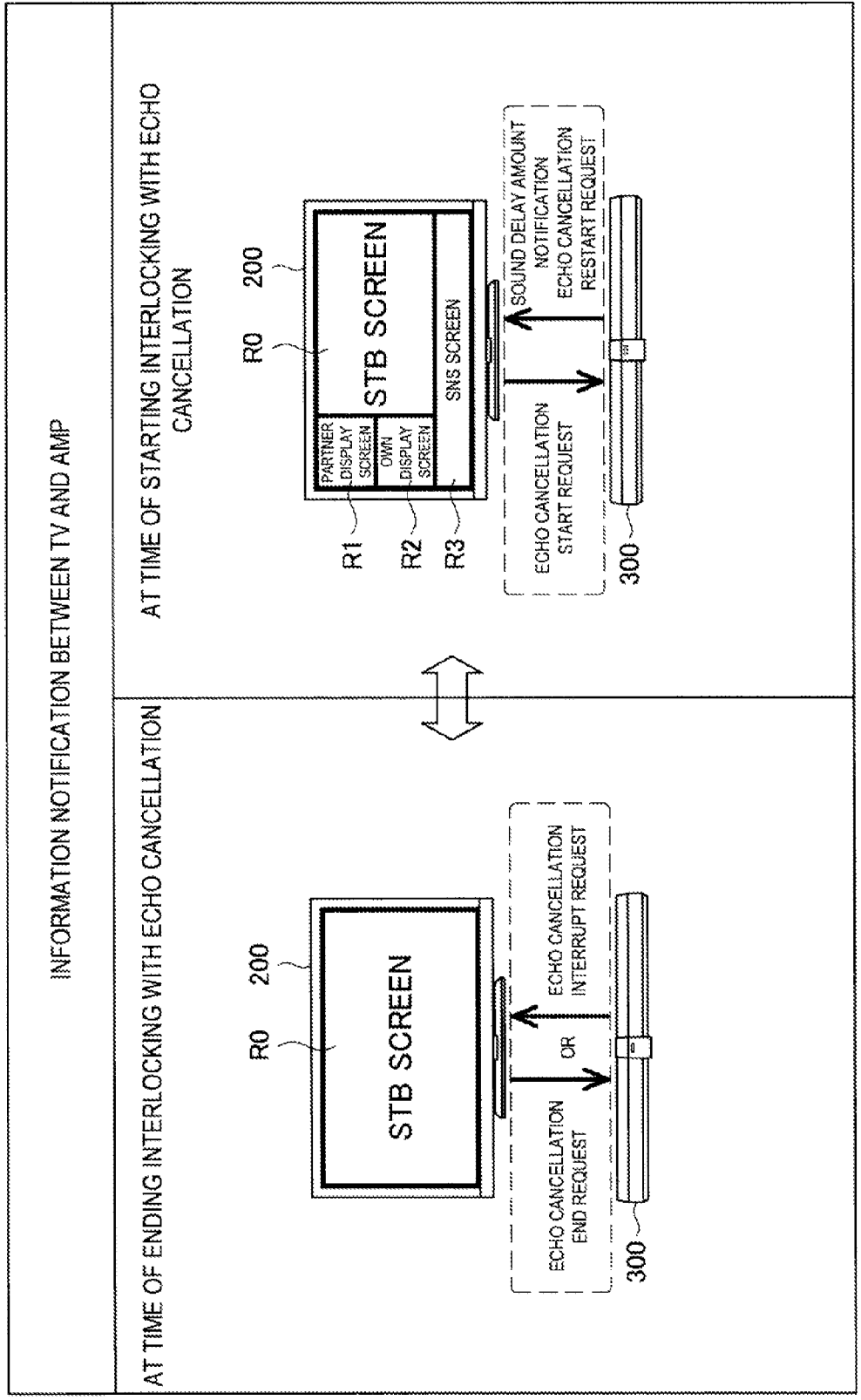
FIG. 21 is a diagram showing an example of information notification performed between the television receiver and the AV amplifier.

Subsequently, an example of information notification performed between the television receiver 200 and the AV amplifier 300 will be described. FIG. 21 is a diagram showing an example of information notification performed between the television receiver 200 and the AV amplifier 300. The AV amplifier 300 performs surround processing and various types of conversion processing (such as frequency conversion and addition of reverberation) on a sound, and there are cases where nonlinearity appears in the sound and delay is added to the sound. However, when those pieces of processing are performed, in the case where the sound output from the speaker is detected by the microphone and performing the echo cancellation with respect to the microphone detection signal, there may occur a defect that it is difficult to perform desired echo cancellation.

Accordingly, as shown in FIG. 21, in the case where the CPU 231 starts the echo cancellation in the television receiver 200, the CPU 231 may transmit an echo cancellation start request to the AV amplifier 300 through the HDMI terminal 201. For the transmission of the echo cancellation start request, an HDMI-CEC command may be used. Further, as shown in FIG. 21, in the case where the CPU 321 receives the echo cancellation start request through the HDMI terminal 304 in the AV amplifier 300, the CPU 321 may notify the television receiver 200 of a sound delay amount through the HDMI terminal 304. The sound delay amount that the television receiver 200 is notified of may be the sound delay amount that is occurred in the AV amplifier 300.

Further, for dealing with LipSync, the AV amplifier 300 may perform processing of delaying the audio signal with respect to the video signal. For example, in the case of changing the sound delay amount for such a function, when the echo cancellation is performed without the changed sound delay amount being detected by the television receiver 200, the echo cancellation may not be performed appropriately. Accordingly, the CPU 321 may notify the television receiver 200 of the changed sound delay amount through the HDMI terminal 304.

Figure 22:
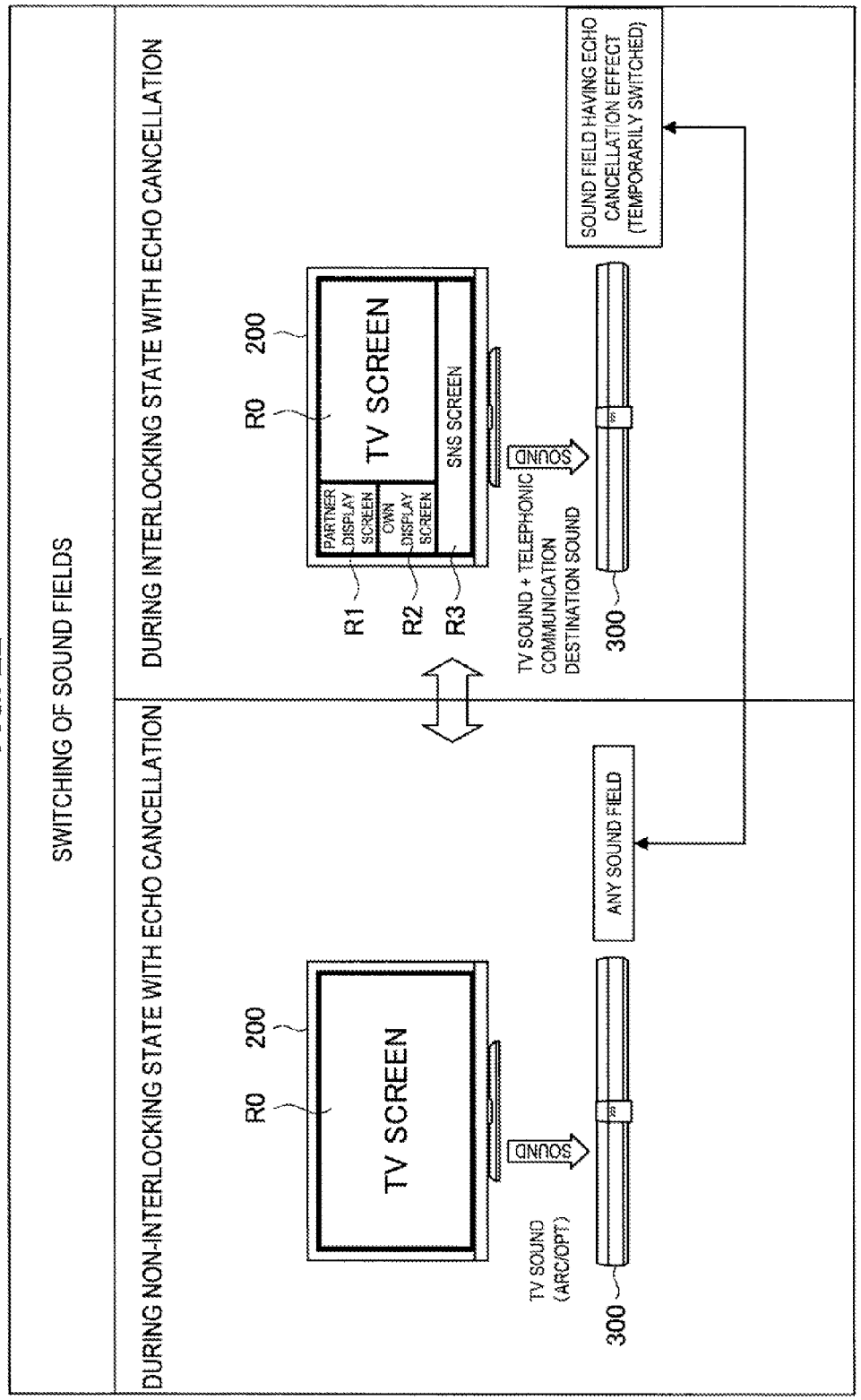
FIG. 22 is a diagram illustrating switching of sound fields.

Further, in the case where the CPU 321 receives the echo cancellation start request through the HDMI terminal 304 in the AV amplifier 300, the sound processing circuit 217 may stop sound processing (such as surround processing and various types of conversion processing) that causes the nonlinearity to be appeared. FIG. 22 is a diagram illustrating switching of sound fields. As shown in FIG. 22, in the non-interlocking state with the echo cancellation, any sound field may be selected, and in the case where the state is switched to the interlocking state with the echo cancellation, switching may be performed to the sound field having the echo cancellation effect by conducting a measure such as stopping the sound processing that causes the nonlinearity to be appeared.

Note that, in the case where the CPU 321 receives the echo cancellation start request through the HDMI terminal 304 in the AV amplifier 300, the sound processing circuit 217 may stop unconditionally the sound processing that causes the nonlinearity to be appeared, and may also stop the sound processing that causes the nonlinearity to be appeared in the case where a given condition is satisfied. For example, in the case where it is difficult for the sound processing circuit 217 to perform the sound processing that causes the nonlinearity to be appeared, the sound processing circuit 217 may stop the sound processing that causes the nonlinearity to be appeared.

For example, for dealing with LipSync, the AV amplifier 300 may perform processing of delaying the audio signal with respect to the video signal. In the case where the delay time of the audio signal with respect to the video signal is longer than a threshold, the sound processing circuit 217 may determine that it becomes difficult to perform surround processing and may stop the sound processing of the echo cancellation. On the other hand, in the case where the delay time of the audio signal with respect to the video signal is shorter than the threshold, the sound processing circuit 217 may continue the sound processing of the echo cancellation.

Returning to FIG. 21 and the description will be continued. In addition, in the case where the CPU 321 receives the echo cancellation start request through the HDMI terminal 304 in the AV amplifier 300, the CPU 321 may switch the EDID of the sound signal shown in the set top box 400, to thereby pass on the sound from the set top box 400 to the television receiver 200.

As shown in FIG. 21, in the case where the CPU 231 ends the echo cancellation in the television receiver 200, the CPU 231 may transmit an echo cancellation end request to the AV amplifier 300 through the HDMI terminal 201. For the transmission of the echo cancellation end request, an HDMI-CEC command may be used. Further, as shown in FIG. 21, in the case where the CPU 321 receives the echo cancellation end request through the HDMI terminal 304 in the AV amplifier 300, the sound processing circuit 217 may return the sound processing to the start. In addition, in the case where the CPU 321 receives the echo cancellation end request through the HDMI terminal 304 in the AV amplifier 300, the CPU 321 may return the EDID of the sound signal shown in the set top box 400 to the original.

Further, if the echo cancellation is continued in the television receiver 200 after the sound signal is not input from the AV amplifier 300 to the television receiver 200 any more, a phase-reversal audio signal which is reverse to the audio signal to be originally cancelled is transmitted to the communication partner device. Accordingly, in the case where it has become not possible to play back the sound signal from the television receiver 200, the CPU 321 may notify the television receiver 200 of an echo cancellation interrupt request through the HDMI terminal 304.

The case where it is not possible to play back the sound signal from the television receiver 200 may represent the case where the sound input from the AV amplifier 300 is switched to an input other than the television receiver 200, or may represent the case where a mute state is turned on in the AV amplifier 300. Further, the case where it is not possible to play back the sound signal from the television receiver 200 may represent the case where a headphone is connected to the AV amplifier 300, may represent the case where the speaker output in the AV amplifier 300 is turned off, or may represent the case where the speaker output is turned to a TV speaker.

Further, the case where it is not possible to play back the sound signal from the television receiver 200 may represent the case where the power of the AV amplifier 300 is turned off, may represent the case where the state is turned to an automatic sound field correction measurement state, or may represent the case where the state is turned to a test tone outputting state. Further, the case where it is not possible to play back the sound signal from the television receiver 200 may represent the case where, when there are HDMI output settings including a setting capable of performing multiple-device transmission and a setting that prohibits the multiple-device transmission, the sound signal is not output to the television receiver 200 any more. Further, in the case where it has become possible to input the sound signal to the television receiver 200, the CPU 321 may notify the television receiver 200 of an echo cancellation restart request through the HDMI terminal 304.

<2-3. Flow of Operation of Communication System>

Figure 23:
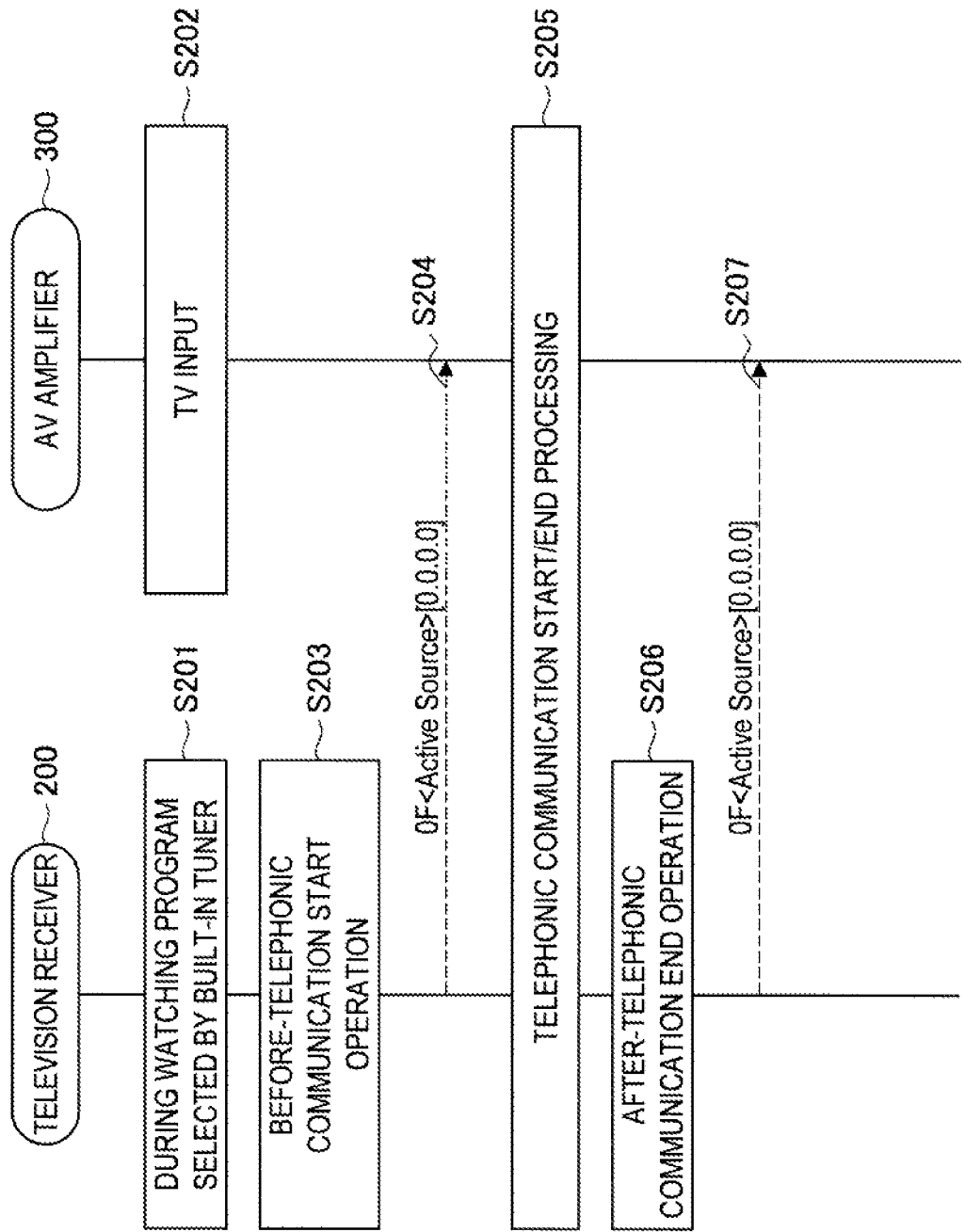
FIG. 23 is a sequence diagram showing an overall flow of an operation of the communication system while a TV is being watched.

Subsequently, a flow of an operation of the communication system according to an embodiment of the present disclosure will be described. FIG. 23 is a sequence diagram showing an overall flow of an operation of the communication system while a TV is being watched. As shown in FIG. 23, let us assume the case where a program selected by a tuner (digital tuner 211) which is built in the television receiver 200 is being watched (Step S201) and the sound input is set to the television receiver 200 in the AV amplifier 300 (Step S202). Subsequently, let us assume that a before-telephonic communication start operation is performed in the television receiver 200 (Step S203).

In such a case, the television receiver 200 transmits a message <Request Active Source> in broadcast (Step S204). The AV amplifier 300 switches the input of the audio signal to the HDMI terminal 304 or to the TV dedicated terminal (optical input terminal 305, analog audio input terminal 311, or ARC-compatible HDMI terminal 304) on the basis of the message <Active Source> transmitted from the television receiver 200 in broadcast. Subsequently, in the television receiver 200 and the AV amplifier 300, telephonic communication start processing and telephonic communication end processing are performed (Step S205). Subsequently, let us assume that an after-telephonic communication end operation is performed in the television receiver 200 (Step S206).

In such a case, the television receiver 200 transmits a message <Active Source> in broadcast (Step S207). The AV amplifier 300 switches the input of the audio signal to the HDMI terminal 304 or to the TV dedicated terminal (optical input terminal 305 or analog audio input terminal 311) on the basis of the message <Active Source> transmitted from the television receiver 200 in broadcast. Note that in the case of using Active Source information which is already grasped, Step S204 and Step S207 may not be performed.

Figure 24:
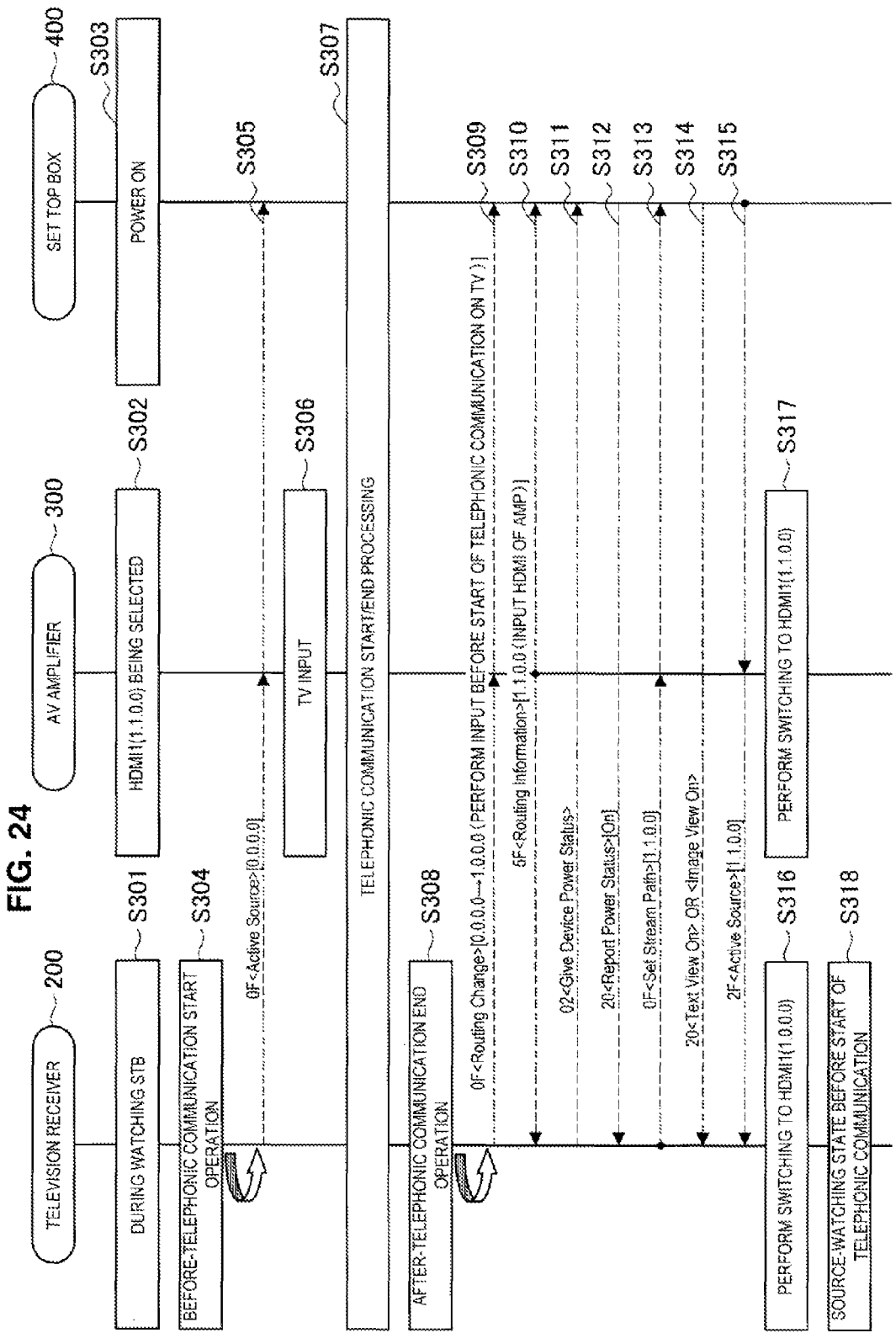
FIG. 24 is a sequence diagram showing an overall flow of an operation of the communication system while a STB is being watched.

FIG. 24 is a sequence diagram showing an overall flow of an operation of the communication system while a STB is being watched. As shown in FIG. 24, let us assume the case where the STB is being watched (Step S301), and HDMI1 (1.1.0.0) is being selected in the AV amplifier 300 (Step S306). Further, let us assume the case where the power of the set top box 400 is on (Step S303). Subsequently, let us assume that a before-telephonic communication start operation is performed in the television receiver 200 (Step S304).

In such a case, the television receiver 200 transmits a message <Active Source> in broadcast (Step S305). The AV amplifier 300 switches the input of the audio signal to the HDMI terminal 304 or to the TV dedicated terminal (optical input terminal 305 or analog audio input terminal 311) on the basis of the message <Active Source> transmitted from the television receiver 200 in broadcast. Subsequently, in the television receiver 200 and the AV amplifier 300, telephonic communication start processing and telephonic communication end processing are performed (Step S307). Subsequently, let us assume that an after-telephonic communication end operation is performed in the television receiver 200 (Step S308).

In such a case, the television receiver 200 transmits a message <Routing Change> in broadcast (Step S309), and receives a message <Routing Information>[1.1.0.0] from the AV amplifier 300, to thereby track a signal transmission source (set top box 400) (Step S310). The television receiver 200 transmits a message <Give Device Power Status> to the set top box 400 (Step S311), and receives a message <Report Power Status>[On] from the set top box 400 (Step S312).

In this case, in the case where the power state of the set top box 400 is determined to be on, the television receiver 200 transmits a message <Set Stream Path>[1.1.0.0] to the set top box 400 (Step S313). The set top box 400 transmits a message <Text View On> or <Image View On> (Step S314). Further, the set top box 400 transmits a message <Active Source> in broadcast (Step S315).

The television receiver 200 switches the input of the audio signal to HDMI1 (1.0.0.0) on the basis of the message <Active Source> transmitted from the set top box 400 in broadcast (Step S316), and returns to the source-watching state, which is the state before the start of the telephonic communication (Step S318). The AV amplifier 300 switches the input of the audio signal to HDMI1 (1.1.0.0) on the basis of the message <Active Source> transmitted from the set top box 400 in broadcast (Step S317). According to such an operation, the state can be returned to the original set top box 400-watching state at the time of ending the telephonic communication.

Figure 25:
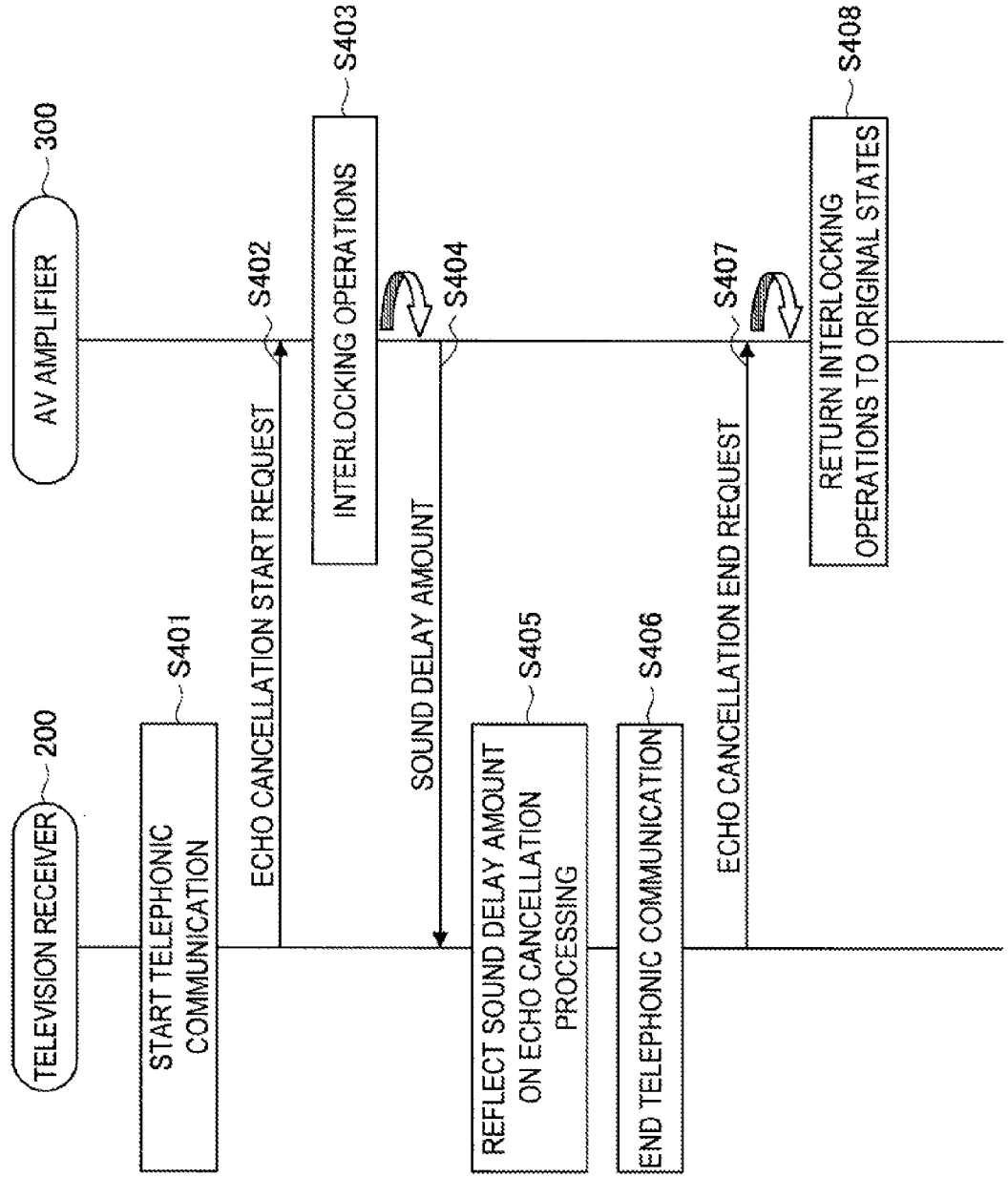
FIG. 25 is a sequence diagram showing a flow of an operation of the communication system at a time of starting telephonic communication and a time of ending telephonic communication.

FIG. 25 is a sequence diagram showing a flow of an operation of the communication system at a time of starting telephonic communication and a time of ending telephonic communication. When the telephonic communication is started in the television receiver 200 (Step S401), the CPU 231 transmits an echo cancellation start request to the AV amplifier 300 through the HDMI terminal 201 in the television receiver 200 (Step S402). In the case where the CPU 321 receives the echo cancellation start request through the HDMI terminal 304 in the AV amplifier 300, the CPU 321 performs interlocking operations with the echo cancellation (Step S403), and the CPU 321 transmits a sound delay amount to the television receiver 200 through the HDMI terminal 304 (Step S404).

When the CPU 231 receives the sound delay amount from the AV amplifier 300 through the HDMI terminal 201 in the television receiver 200 (Step S402), the CPU 231 reflects the sound delay amount to the echo cancellation processing (Step S405). Subsequently, when the telephonic communication is ended in the television receiver 200 (Step S406), the CPU 231 transmits an echo cancellation end request to the AV amplifier 300 through the HDMI terminal 201 (Step S407). In the case where the CPU 321 receives the echo cancellation end request through the HDMI terminal 304 in the AV amplifier 300, the CPU 321 returns the interlocking operations with the echo cancellation to the original states (Step S408).

Figure 26:
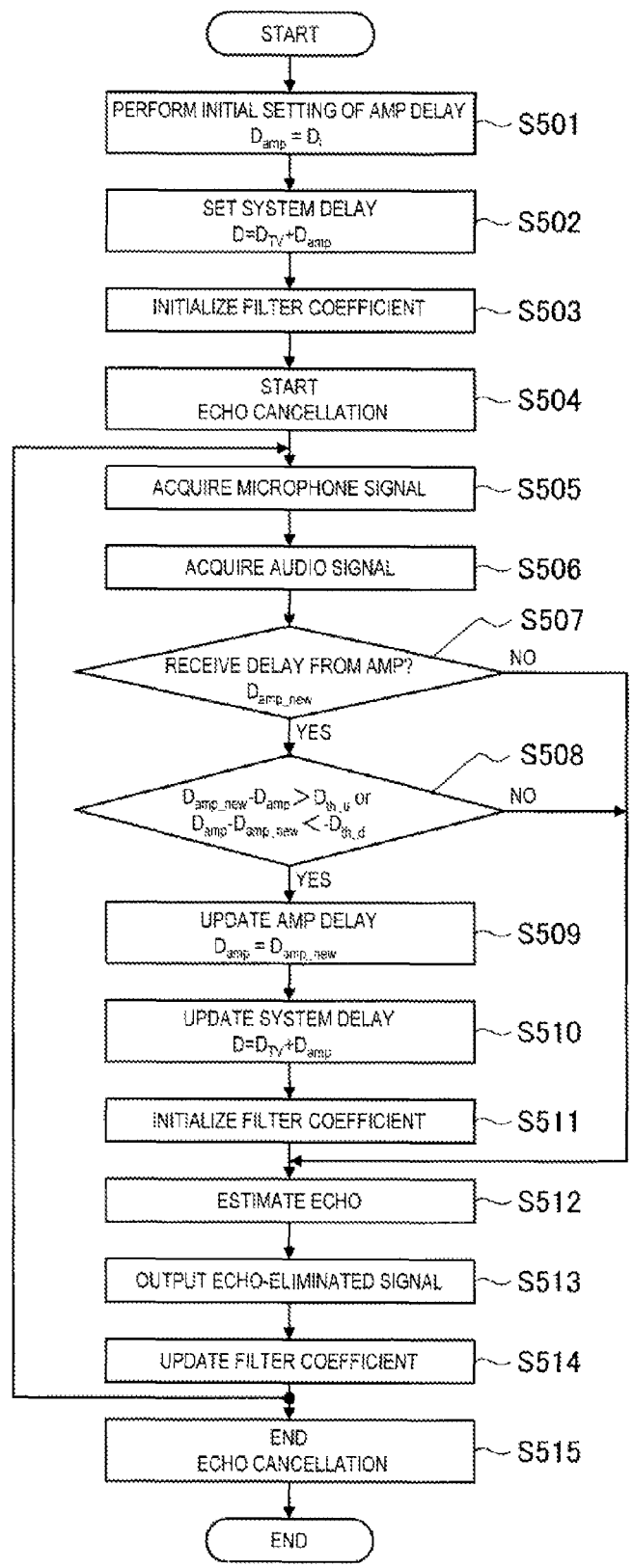
FIG. 26 is a flowchart showing a flow of an operation of echo cancellation processing (with delay amount notification) in the case of the external amplifier.

FIG. 26 is a flowchart showing a flow of an operation of echo cancellation processing (with delay amount notification) in the case of the external amplifier. First, in the television receiver 200, the CPU 231 sets an initial value of an AMP delay (sets an initial value $D_i$ as delay time $D_{amp}$ of AMP) (Step S501), sets a system delay (sets delay time $D_{TV}$+delay time $D_{amp}$ as system delay D) (Step S502), and initializes a filter coefficient (Step S503). Subsequently, the CPU 231 starts the echo cancellation (Step S504).

When the echo cancellation is started, the adaptive filter 217b acquires a microphone detection signal obtained by detection by the microphone 237 (Step S505), and also acquires an audio signal including a TV sound and a telephonic communication destination sound (Step S506). In the case where the CPU 231 does not receive a sound delay amount $D_{amp\_new}$ from the AV amplifier 300 through the HDMI terminal 201 ("NO" in Step S507), the CPU 231 proceeds to Step S512. On the other hand, in the case where the CPU 231 receives the sound delay amount $D_{amp\_new}$ from the AV amplifier 300 through the HDMI terminal 201 ("YES" in Step S507), the CPU 231 determines whether a given condition is satisfied.

The given condition may be a condition that $D_{amp\_new}-D_{amp}$ is larger than a threshold $D_{th\_u}$, or a condition that $D_{amp}-D_{amp\_new}$ is less than a threshold $-D_{th\_d}$. In the case where the given condition is not satisfied ("NO" in Step S508), the CPU 231 proceeds to Step S512. On the other hand, in the case where the given condition is satisfied ("YES" in Step S508), the CPU 231 performs updating of the AMP delay (replaces $D_{amp}$ with $D_{amp\_new}$) (Step S509), performs updating of the system delay (replaces D with $D_{TV}+D_{amp}$) (Step S510), and initializes the filter coefficient (Step S511).

Subsequently, the adaptive filter 217*b* performs echo estimation (generates an echo estimation signal) (Step S512), and the adder eliminates an echo estimation signal from the microphone detection signal to thereby generate an echo-eliminated signal, and outputs the generated echo-eliminated signal (Step S513). Further, the CPU 231 updates the filter coefficient (Step S514), and, in the case where the telephonic communication is not terminated, the processing returns to Step S505, and in the case where the telephonic communication is terminated, the echo cancellation ends (Step S515).

Figure 27:
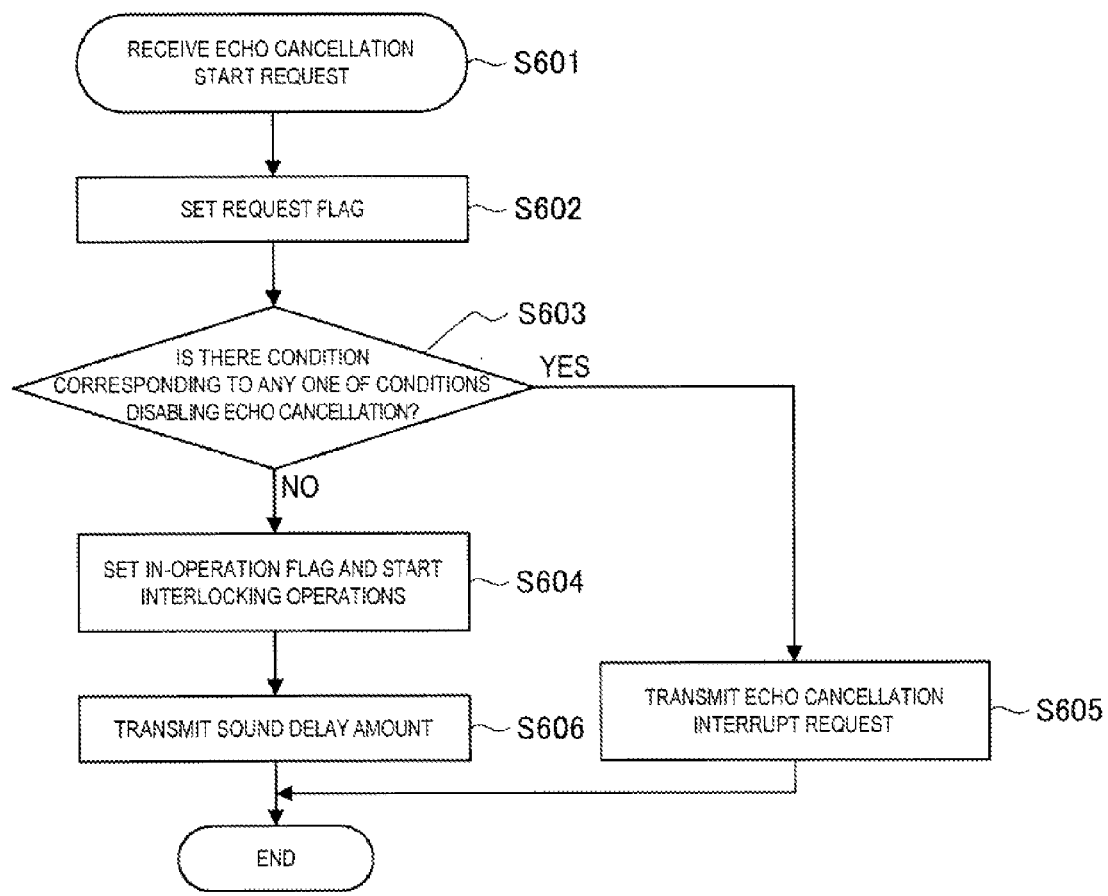
FIG. 27 is a flowchart showing a flow of an operation performed by the AV amplifier at a time of receiving an echo cancellation start request.

FIG. 27 is a flowchart showing a flow of an operation performed by the AV amplifier 300 at a time of receiving an echo cancellation start request. First, in the case where the CPU 321 receives the echo cancellation start request through the HDMI terminal 304 in the AV amplifier 300 (Step S601), the CPU 321 sets a request flag (Step S602), and determines whether there is a condition corresponding to any one of the conditions disabling the echo cancellation (Step S603). The conditions disabling the echo cancellation may include a condition that disables the playback of the audio signal output from the television receiver 200.

In the case where there is a condition corresponding to any one of the conditions disabling the echo cancellation ("YES" in Step S603), the CPU 321 transmits an echo cancellation interrupt request to the television receiver 200 through the HDMI terminal 304 (Step S605). On the other hand, in the case where there is not a condition corresponding to any one of the conditions disabling the echo cancellation ("NO" in Step S603), the CPU 321 sets an in-operation flag and starts interlocking operations with the echo cancellation (Step S604), and the CPU 321 transmits a sound delay amount to the television receiver 200 through the HDMI terminal 304 (Step S606).

Figure 28:
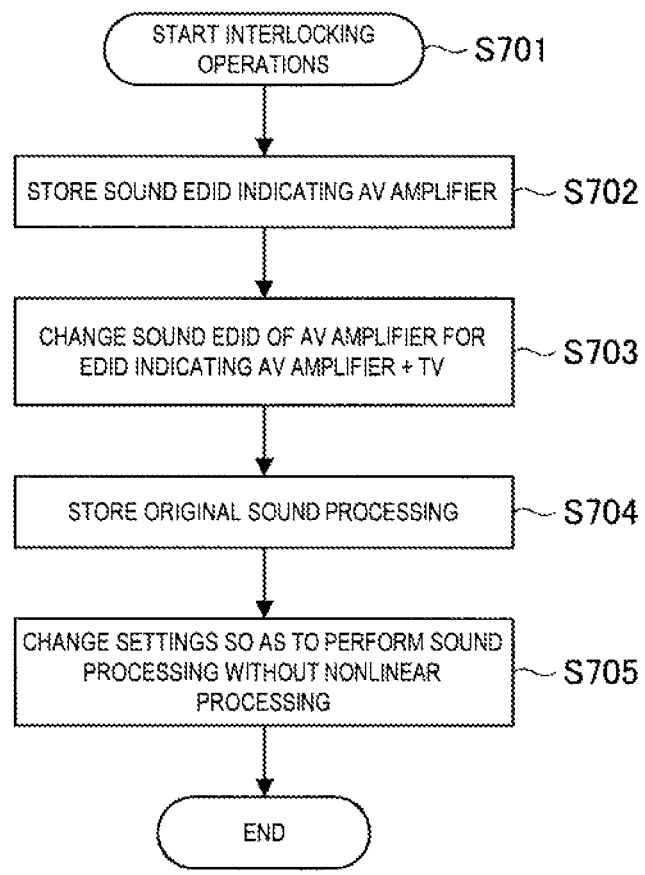
FIG. 28 is a flowchart showing a flow of an operation performed by the AV amplifier at a time of starting interlocking operations with the echo cancellation.

FIG. 28 is a flowchart showing a flow of an operation performed by the AV amplifier 300 at a time of starting interlocking operations with the echo cancellation. As shown in FIG. 28, in the AV amplifier 300, the interlocking operations with the echo cancellation are started as follows (Step S701). The AV amplifier 300 stores EDID of a sound signal indicating the AV amplifier 300 (Step S702). The CPU 321 changes the EDID of the sound signal of the AV amplifier 300 for EDID of a sound signal indicating AV amplifier 300+television receiver 200 (Step S703). The specific EDID for this case represents the EDID that is receivable by the AV amplifier 300 and by the television receiver 200, but the EDID may be receivable only by the television receiver 200. Further, when the EDID indicates the performance of the AV amplifier 300, in the case where the input signal can be processed in the AV amplifier 300 and can be converted into a signal in accordance with the EDID indicated by the television receiver 200, it is not necessary to change the EDID.

Further, the AV amplifier 300 stores original sound processing (Step S704). The CPU 321 changes the settings such that the sound processing without nonlinear processing is performed (Step S705). Since the setting change stops the sound processing that causes the nonlinearity to be appeared, switching may be performed to the sound field having the echo cancellation effect.

Figure 29:
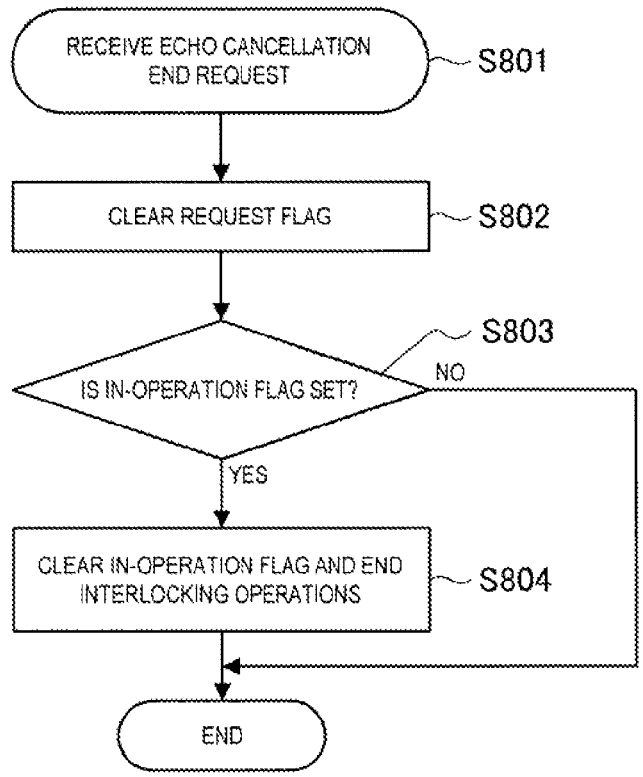
FIG. 29 is a flowchart showing a flow of an operation performed by the AV amplifier at a time of receiving an echo cancellation end request.

FIG. 29 is a flowchart showing a flow of an operation performed by the AV amplifier 300 at a time of receiving an echo cancellation end request. First, in the case where the HDMI reception section 307 receives the echo cancellation end request through the HDMI terminal 304 in the AV amplifier 300 (Step S801), the CPU 321 clears a request flag (Step S802), and determines whether an in-operation flag is set (Step S803).

In the case where the in-operation flag is not set ("NO" in Step S803), the CPU 321 ends the operation at the time of receiving the echo cancellation end request. On the other hand, in the case where the in-operation flag is set ("YES" in Step S803), the CPU 321 clears the in-operation flag and ends the interlocking operations with the echo cancellation (Step S804).

Figure 30:
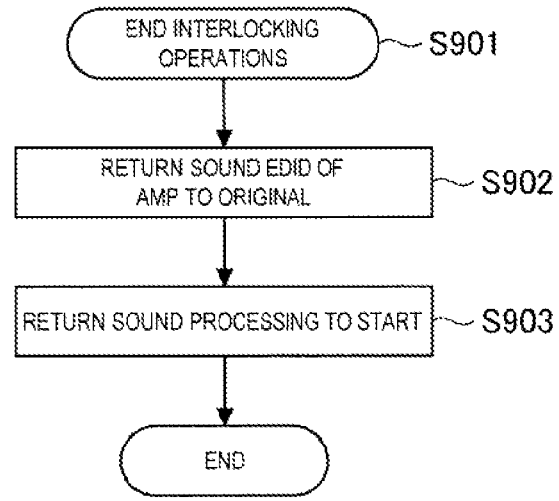
FIG. 30 is a flowchart showing a flow of an operation performed by the AV amplifier at a time of ending interlocking operations with the echo cancellation.

FIG. 30 is a flowchart showing a flow of an operation performed by the AV amplifier 300 at a time of ending interlocking operations with the echo cancellation. As shown in FIG. 30, in the AV amplifier 300, the interlocking operations with the echo cancellation are ended as follows (Step S901). In the AV amplifier 300, the CPU 321 returns the EDID of the sound signal of the AV amplifier 300 (changes the EDID for the EDID indicating the AV amplifier 300) (Step S902). Further, in the AV amplifier 300, the CPU 321 returns the sound processing to the start (changes the settings such that the sound processing with nonlinear processing is performed) (Step S903). According to such setting change, the sound processing that may cause the nonlinearity to be appeared is restarted.

Figure 31:
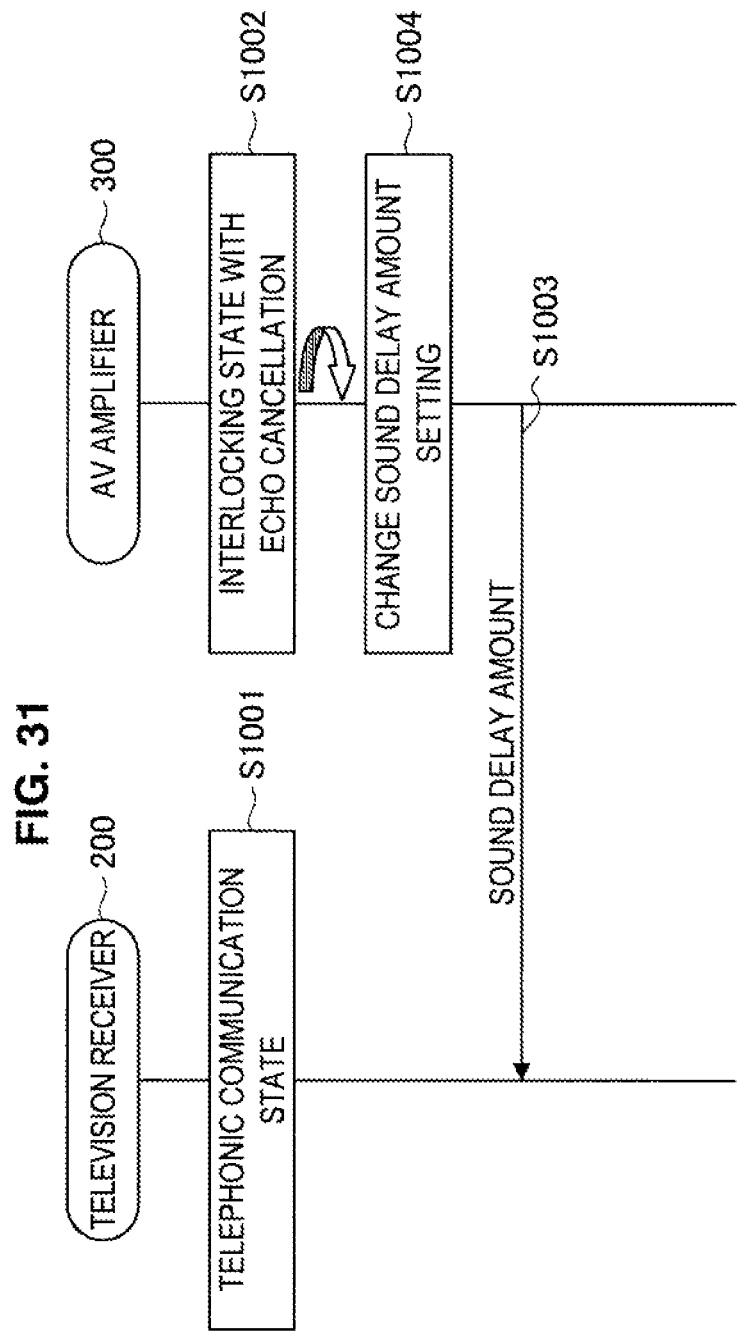
FIG. 31 is a sequence diagram showing a flow of an overall operation of the communication system in a case where a sound delay amount is changed in the AV amplifier.

FIG. 31 is a sequence diagram showing a flow of an overall operation of the communication system in a case where a sound delay amount is changed in the AV amplifier 300. As shown in FIG. 31, the television receiver 200 is in a telephonic communication state (Step S1001), and the AV amplifier 300 is in an interlocking state with the echo cancellation (Step S1002).

Subsequently, in the case where a sound delay amount is changed in the AV amplifier 300 (Step S1004), the CPU 321 transmits the changed sound delay amount to the television receiver 200 through the HDMI terminal 304 (Step S1003). When the CPU 231 receives the changed sound delay amount from the AV amplifier 300 through the HDMI terminal 201 in the television receiver 200, the CPU 231 reflects the changed sound delay amount on the echo cancellation processing.

Figure 32:
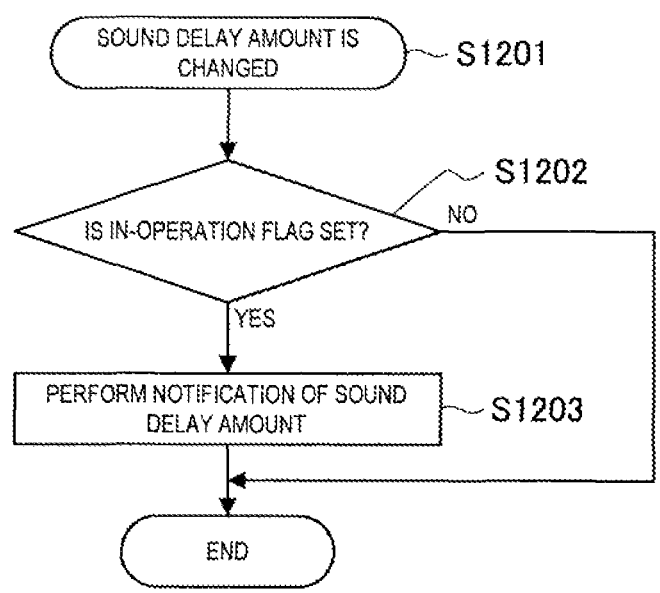
FIG. 32 is a flowchart showing a flow of an operation performed by the AV amplifier in the case where the sound delay amount is changed in the AV amplifier.

FIG. 32 is a flowchart showing a flow of an operation performed by the AV amplifier 300 in the case where the sound delay amount is changed in the AV amplifier. First, in the case where the sound delay amount is changed in the AV amplifier 300 (Step S1201), the CPU 321 determines whether an in-operation flag is set (Step S1202). In the case where it is determined that the in-operation flag is not set ("NO" in Step S1202), the operation at the time of the sound delay amount is changed ends.

On the other hand, in the case where it is determined that the in-operation flag is set ("YES" in Step S1202), the CPU 321 notifies the television receiver 200 of the sound delay amount through the HDMI terminal 304 (Step S1203), and the operation at the time of the sound delay amount is changed ends.

Figure 33:
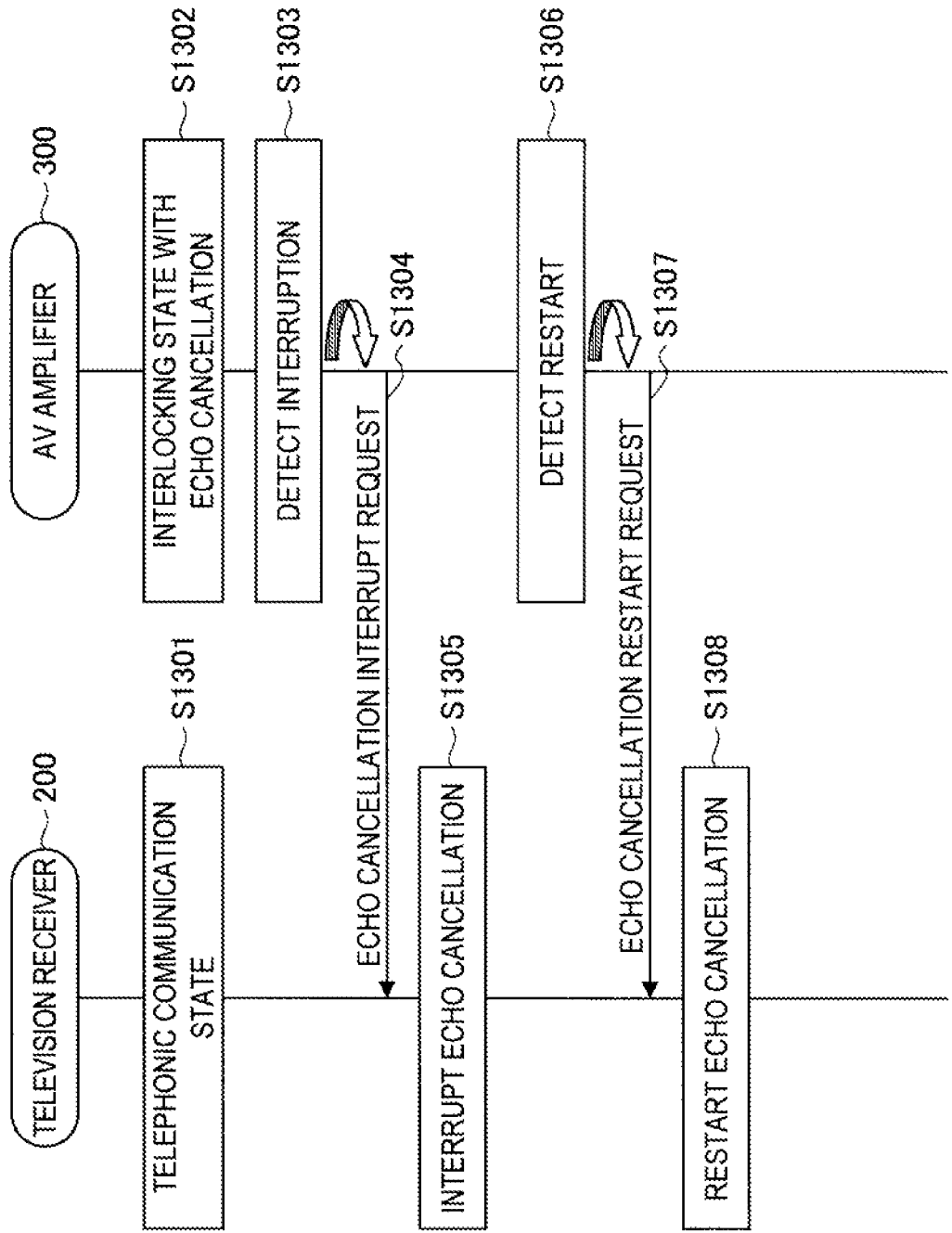
FIG. 33 is a sequence diagram showing a flow of an operation of the communication system in a case where interlocking with the echo cancellation is interrupted by a state change in the AV amplifier.

FIG. 33 is a sequence diagram showing a flow of an operation of the communication system in a case where interlocking with the echo cancellation is interrupted by a state change in the AV amplifier 300. As shown in FIG. 33, the television receiver 200 is in a telephonic communication state (Step S1301), and the AV amplifier 300 is in an interlocking state with the echo cancellation (Step S1302). Subsequently, in the case where a reason for echo cancellation interruption (playback of the audio signal output from the television receiver 200 is disabled) is detected in the AV amplifier 300 (Step S1303), the CPU 321 notifies the television receiver 200 of an echo cancellation interrupt request through the HDMI terminal 304 (Step S1304).

When the CPU 231 receives the echo cancellation interrupt request from the AV amplifier 300 through the HDMI terminal 201 in the television receiver 200, the CPU 231 interrupts the echo cancellation (Step S1305). Further, in the case where a reason for echo cancellation restart (playback of the audio signal output from the television receiver 200 is enabled) is detected in the AV amplifier 300 (Step S1306), the CPU 321 notifies the television receiver 200 of an echo cancellation restart request through the HDMI terminal 304 (Step S1307).

When the CPU 231 receives the echo cancellation restart request from the AV amplifier 300 through the HDMI terminal 201 in the television receiver 200, the CPU 231 restarts the echo cancellation (Step S1308).

Figure 34:
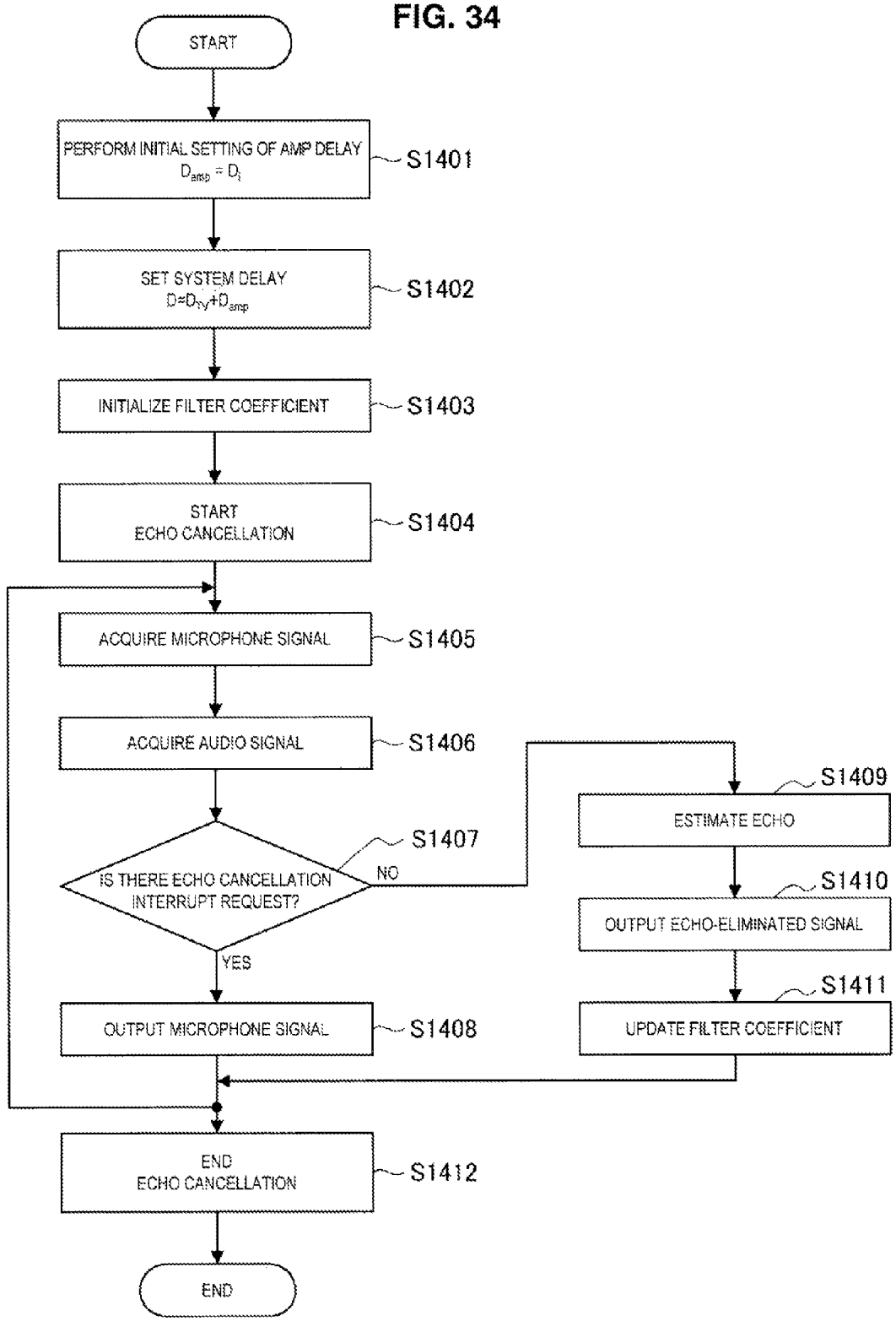
FIG. 34 is a flowchart showing a flow of an operation of echo cancellation processing (with interruption of echo cancellation) in the case of the external amplifier.

FIG. 34 is a flowchart showing a flow of an operation of echo cancellation processing (with interruption of echo cancellation) in the case of the external amplifier. First, in the television receiver 200, the CPU 231 sets an initial value of an AMP delay (sets an initial value $D_i$ as delay time $D_{amp}$ of AMP) (Step S1401), sets a system delay (sets delay time $D_{TV}$+delay time $D_{amp}$ as system delay D) (Step S1402), and initializes a filter coefficient (Step S1403). Subsequently, the CPU 231 starts the echo cancellation (Step S1404).

When the echo cancellation is started, the adaptive filter 217*b* acquires a microphone detection signal obtained by detection by the microphone 237 (Step S1405), and also acquires an audio signal including a TV sound and a telephonic communication destination sound (Step S1406). Here, in the case where an echo cancellation interrupt request is received from the AV amplifier 300 through the HDMI terminal 201 ("YES" in Step S1407), the A/D conversion section 217*a* outputs a digital signal of the microphone detection signal (Step S1308).

On the other hand, in the case where the echo cancellation interrupt request is not received from the AV amplifier 300 through the HDMI terminal 201 ("NO" in Step S1407), the adaptive filter 217*b* performs echo estimation (generates an echo estimation signal) (Step S1409), and the adder eliminates an echo estimation signal from the microphone detection signal to thereby generate an echo-eliminated signal, and outputs the generated echo-eliminated signal (Step S1410). Further, the CPU 231 updates the filter coefficient (Step S1411), and, in the case where the telephonic communication is not terminated, the processing returns to Step S1405, and in the case where the telephonic communication is terminated, the echo cancellation ends (Step S1412).

Figure 35:
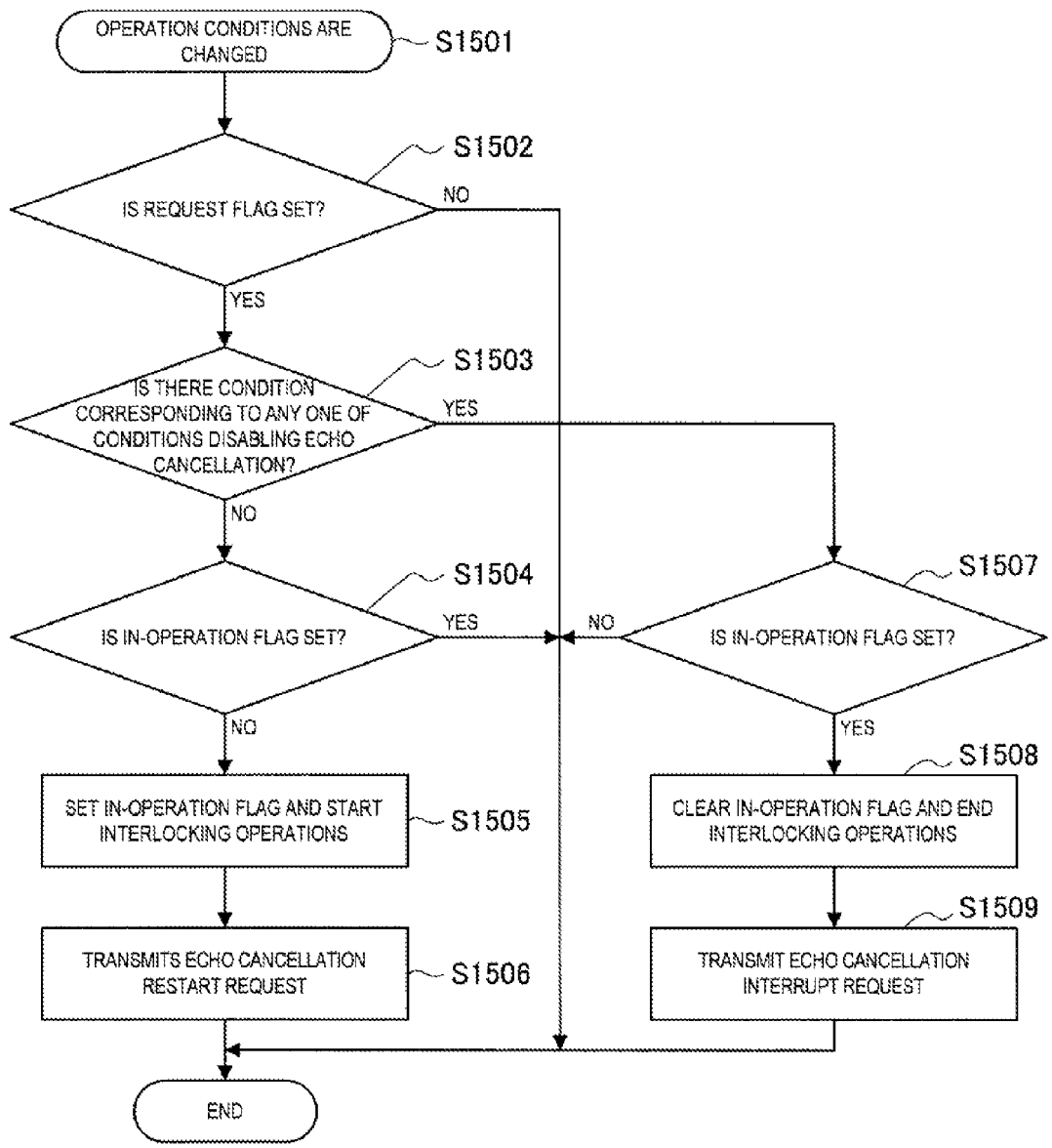
FIG. 35 is a flowchart showing a flow of an operation of the AV amplifier in a case where operation conditions are changed.

FIG. 35 is a flowchart showing a flow of an operation of the AV amplifier 300 in a case where operation conditions are changed. First, in the case where operation conditions are changed in the AV amplifier 300 (Step S1501), the CPU 321 determines whether a request flag is set (Step S1502). In the case where the request flag is not set ("NO" in Step S1502), the CPU 321 ends the operation at the time of changing the operation conditions. On the other hand, in the case where the request flag is set ("YES" in Step S1502), the CPU 321 determines whether there is a condition corresponding to any one of the conditions disabling the echo cancellation (Step S1503).

In the case where there is not a condition corresponding to any one of the conditions disabling the echo cancellation ("NO" in Step S1503), the CPU 321 determines whether an in-operation flag is set (Step S1504). In the case where the in-operation flag is set ("YES" in Step S1504), the CPU 321 ends the operation at the time of changing the operation conditions. On the other hand, in the case where the in-operation flag is not set ("NO" in Step S1504), the CPU 321 sets the in-operation flag and starts interlocking operations with the echo cancellation (Step S1505), and the CPU 321 transmits an echo cancellation restart request to the television receiver 200 through the HDMI terminal 304 (Step S1506).

On the other hand, in the case where there is a condition corresponding to any one of the conditions disabling the echo cancellation ("YES" in Step S1503), the CPU 321 determines whether an in-operation flag is set (Step S1507). In the case where the in-operation flag is not set ("NO" in Step S1507), the CPU 321 ends the operation at the time of changing the operation conditions. On the other hand, in the case where the in-operation flag is set ("YES" in Step S1507), the CPU 321 clears the in-operation flag and ends the interlocking operations with the echo cancellation (Step S1508), and the CPU 321 transmits an echo cancellation interrupt request to the television receiver 200 through the HDMI terminal 304 (Step S1509).

Figure 36:
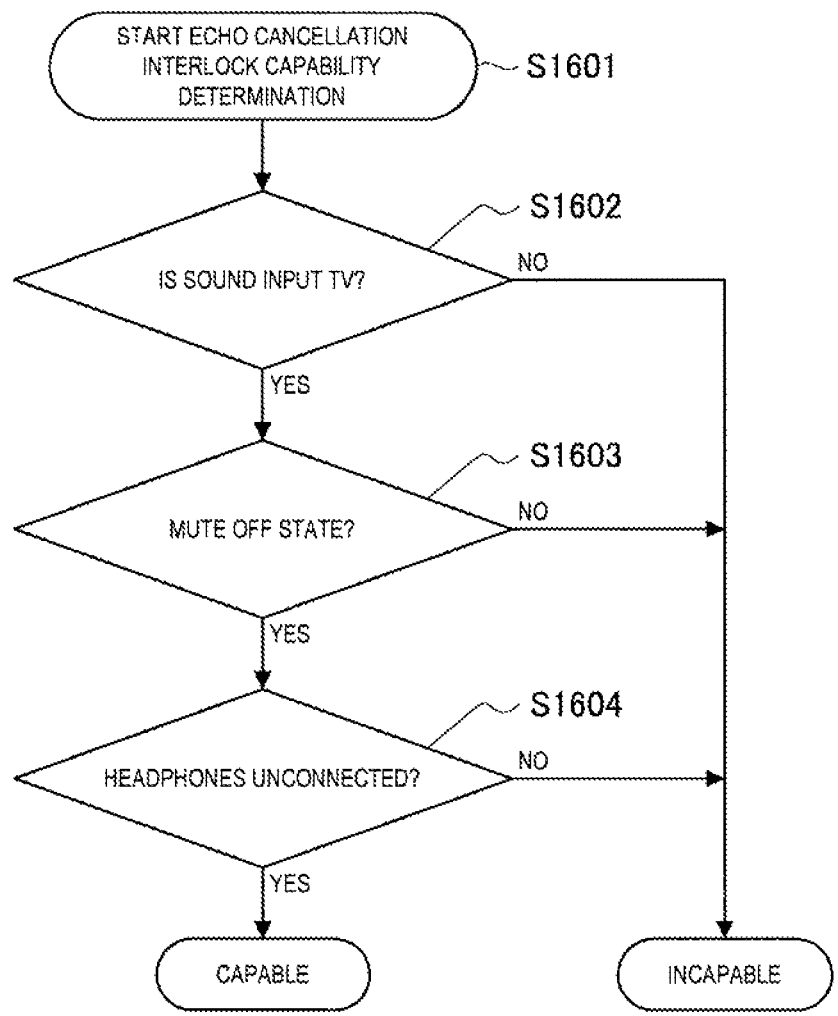
FIG. 36 is a flowchart showing a flow of an operation of determining interlock capability with echo cancellation performed in the AV amplifier.

FIG. 36 is a flowchart showing a flow of an operation of determining interlock capability with echo cancellation performed in the AV amplifier 300. As shown in FIG. 36, in the AV amplifier 300, the determination of interlock capability with the echo cancellation is started as follows (Step S1601). In the case where an audio signal from the television receiver 200 is not played back, the CPU 321 may determine that the interlocking with the echo cancellation is incapable, and in the case where the audio signal from the television receiver 200 is played back, the CPU 321 may determine that the interlocking with the echo cancellation is capable.

As shown in FIG. 36, for example, in the case where the sound input is not TV ("NO" in Step S1602), the CPU 321 may determine that the interlocking with the echo cancellation is incapable. On the other hand, in the case where the sound input is TV ("YES" in Step S1602), the CPU 321 may proceed to Step S1603. Further, in the case where the mute state is on ("NO" in Step S1603), the CPU 321 may determine that the interlocking with the echo cancellation is incapable. On the other hand, in the case where the mute state is off ("YES" in Step S1603), the CPU 321 may proceed to Step S1604.

Further, in the case where headphones are connected to the AV amplifier 300 ("NO" in Step S1604), the CPU 321 may determine that the interlocking with the echo cancellation is incapable. On the other hand, in the case where the headphones are unconnected to the AV amplifier 300 ("YES" in Step S1604), the CPU 321 may determine that the interlocking with the echo cancellation is capable.

Figure 37:
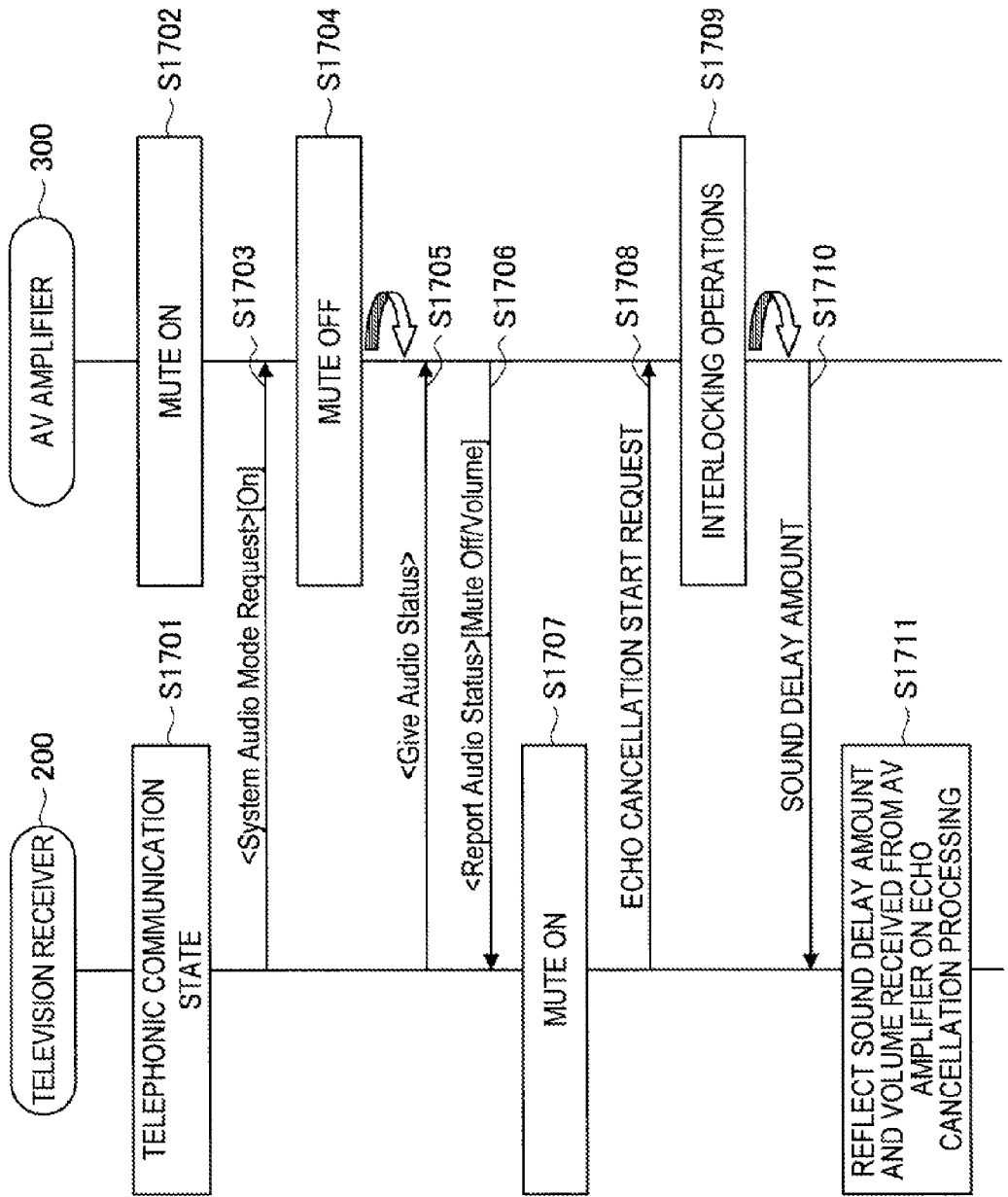
FIG. 37 is a sequence diagram showing an operation example of the communication system in a case where sound output is changed from the television receiver to the AV amplifier during telephonic communication.

FIG. 37 is a sequence diagram showing an operation example of the communication system in a case where sound output is changed from the television receiver 200 to the AV amplifier 300 during telephonic communication. As shown in FIG. 37, the television receiver 200 is in a telephonic communication state (Step S1701), and the AV amplifier 300 is in a mute ON state (Step S1702). Here, in the case where the sound output is changed from the television receiver 200 to the AV amplifier 300, in the television receiver 200, the CPU 231 transmits a message <System Audio Mode Request>[On] to the AV amplifier 300 through the HDMI terminal 201 (Step S1703).

When the CPU 321 receives the message in the AV amplifier 300, the CPU 321 makes the AV amplifier 300 to be in a mute OFF state (Step S1704). In the mute OFF state, the audio is output from the speaker set 350. Subsequently, in the television receiver 200, the CPU 231 transmits a message <Give Audio Status> to the AV amplifier 300 through the HDMI terminal 201 (Step S1705).

When the CPU 321 receives the message in the AV amplifier 300, the CPU 321 transmits a message <Report Audio Status>[Mute Off/Volume] including a mute state and a volume to the television receiver 200 through the HDMI terminal 304 (Step S1706). The CPU 231 receives the message from the AV amplifier 300 through the HDMI terminal 201 in the television receiver 200, and when confirming that the AV amplifier 300 is in a desired mute state, the CPU 231 makes the television receiver 200 to be in a mute ON state (Step S1707). In the mute ON state, the audio is not output from the speaker 219.

Subsequently, in the television receiver 200, the CPU 231 transmits an echo cancellation start request to the AV amplifier 300 through the HDMI terminal 201 (Step S1708). In the case where the CPU 321 receives the echo cancellation start request through the HDMI terminal 304 in the AV amplifier 300, the CPU 321 performs interlocking operations with the echo cancellation (Step S1709), and transmits a sound delay amount to the television receiver 200 through the HDMI terminal 304 (Step S1710). When the CPU 231 receives the sound delay amount from the AV amplifier 300 through the HDMI terminal 201 in the television receiver 200, the CPU 231 reflects the sound delay amount and the volume on the echo cancellation processing (Step S1711).

Figure 38:
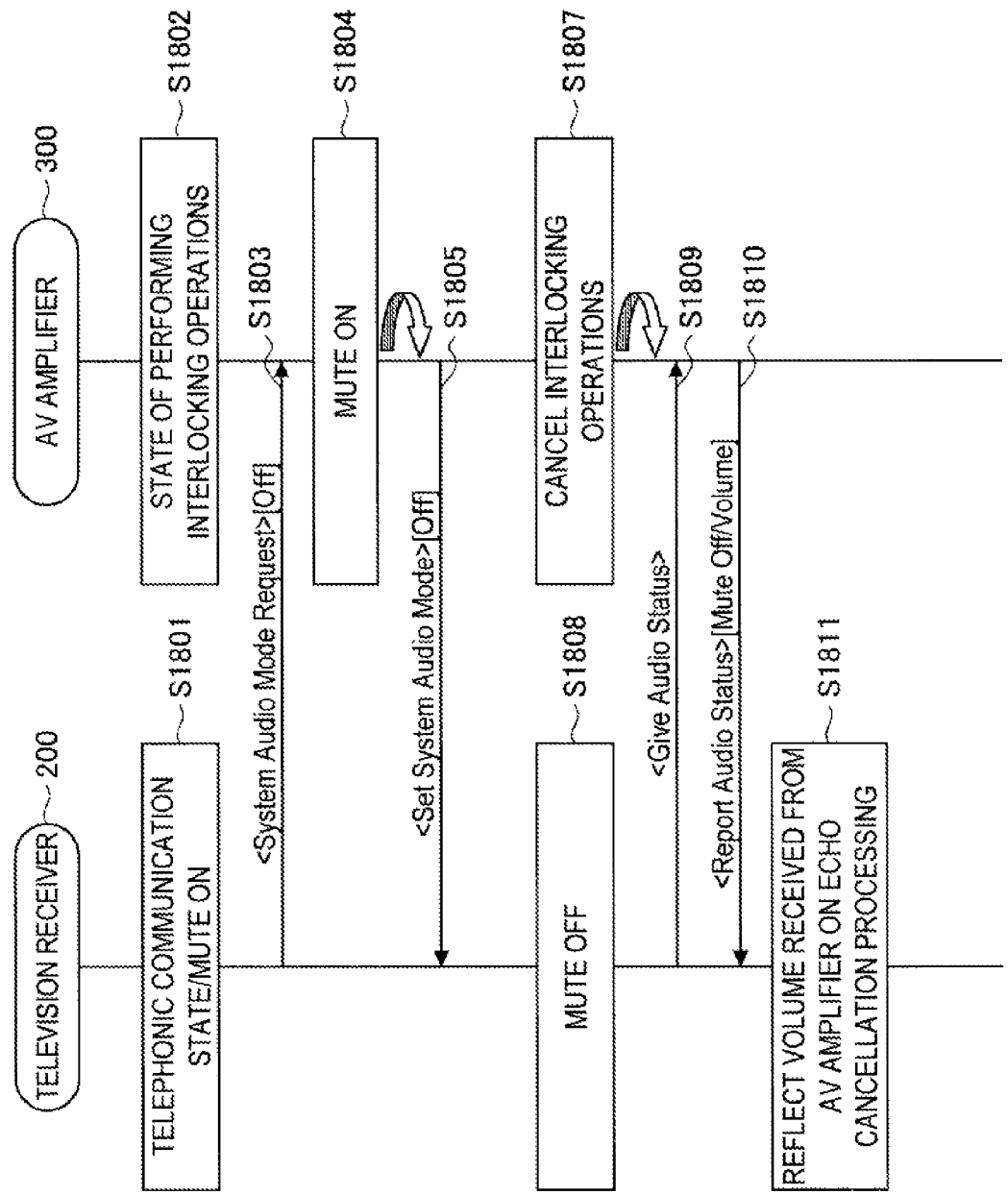
FIG. 38 is a sequence diagram showing an operation example of the communication system in a case where sound output is changed from the AV amplifier to the television receiver during telephonic communication.

FIG. 38 is a sequence diagram showing an operation example of the communication system in a case where sound output is changed from the AV amplifier 300 to the television receiver 200 during telephonic communication. As shown in FIG. 38, the television receiver 200 is in a telephonic communication state and in a mute ON state mute ON state (Step S1801), and the AV amplifier 300 is in a state of performing interlocking operations (Step S1802). Here, in the case where the sound output is changed from the AV amplifier 300 to the television receiver 200, in the television receiver 200, the CPU 231 transmits a message <System Audio Mode Request>[Off] to the AV amplifier 300 through the HDMI terminal 201 (Step S1803).

When the CPU 321 receives the message in the AV amplifier 300, the CPU 321 makes the AV amplifier 300 to be in a mute ON state (Step S1804). In the mute ON state, the audio is not output from the speaker set 350. Subsequently, in the AV amplifier 300, the CPU 321 transmits a message <Set System Audio Mode>[Off] through the HDMI terminal 304 in broadcast (Step S1805), and cancels the interlocking operations (Step S1807).

When the CPU 231 receives the message from the AV amplifier 300 through the HDMI terminal 201 in the television receiver 200, the CPU 231 makes the television receiver 200 to be in the mute OFF state (Step S1808). In the mute OFF state, the audio is output from the speaker 219. Subsequently, in the television receiver 200, the CPU 231 transmits a message <Give Audio Status> to the AV amplifier 300 through the HDMI terminal 201 (Step S1809).

When the CPU 321 receives the message in the AV amplifier 300, the CPU 321 transmits a message <Report Audio Status>[Mute Off/Volume] including a mute state and a volume to the television receiver 200 through the HDMI terminal 304 (Step S1810). When the CPU 231 receives the message from the AV amplifier 300 through the HDMI terminal 201 in the television receiver 200, the CPU 231 reflects the volume on the echo cancellation processing (Step S1811) and the television receiver 200 confirms that the AV amplifier 300 is in a desired mute state.

Figure 39:
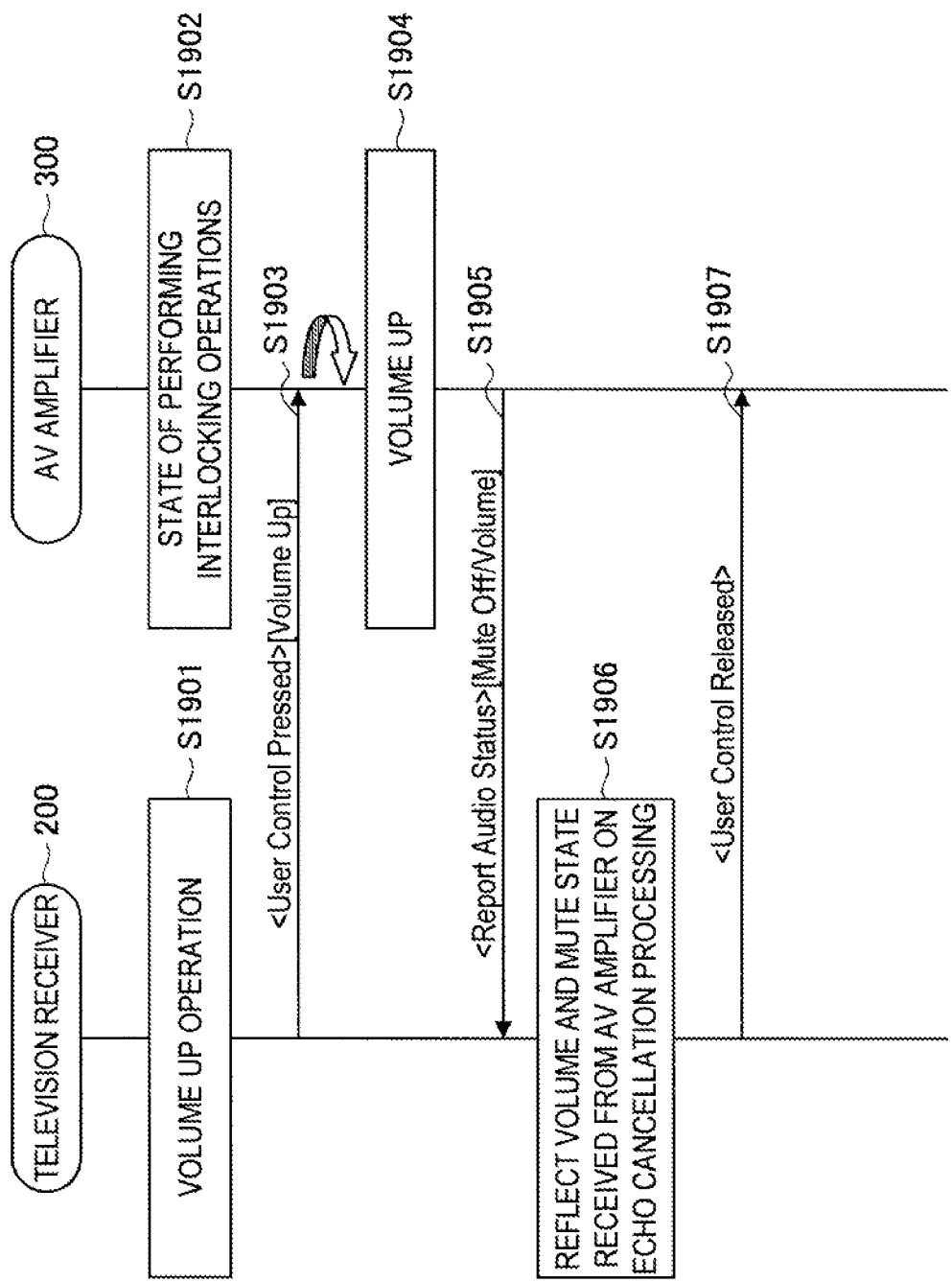
FIG. 39 is a sequence diagram showing an operation example of the communication system in a case where a volume of the AV amplifier is changed.

FIG. 39 is a sequence diagram showing an operation example of the communication system in a case where a volume of the AV amplifier 300 is changed. As shown in FIG. 39, the AV amplifier 300 is in a state of performing interlocking operations (Step S1902). Here, in the case where an operation of turning up the volume is performed in the television receiver 200 (Step S1901), in the television receiver 200, the CPU 231 transmits a message <User Control Pressed>[Volume Up] to the AV amplifier 300 through the HDMI terminal 201 (Step S1903).

When the CPU 321 receives the message in the AV amplifier 300, the CPU 321 turns up the volume (Step S1904). Subsequently, in the AV amplifier 300, the CPU 321 transmits a message <Report Audio Status>[Mute Off/Volume] through the HDMI terminal 304 in broadcast (Step S1905). When the CPU 231 receives the message from the AV amplifier 300 through the HDMI terminal 201 in the television receiver 200, the CPU 231 reflects the volume and the mute state on the echo cancellation processing (Step S1906).

When the operation of turning up the volume is terminated in the television receiver 200, in the television receiver 200, the CPU 231 transmits a message <User Control Released> to the AV amplifier 300 through the HDMI terminal 201 (Step S1907). When the CPU 321 receives the message in the AV amplifier 300, the operation of turning up the volume ends.

Figure 40:
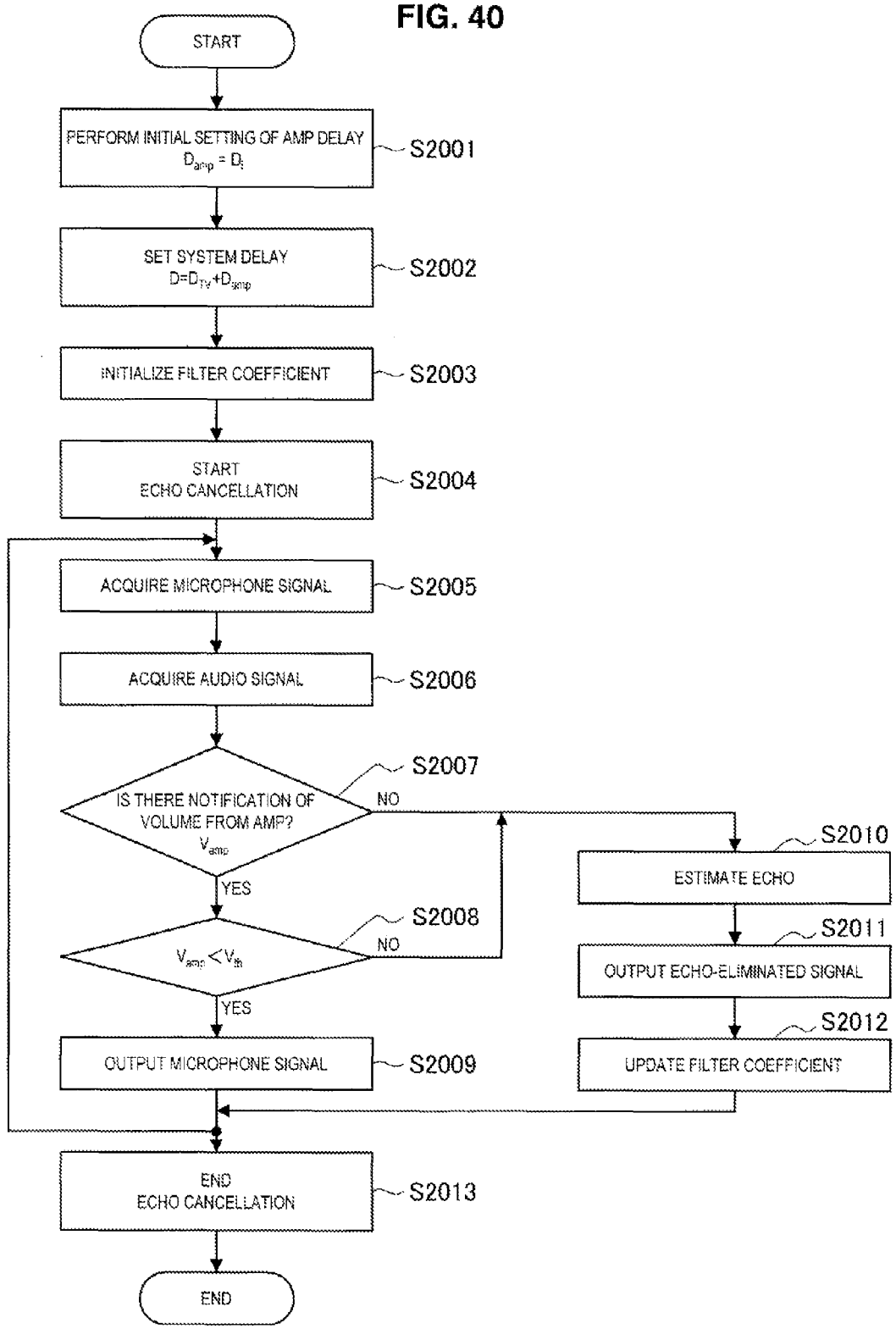
FIG. 40 is a flowchart showing a flow of an operation of echo cancellation processing (with volume notification) in the case of the external amplifier.

FIG. 40 is a flowchart showing a flow of an operation of echo cancellation processing (with volume notification) in the case of the external amplifier. First, in the television receiver 200, the CPU 231 sets an initial value of an AMP delay (sets an initial value $D_i$ as delay time $D_{amp}$ of AMP) (Step S2001), sets a system delay (sets delay time $D_{TV}$+ delay time $D_{amp}$ as system delay D) (Step S2002), and initializes a filter coefficient (Step S2003). Subsequently, the CPU 231 starts the echo cancellation (Step S2004).

When the echo cancellation is started, the adaptive filter 217b acquires a microphone detection signal obtained by detection by the microphone 237 (Step S2005), and also acquires an audio signal including a TV sound and a telephonic communication destination sound (Step S2006). Here, in the case where the AV amplifier 300 performs notification of a volume $V_{amp}$ through the HDMI terminal 201 ("YES" in Step S2007), when the volume $V_{amp}$ is less than a threshold $V_{th}$ ("YES" in Step S2008), the A/D conversion section 217a outputs a digital signal of the microphone detection signal (Step S2009).

On the other hand, in the case where the AV amplifier 300 does not perform notification of the volume $V_{amp}$ through the HDMI terminal 201 ("NO" in Step S2007), and the volume $V_{amp}$ is more than or equal to the threshold $V_{th}$ ("YES" in Step S2008), the adaptive filter 217b performs echo estimation (generates an echo estimation signal) (Step S2010), and the adder eliminates an echo estimation signal from the microphone detection signal to thereby generate an echo-eliminated signal, and outputs the generated echo-eliminated signal (Step S2011). Further, the CPU 231 updates the filter coefficient (Step S2012), and, in the case where the telephonic communication is not terminated, the processing returns to Step S2005, and in the case where the telephonic communication is terminated, the echo cancellation ends (Step S2013).

<<3. Conclusion>>

As described above, according to an embodiment of the present disclosure, there is provided an audio device including a control section configured to cause an audio signal to be output, the audio signal including a sound signal obtained through playback of content and a sound signal received from a communication partner device, and a sound processing section configured to generate an elimination signal, the elimination signal being obtained by eliminating a given sound signal from a microphone detection signal, the microphone detection signal representing the audio signal propagating and being obtained by detection by a microphone, in which the control section causes the communication partner device to transmit the elimination signal. According to such a configuration, a conversation carried out with a partner while listening to a content playback sound can be made more comfortable.

It should be understood by those skilled in the art that various modifications, combinations, sub-combinations and alterations may occur depending on design requirements and other factors insofar as they are within the scope of the appended claims or the equivalents thereof.

Further, the respective steps included in the communication system of the present specification are not necessarily processed in a time-series order in accordance with the flowcharts and the sequence diagrams. For example, the respective steps included in the operation of the communication system may be processed in different order from the flowcharts and the sequence diagrams, or may be processed in a parallel manner.

Further, it is also possible to create a computer program for causing hardware such as the CPU, the ROM, and the RAM, which are built in the television receiver 200, to exhibit substantially the same functions as the respective functions of the television receiver 200 described above. Further, there is also provided a storage medium having the computer program stored therein.

Further, it is also possible to create a computer program for causing hardware such as the CPU, the ROM, and the RAM, which are built in the AV amplifier 300, to exhibit substantially the same functions as the respective functions of the AV amplifier 300 described above. Further, there is also provided a storage medium having the computer program stored therein.

Further, the effects described in the present specification are merely illustrative or exemplified effects, and are not limitative. That is, with or in the place of the above effects, there may be achieved the effects described in this specification and/or other effects that are clear to those skilled in the art based on the description of this specification.

Additionally, the present technology may also be configured as below.

(1) An audio device including:
a control section configured to cause an audio signal to be output, the audio signal including a sound signal obtained through playback of content and a sound signal received from a communication partner device; and
a sound processing section configured to generate an elimination signal obtained by eliminating a given sound signal from a microphone detection signal, which is the audio signal that is propagated and detected by a microphone,
wherein the control section causes the communication partner device to transmit the elimination signal.

(2) The audio device according to (1),
wherein the control section causes another audio device to transmit the audio signal.

(3) The audio device according to (2),
wherein the sound processing section generates the elimination signal on the basis of a sound delay amount received from the another audio device.

(4) The audio device according to (2) or (3),
wherein the control section causes the another audio device to transmit generation start of the elimination signal when starting the generation of the elimination signal.

(5) The audio device according to (4),
wherein the control section causes the another audio device to transmit generation end of the elimination signal when ending the generation of the elimination signal.

(6) The audio device according to any one of (2) to (5),
wherein, in a case where the control section receives from the another audio device an interrupt request for interruption of the generation of the elimination signal, the control section interrupts the generation of the elimination signal.

(7) The audio device according to any one of (2) to (6),
wherein the sound processing section generates the elimination signal on the basis of a volume received from the another audio device.

(8) The audio device according to (1),
wherein the control section causes the audio signal to be output from a speaker included in the audio device.

(9) The audio device according to any one of (1) to (8),
wherein the given sound signal is calculated on the basis of an adaptive filter coefficient learned by a given adaptive signal processing algorithm.

(10) A sound processing method including:
causing an audio signal to be output, the audio signal including a sound signal obtained through playback of content and a sound signal received from a communication partner device;
generating an elimination signal obtained by eliminating a given sound signal from a microphone detection signal, which is the audio signal that is propagated and detected by a microphone; and
causing, by a processor, the communication partner device to transmit the elimination signal.

(11) A sound processing program for causing a computer to function as an audio device, the audio device including
a control section configured to cause an audio signal to be output, the audio signal including a sound signal obtained through playback of content and a sound signal received from a communication partner device, and
a sound processing section configured to generate an elimination signal obtained by eliminating a given sound signal from a microphone detection signal, which is the audio signal that is propagated and detected by a microphone,
wherein the control section causes the communication partner device to transmit the elimination signal.

(12) An audio device including:
a control section configured to, when an audio signal including a sound signal obtained through playback of content and a sound signal received from a communication partner device is input from another audio device, cause the audio signal to be output from a speaker,
wherein the another audio device generates an elimination signal obtained by eliminating a given sound signal from a microphone detection signal, which is the audio signal that is propagated and detected by a microphone.

(13) The audio device according to (12),
wherein, when the sound signal obtained through the playback of content is input, the control section outputs the sound signal to the another audio device.

(14) The audio device according to (12) or (13),
wherein, in a case where the control section is not capable of outputting the sound signal obtained through the playback of content to the another audio device, the control section causes the another audio device to transmit an interrupt request for interruption of the generation of the elimination signal.

(15) The audio device according to any one of (12) to (14), wherein, in a case where the control section receives generation start of the elimination signal from the another audio device, the control section starts a given interlocking operation that interlocks with the generation of the elimination signal.

(16) The audio device according to (15), wherein, in a case where the control section receives generation end of the elimination signal from the another audio device, the control section ends the given interlocking operation.

(17) A sound output method including:

causing, when an audio signal including a sound signal obtained through playback of content and a sound signal received from a communication partner device is input from another audio device, the audio signal to be output from a speaker, wherein the another audio device generates an elimination signal obtained by eliminating a given sound signal from a microphone detection signal, which is the audio signal that is propagated and detected by a microphone.

(18) A sound output program for causing a computer to function as an audio device, the audio device including a control section configured to, when an audio signal including a sound signal obtained through playback of content and a sound signal received from a communication partner device is input from another audio device, cause the audio signal to be output from a speaker, wherein the another audio device generates an elimination signal obtained by eliminating a given sound signal from a microphone detection signal, which is the audio signal that is propagated and detected by a microphone.

What is claimed is:

1. An audio device comprising:
a control section configured to cause an audio signal to be output, the audio signal including a sound signal obtained through playback of content and a sound signal received from a communication partner device, the communication partner being a television receiver and being connected to the audio device by way of a network; and
a sound processing section configured to generate an elimination signal obtained by eliminating a given sound signal from a microphone detection signal, which is the audio signal that is propagated and detected by a microphone,
wherein the control section causes another audio device to transmit the audio signal,
wherein the sound processing section generates the elimination signal on the basis of a sound delay amount pertaining to the another audio device, in which (i) a first value of the sound delay amount is initially set by the sound processing section and is utilized as the sound delay amount and (ii) the first value of the sound delay amount is replaced by a second value which is utilized as the sound delay amount when a new value of the sound delay amount is received from the another audio device and when the new value is determined to satisfy a predetermined condition, and
wherein the control section causes the communication partner device to transmit the elimination signal.

2. The audio device according to claim 1,
wherein the control section causes the another audio device to transmit a generation start signal when starting the generation of the elimination signal.

3. The audio device according to claim 2,
wherein the control section causes the another audio device to transmit a generation end signal when ending the generation of the elimination signal.

4. The audio device according to claim 1,
wherein, in a case where the control section receives from the another audio device an interrupt request for interruption of the generation of the elimination signal, the control section interrupts the generation of the elimination signal.

5. The audio device according to claim 1,
wherein the control section causes the audio signal to be output from a speaker included in the audio device.

6. The audio device according to claim 1,
wherein the given sound signal is calculated on the basis of an adaptive filter coefficient learned by a given adaptive signal processing algorithm.

7. A sound processing method for use with an audio device, said method comprising:
causing an audio signal to be output, the audio signal including a sound signal obtained through playback of content and a sound signal received from a communication partner device, the communication partner being a television receiver and being connected to the audio device by way of a network;
generating an elimination signal obtained by eliminating a given sound signal from a microphone detection signal, which is the audio signal that is propagated and detected by a microphone; and
causing, by a processor, the communication partner device to transmit the elimination signal,
wherein another audio device is caused to transmit the audio signal, and
wherein the elimination signal is generated on the basis of a sound delay amount pertaining to the another audio device, in which (i) a first value of the sound delay amount is initially set by the audio device and is utilized as the sound delay amount and (ii) the first value of the sound delay amount is replaced by a second value which is utilized as the sound delay amount when a new value of the sound delay amount is received from the another audio device and when the new value is determined to satisfy a predetermined condition.

8. A non-transitory computer readable medium having stored thereon a sound processing program which when executed causes a computer to function as an audio device to:
cause an audio signal to be output, the audio signal including a sound signal obtained through playback of content and a sound signal received from a communication partner device, the communication partner being a television receiver and being connected to the audio device by way of a network,
generate an elimination signal obtained by eliminating a given sound signal from a microphone detection signal, which is the audio signal that is propagated and detected by a microphone, and
cause the communication partner device to transmit the elimination signal,
wherein another audio device is caused to transmit the audio signal, and
wherein the elimination signal is generated on the basis of a sound delay amount pertaining to the another audio device, in which (i) a first value of the sound delay amount is initially set by the audio device and is utilized as the sound delay amount and (ii) the first value of the sound delay amount is replaced by a second value which is utilized as the sound delay amount when a new value of the sound delay amount is received from the another audio device and when the new value is determined to satisfy a predetermined condition.

* * * * *